(12) United States Patent
Ben Oren et al.

(10) Patent No.: US 12,514,456 B2
(45) Date of Patent: Jan. 6, 2026

(54) SYSTEM AND METHODS FOR LESION CHARACTERIZATION IN BLOOD VESSELS

(71) Applicant: EXIMO MEDICAL LTD, Rehovot (IL)

(72) Inventors: Ilan Ben Oren, Modi'in (IL); Yoel Zabar, Ness Ziona (IL); Ziv Alperovich, Yahud (IL)

(73) Assignee: EXIMO MEDICAL LTD., Rehovot (IL)

( * ) Notice: Subject to any disclaimer, the term of this patent is extended or adjusted under 35 U.S.C. 154(b) by 362 days.

(21) Appl. No.: 16/893,345

(22) Filed: Jun. 4, 2020

(65) Prior Publication Data

US 2020/0397312 A1    Dec. 24, 2020

Related U.S. Application Data

(63) Continuation-in-part of application No. 14/764,180, filed as application No. PCT/IB2014/058688 on Jan. 31, 2014, now abandoned.

(Continued)

(51) Int. Cl.
*A61B 5/02* (2006.01)
*A61B 5/00* (2006.01)
(Continued)

(52) U.S. Cl.
CPC ........ *A61B 5/02007* (2013.01); *A61B 5/0095* (2013.01); *A61B 5/4836* (2013.01);
(Continued)

(58) Field of Classification Search
CPC ...... A61B 17/3207; A61B 2017/00022; A61B 2505/05; A61B 2576/02; A61B 5/02007;
(Continued)

(56) References Cited

U.S. PATENT DOCUMENTS

| 43,750 A | 8/1864 | Martin |
| 1,706,161 A | 3/1929 | Hollnagel |

(Continued)

FOREIGN PATENT DOCUMENTS

| AU | 2008329807 A1 | 6/2009 |
| AU | 2010300677 A1 | 4/2012 |

(Continued)

OTHER PUBLICATIONS

Albagli, D., et al, Time Dependence of Laser-Induced Surface Breakdown in Fused Silica at 355nm in the Nanosecond Regime, SPIE vol. 1441, Laser Induced Damage in Optical Materials, 1990, 8 pages.

(Continued)

*Primary Examiner* — David Hamaoui
*Assistant Examiner* — Jessandra F Hough
(74) *Attorney, Agent, or Firm* — Kevin P. Radigan, Esq.; Heslin Rothenberg Farley & Mesiti P.C.

(57) ABSTRACT

The invention comprises a system and method for identification and/or characterization of lesions and/or the various type of tissues inside blood vessels, including utilizing a laser system configured to transmit laser radiation towards and/or onto a lesion within a blood vessel, monitoring ablation of the lesion utilizing at least one acoustic sensor; and, using a processor, comparing the signals obtained from the acoustic signal to previously obtained acoustic signals associated with specific lesion types and determine a type of the lesion and/or an efficiency of the ablation process based on the comparison.

19 Claims, 21 Drawing Sheets

Related U.S. Application Data

(60) Provisional application No. 62/856,829, filed on Jun. 4, 2019, provisional application No. 61/758,830, filed on Jan. 31, 2013.

(51) Int. Cl.
  *A61B 17/00* (2006.01)
  *A61B 17/3207* (2006.01)
  *G16H 20/40* (2018.01)
  *G16H 40/63* (2018.01)
  *G16H 50/20* (2018.01)

(52) U.S. Cl.
  CPC .......... *A61B 5/6852* (2013.01); *A61B 5/7267* (2013.01); *A61B 17/3207* (2013.01); *G16H 20/40* (2018.01); *G16H 40/63* (2018.01); *G16H 50/20* (2018.01); *A61B 2017/00022* (2013.01); *A61B 2505/05* (2013.01); *A61B 2576/02* (2013.01)

(58) Field of Classification Search
  CPC ................ A61B 5/0095; A61B 5/4836; A61B 5/6852; A61B 5/7267; G16H 20/40; G16H 50/20; G16H 40/63
  See application file for complete search history.

(56) References Cited

U.S. PATENT DOCUMENTS

| | | |
|---|---|---|
| 1,989,610 A | 1/1935 | Coolidge |
| 2,699,770 A | 1/1955 | Fourestier |
| 3,043,910 A | 7/1962 | Hicks, Jr. |
| 3,051,035 A | 8/1962 | Root |
| 3,051,166 A | 8/1962 | Hrair |
| 3,068,742 A | 12/1962 | Hicks, Jr. |
| 3,423,581 A | 1/1969 | Baer |
| 3,455,625 A | 7/1969 | Brumley |
| 3,499,434 A | 3/1970 | Georg |
| 3,572,325 A | 3/1971 | Seymour |
| 3,605,750 A | 9/1971 | Sheridan |
| 3,622,743 A | 11/1971 | Muncheryan |
| 3,641,332 A | 2/1972 | Reick |
| 3,643,653 A | 2/1972 | Takahashi |
| 3,678,741 A | 7/1972 | Burley |
| 3,704,996 A | 12/1972 | Borner |
| 3,710,798 A | 1/1973 | Bredemeier |
| 3,726,272 A | 4/1973 | Mori |
| 3,756,688 A | 9/1973 | Hudson |
| 3,768,146 A | 10/1973 | Braun |
| 3,780,295 A | 12/1973 | Kapron |
| 3,790,791 A | 2/1974 | Anderson |
| 3,796,905 A | 3/1974 | Maeda |
| 3,802,440 A | 4/1974 | Ziegler |
| 3,808,549 A | 4/1974 | Maurer |
| 3,832,028 A | 8/1974 | Kapron |
| 3,834,391 A | 9/1974 | Block |
| 3,834,803 A | 9/1974 | Tsukada |
| 3,843,865 A | 10/1974 | Nath |
| 3,846,010 A | 11/1974 | Love |
| 3,849,947 A | 11/1974 | Bunkoczy |
| 3,858,577 A | 1/1975 | Bass |
| 3,861,781 A | 1/1975 | Hasegawa |
| 3,866,599 A | 2/1975 | Johnson |
| 3,874,783 A | 4/1975 | Cole |
| 3,880,452 A | 4/1975 | Fields |
| 3,906,221 A | 9/1975 | Mercier |
| 3,910,677 A | 10/1975 | Becker |
| 3,920,980 A | 11/1975 | Nath |
| 3,932,184 A | 1/1976 | Cohen |
| 3,972,585 A | 8/1976 | Dalgleish |
| 4,005,522 A | 2/1977 | Dalgleish |
| 4,008,948 A | 2/1977 | Dalgleish |
| 4,087,158 A | 5/1978 | Lewis |
| 4,148,554 A | 4/1979 | Magnusson |
| 4,173,228 A | 11/1979 | Childress |
| 4,191,446 A | 3/1980 | Arditty |
| 4,233,493 A | 11/1980 | Nath |
| 4,249,539 A | 2/1981 | Mezrich |
| 4,273,109 A | 6/1981 | Enderby |
| 4,273,127 A | 6/1981 | Auth |
| 4,274,423 A | 6/1981 | Mizuno |
| 4,313,431 A | 2/1982 | Frank |
| 4,317,078 A | 2/1982 | Weed |
| 4,362,166 A | 12/1982 | Furler |
| 4,380,365 A | 4/1983 | Gross |
| 4,407,294 A | 10/1983 | David |
| 4,445,501 A | 5/1984 | Bresler |
| 4,449,535 A | 5/1984 | Renault |
| 4,564,011 A | 1/1986 | Goldman |
| 4,573,761 A | 3/1986 | McLachlan |
| 4,577,634 A | 3/1986 | Gessman |
| 4,578,061 A | 3/1986 | Lemelson |
| 4,592,353 A | 6/1986 | Daikuzono |
| 4,641,912 A | 2/1987 | Goldenberg |
| 4,644,960 A | 2/1987 | Johans |
| 4,654,532 A | 3/1987 | Hirschfeld |
| 4,660,925 A | 4/1987 | McCaughan, Jr. |
| 4,662,368 A | 5/1987 | Hussein |
| 4,666,426 A | 5/1987 | Aigner |
| 4,671,273 A | 6/1987 | Lindsey |
| 4,672,961 A | 6/1987 | Davies |
| 4,693,244 A | 9/1987 | Daikuzono |
| 4,693,556 A | 9/1987 | McCaughan, Jr. |
| 4,695,697 A | 9/1987 | Kosa |
| 4,697,595 A | 10/1987 | Breyer |
| 4,707,134 A | 11/1987 | McLachlan |
| 4,729,763 A | 3/1988 | Henrie |
| 4,732,448 A | 3/1988 | Goldenberg |
| 4,736,743 A | 4/1988 | Daikuzono |
| 4,740,047 A | 4/1988 | Abe |
| 4,743,084 A | 5/1988 | Manning |
| 4,773,413 A | 9/1988 | Hussein |
| 4,800,876 A | 1/1989 | Fox |
| 4,802,650 A | 2/1989 | Stricker |
| 4,812,003 A | 3/1989 | Dambach |
| 4,816,670 A | 3/1989 | Kitamura |
| 4,817,601 A | 4/1989 | Roth |
| 4,821,731 A | 4/1989 | Martinelli |
| 4,830,460 A | 5/1989 | Goldenberg |
| 4,832,024 A | 5/1989 | Boussignac |
| 4,834,493 A | 5/1989 | Cahill |
| 4,844,062 A | 7/1989 | Wells |
| 4,862,887 A | 9/1989 | Weber |
| 4,889,129 A | 12/1989 | Dougherty |
| 4,905,698 A | 3/1990 | Strohl, Jr. |
| 4,911,172 A | 3/1990 | Bui |
| 4,919,508 A | 4/1990 | Grace |
| 4,947,852 A | 8/1990 | Nassi |
| 4,951,677 A | 8/1990 | Crowley |
| 4,955,882 A | 9/1990 | Hakky |
| 4,966,596 A | 10/1990 | Kuntz |
| 4,968,306 A | 11/1990 | Huss |
| 4,968,314 A | 11/1990 | Michaels |
| 4,975,925 A | 12/1990 | Derrickson |
| 4,979,797 A | 12/1990 | Nemeth |
| 4,979,939 A | 12/1990 | Shiber |
| 4,985,029 A | 1/1991 | Hoshino |
| 4,988,163 A | 1/1991 | Cohen |
| 4,993,412 A | 2/1991 | Murphy-Chutorian |
| 4,995,691 A | 2/1991 | Purcell, Jr. |
| 4,998,794 A | 3/1991 | Holzman |
| 5,005,592 A | 4/1991 | Cartmell |
| 5,011,254 A | 4/1991 | Edwards |
| 5,011,279 A | 4/1991 | Auweter |
| 5,016,964 A | 5/1991 | Donnelly |
| 5,026,366 A | 6/1991 | Leckrone |
| 5,029,588 A | 7/1991 | Yock |
| 5,030,201 A | 7/1991 | Palestrant |
| 5,037,180 A | 8/1991 | Stone |
| 5,037,421 A | 8/1991 | Boutacoff |
| 5,038,789 A | 8/1991 | Frazin |
| 5,041,109 A | 8/1991 | Abela |
| 5,042,486 A | 8/1991 | Pfeiler |

(56) References Cited

U.S. PATENT DOCUMENTS

| | | |
|---|---|---|
| 5,042,980 A | 8/1991 | Baker |
| 5,053,033 A | 10/1991 | Clarke |
| 5,060,557 A | 10/1991 | Dunn |
| 5,074,632 A | 12/1991 | Potter |
| 5,078,678 A | 1/1992 | Katims |
| 5,078,714 A | 1/1992 | Katims |
| 5,093,877 A | 3/1992 | Aita |
| 5,099,845 A | 3/1992 | Besz |
| 5,100,507 A | 3/1992 | Cholewa |
| 5,112,127 A | 5/1992 | Carrabba |
| 5,121,750 A | 6/1992 | Katims |
| 5,123,419 A | 6/1992 | Platt |
| 5,129,896 A | 7/1992 | Hasson |
| 5,131,397 A | 7/1992 | Crowley |
| 5,135,531 A | 8/1992 | Shiber |
| 5,146,917 A | 9/1992 | Wagnieres |
| 5,147,353 A | 9/1992 | Everett |
| 5,147,354 A | 9/1992 | Boutacoff |
| 5,151,096 A | 9/1992 | Khoury |
| 5,152,744 A | 10/1992 | Krause |
| 5,154,708 A | 10/1992 | Long |
| 5,156,157 A | 10/1992 | Valenta, Jr. |
| 5,157,750 A | 10/1992 | Grace |
| 5,161,536 A | 11/1992 | Vilkomerson |
| 5,164,945 A | 11/1992 | Long |
| 5,166,756 A | 11/1992 | McGee |
| 5,188,632 A | 2/1993 | Goldenberg |
| 5,188,635 A | 2/1993 | Radtke |
| 5,190,536 A | 3/1993 | Wood |
| 5,193,526 A | 3/1993 | Daikuzono |
| 5,196,004 A | 3/1993 | Sinofsky |
| 5,196,005 A | 3/1993 | Doiron |
| 5,207,669 A | 5/1993 | Baker |
| 5,211,165 A | 5/1993 | Dumoulin |
| 5,219,345 A | 6/1993 | Potter |
| 5,222,966 A | 6/1993 | Perkins |
| 5,250,045 A | 10/1993 | Bohley |
| 5,253,312 A | 10/1993 | Payne |
| 5,254,114 A | 10/1993 | Reed, Jr. |
| 5,263,951 A | 11/1993 | Spears |
| 5,263,952 A | 11/1993 | Grace |
| 5,267,979 A | 12/1993 | Appling |
| 5,267,993 A | 12/1993 | Grace |
| 5,267,995 A | 12/1993 | Doiron |
| 5,269,777 A | 12/1993 | Doiron |
| 5,275,622 A | 1/1994 | Lazarus |
| 5,280,786 A | 1/1994 | Wlodarczyk |
| 5,290,275 A | 3/1994 | Kittrell |
| 5,292,311 A | 3/1994 | Cope |
| 5,292,320 A | 3/1994 | Brown |
| 5,293,872 A | 3/1994 | Alfano |
| 5,300,066 A | 4/1994 | Manoukian |
| 5,306,274 A | 4/1994 | Long |
| 5,312,396 A | 5/1994 | Feld |
| 5,312,399 A | 5/1994 | Hakky |
| 5,315,614 A | 5/1994 | Grace |
| 5,321,783 A | 6/1994 | Nielson |
| 5,330,465 A | 7/1994 | Doiron |
| 5,342,383 A | 8/1994 | Thomas |
| 5,343,543 A | 8/1994 | Novak, Jr. |
| 5,346,488 A | 9/1994 | Prince |
| 5,349,590 A | 9/1994 | Amirkhanian |
| 5,350,377 A | 9/1994 | Winston |
| 5,352,221 A | 10/1994 | Fumich |
| 5,354,294 A | 10/1994 | Chou |
| 5,360,416 A | 11/1994 | Ausherman |
| 5,370,649 A | 12/1994 | Gardetto |
| 5,377,683 A | 1/1995 | Barken |
| 5,381,795 A | 1/1995 | Nordgren |
| 5,383,199 A | 1/1995 | Laudenslager |
| 5,386,828 A | 2/1995 | Owens |
| 5,395,361 A | 3/1995 | Fox |
| 5,400,428 A | 3/1995 | Grace |
| 5,401,270 A | 3/1995 | Gerhard |
| 5,402,508 A | 3/1995 | O'Rourke |
| 5,404,218 A | 4/1995 | Nave |
| 5,412,619 A | 5/1995 | Bauer |
| 5,415,633 A | 5/1995 | Lazarus |
| 5,415,653 A | 5/1995 | Wardle |
| 5,415,655 A | 5/1995 | Fuller |
| 5,419,312 A | 5/1995 | Arenberg |
| 5,421,338 A | 6/1995 | Crowley |
| 5,421,928 A | 6/1995 | Knecht |
| 5,423,806 A | 6/1995 | Dale |
| 5,425,367 A | 6/1995 | Shapiro |
| 5,425,723 A | 6/1995 | Wang |
| 5,428,699 A | 6/1995 | Pon |
| 5,429,604 A | 7/1995 | Hammersmark |
| 5,429,617 A | 7/1995 | Hammersmark |
| 5,432,880 A | 7/1995 | Diner |
| 5,445,144 A | 8/1995 | Wodicka |
| 5,445,608 A | 8/1995 | Chen |
| 5,452,359 A | 9/1995 | Inanaga |
| 5,453,576 A | 9/1995 | Krivitski |
| 5,456,680 A | 10/1995 | Taylor |
| 5,464,395 A | 11/1995 | Faxon |
| 5,466,234 A | 11/1995 | Loeb |
| 5,469,858 A | 11/1995 | Osborne |
| 5,470,330 A | 11/1995 | Goldenberg |
| 5,484,433 A | 1/1996 | Taylor |
| 5,486,170 A | 1/1996 | Winston |
| 5,495,541 A | 2/1996 | Murray |
| 5,498,258 A | 3/1996 | Hakky |
| 5,499,975 A | 3/1996 | Cope |
| 5,500,011 A | 3/1996 | Desai |
| 5,500,100 A | 3/1996 | Riley |
| 5,509,917 A | 4/1996 | Cecchetti |
| 5,514,128 A | 5/1996 | Hillsman |
| 5,526,820 A | 6/1996 | Khoury |
| 5,534,000 A | 7/1996 | Bruce |
| 5,536,248 A | 7/1996 | Weaver |
| 5,536,265 A | 7/1996 | Van Den Bergh |
| 5,562,657 A | 10/1996 | Griffin |
| 5,571,098 A | 11/1996 | Domankevitz |
| 5,588,436 A | 12/1996 | Narayanan |
| 5,592,939 A | 1/1997 | Martinelli |
| 5,622,169 A | 4/1997 | Golden |
| 5,624,026 A | 4/1997 | Chernoff |
| 5,631,986 A | 5/1997 | Frey |
| 5,640,960 A | 6/1997 | Jones |
| 5,643,251 A | 7/1997 | Hillsman |
| 5,643,253 A | 7/1997 | Baxter |
| 5,643,257 A | 7/1997 | Cohen |
| 5,645,065 A | 7/1997 | Shapiro |
| 5,653,696 A | 8/1997 | Shiber |
| 5,662,646 A | 9/1997 | Fumich |
| 5,666,958 A | 9/1997 | Rothenberg |
| 5,688,263 A | 11/1997 | Hauptmann |
| 5,693,029 A | 12/1997 | Leonhardt |
| 5,693,043 A | 12/1997 | Kittrell |
| 5,695,482 A | 12/1997 | Kaldany |
| 5,695,583 A | 12/1997 | Van Den Bergh |
| 5,700,243 A | 12/1997 | Narciso, Jr. |
| 5,709,210 A | 1/1998 | Green |
| 5,710,626 A | 1/1998 | O'Rourke |
| 5,717,807 A | 2/1998 | Theroux |
| 5,720,894 A | 2/1998 | Perry |
| 5,725,521 A | 3/1998 | Mueller |
| 5,727,552 A | 3/1998 | Ryan |
| 5,727,553 A | 3/1998 | Saad |
| 5,728,091 A | 3/1998 | Payne |
| 5,729,129 A | 3/1998 | Acker |
| 5,733,323 A | 3/1998 | Buck |
| 5,749,835 A | 5/1998 | Glantz |
| 5,754,717 A | 5/1998 | Esch |
| 5,764,840 A | 6/1998 | Wach |
| 5,769,786 A | 6/1998 | Wiegel |
| 5,769,868 A | 6/1998 | Yock |
| 5,782,797 A | 7/1998 | Schweich, Jr. |
| 5,807,389 A | 9/1998 | Gardetto |
| 5,810,662 A | 9/1998 | Van Becelaere |
| 5,817,144 A | 10/1998 | Gregory |
| 5,836,940 A | 11/1998 | Gregory |
| 5,836,946 A | 11/1998 | Diaz |

(56) References Cited

U.S. PATENT DOCUMENTS

| | | |
|---|---|---|
| 5,843,073 A | 12/1998 | Sinofsky |
| 5,843,076 A | 12/1998 | Webster, Jr. |
| 5,868,734 A | 2/1999 | Soufiane |
| 5,878,178 A | 3/1999 | Wach |
| 5,879,297 A | 3/1999 | Haynor |
| 5,897,551 A | 4/1999 | Everett |
| 5,899,860 A | 5/1999 | Pfeiffer |
| 5,908,415 A | 6/1999 | Sinofsky |
| 5,913,820 A | 6/1999 | Bladen |
| 5,916,210 A | 6/1999 | Winston |
| 5,944,023 A | 8/1999 | Johnson |
| 5,947,959 A | 9/1999 | Sinofsky |
| 5,951,482 A | 9/1999 | Winston |
| 5,951,543 A | 9/1999 | Brauer |
| 5,954,649 A | 9/1999 | Chia |
| 5,967,980 A | 10/1999 | Ferre |
| 5,976,124 A | 11/1999 | Reiser |
| 5,983,126 A | 11/1999 | Wittkampf |
| 5,989,243 A | 11/1999 | Goldenberg |
| 5,991,404 A | 11/1999 | Brahami |
| 6,013,072 A | 1/2000 | Winston et al. |
| 6,027,450 A | 2/2000 | Brown |
| 6,033,398 A | 3/2000 | Farley |
| 6,038,468 A | 3/2000 | Rex |
| 6,048,349 A | 4/2000 | Winston |
| 6,052,610 A | 4/2000 | Koch |
| 6,053,809 A | 4/2000 | Arceneaux |
| 6,056,743 A | 5/2000 | Ellis |
| 6,061,588 A | 5/2000 | Thornton |
| 6,063,093 A | 5/2000 | Winston |
| 6,096,011 A | 8/2000 | Trombley, III |
| 6,102,905 A | 8/2000 | Baxter |
| 6,106,515 A | 8/2000 | Winston |
| 6,112,111 A | 8/2000 | Glantz |
| 6,117,125 A | 9/2000 | Rothbarth |
| 6,126,654 A | 10/2000 | Giba |
| 6,128,958 A | 10/2000 | Cain |
| 6,129,668 A | 10/2000 | Haynor |
| 6,139,543 A | 10/2000 | Esch |
| 6,141,293 A | 10/2000 | Amorai-Moriya |
| 6,149,596 A | 11/2000 | Bancroft |
| 6,152,919 A | 11/2000 | Hakky |
| 6,162,214 A | 12/2000 | Mueller |
| 6,164,280 A | 12/2000 | Everett |
| 6,177,792 B1 | 1/2001 | Govari |
| 6,179,808 B1 | 1/2001 | Boukhny |
| 6,193,676 B1 | 2/2001 | Winston |
| 6,206,898 B1 | 3/2001 | Honeycutt |
| 6,210,400 B1 | 4/2001 | Hebert |
| 6,215,231 B1 | 4/2001 | Newnham |
| 6,216,028 B1 | 4/2001 | Haynor |
| 6,226,546 B1 | 5/2001 | Evans |
| 6,226,547 B1 | 5/2001 | Lockhart |
| 6,228,076 B1 | 5/2001 | Winston |
| 6,230,042 B1 | 5/2001 | Slettenmark |
| 6,233,476 B1 | 5/2001 | Strommer |
| 6,233,477 B1 | 5/2001 | Chia |
| 6,246,231 B1 | 6/2001 | Ashe |
| 6,246,899 B1 | 6/2001 | Chia |
| 6,251,100 B1 | 6/2001 | Flock |
| 6,258,084 B1 | 7/2001 | Goldman |
| 6,259,941 B1 | 7/2001 | Chia |
| 6,261,247 B1 | 7/2001 | Ishikawa |
| 6,263,230 B1 | 7/2001 | Haynor |
| 6,263,236 B1 | 7/2001 | Kasinkas |
| 6,270,492 B1 | 8/2001 | Sinofsky |
| 6,270,495 B1 | 8/2001 | Palermo |
| 6,283,951 B1 | 9/2001 | Flaherty |
| 6,298,261 B1 | 10/2001 | Rex |
| 6,302,875 B1 | 10/2001 | Makower |
| 6,304,769 B1 | 10/2001 | Arenson |
| 6,316,934 B1 | 11/2001 | Amorai-Moriya |
| 6,344,048 B1 | 2/2002 | Chin |
| 6,352,549 B1 | 3/2002 | Everett |
| 6,368,285 B1 | 4/2002 | Osadchy |
| 6,374,134 B1 | 4/2002 | Bladen |
| 6,375,651 B2 | 4/2002 | Grasso, III |
| 6,394,976 B1 | 5/2002 | Winston |
| 6,398,777 B1 | 6/2002 | Navarro |
| 6,439,944 B1 | 8/2002 | La Fata |
| 6,440,125 B1 | 8/2002 | Rentrop |
| 6,445,943 B1 | 9/2002 | Ferre |
| 6,447,477 B2 | 9/2002 | Burney |
| 6,451,010 B1 | 9/2002 | Angeley |
| 6,454,790 B1 | 9/2002 | Neuberger |
| 6,463,313 B1 | 10/2002 | Winston |
| 6,484,131 B1 | 11/2002 | Amorai-Moriya |
| 6,485,485 B1 | 11/2002 | Winston |
| 6,487,516 B1 | 11/2002 | Amorai-Moriya |
| 6,498,477 B1 | 12/2002 | Govari |
| 6,514,217 B1 | 2/2003 | Selmon |
| 6,516,212 B1 | 2/2003 | Bladen |
| 6,522,806 B1 | 2/2003 | James, IV |
| 6,522,907 B1 | 2/2003 | Bladen |
| 6,539,944 B1 | 4/2003 | Watson |
| 6,544,230 B1 | 4/2003 | Flaherty |
| 6,547,757 B1 * | 4/2003 | Kranz .................. A61B 5/6886 600/478 |
| 6,547,779 B2 | 4/2003 | Levine |
| 6,551,302 B1 | 4/2003 | Rosinko |
| 6,554,824 B2 | 4/2003 | Davenport |
| 6,555,827 B1 | 4/2003 | Kockott |
| 6,561,998 B1 | 5/2003 | Roth |
| 6,584,343 B1 | 6/2003 | Ransbury |
| 6,599,277 B2 | 7/2003 | Neubert |
| 6,611,720 B2 | 8/2003 | Hata |
| 6,615,155 B2 | 9/2003 | Gilboa |
| 6,618,612 B1 | 9/2003 | Acker |
| 6,625,563 B2 | 9/2003 | Kirsch |
| 6,628,519 B2 | 9/2003 | Umetsu |
| 6,629,987 B1 | 10/2003 | Gambale |
| 6,636,757 B1 | 10/2003 | Jascob |
| 6,652,803 B2 | 11/2003 | Watanabe |
| 6,663,621 B1 | 12/2003 | Winston |
| 6,673,064 B1 | 1/2004 | Rentrop |
| 6,673,065 B1 | 1/2004 | Veligdan |
| 6,685,648 B2 | 2/2004 | Flaherty |
| 6,687,531 B1 | 2/2004 | Ferre |
| 6,690,963 B2 | 2/2004 | Ben-Haim |
| 6,692,466 B1 | 2/2004 | Chow |
| 6,694,180 B1 | 2/2004 | Boesen |
| 6,695,782 B2 | 2/2004 | Ranucci |
| 6,701,044 B2 | 3/2004 | Arbore |
| 6,705,319 B2 | 3/2004 | Wodicka |
| 6,711,429 B1 | 3/2004 | Gilboa |
| 6,716,210 B2 | 4/2004 | Lin |
| 6,738,656 B1 | 5/2004 | Ferre |
| 6,741,883 B2 | 5/2004 | Gildenberg |
| 6,746,422 B1 | 6/2004 | Noriega |
| 6,752,800 B1 | 6/2004 | Winston |
| 6,752,803 B2 | 6/2004 | Goldman |
| 6,757,557 B1 | 6/2004 | Bladen |
| 6,767,338 B2 | 7/2004 | Hawk |
| 6,769,433 B2 | 8/2004 | Zikorus |
| 6,772,014 B2 | 8/2004 | Coe |
| 6,774,624 B2 | 8/2004 | Anderson |
| 6,775,447 B2 | 8/2004 | Nicholson |
| 6,796,710 B2 | 9/2004 | Yates |
| 6,842,639 B1 | 1/2005 | Winston |
| 6,845,193 B2 | 1/2005 | Loeb |
| 6,852,109 B2 | 2/2005 | Winston |
| 6,892,091 B1 | 5/2005 | Ben-Haim |
| 6,926,692 B2 | 8/2005 | Katoh |
| 6,934,575 B2 | 8/2005 | Ferre |
| 6,941,166 B2 | 9/2005 | MacAdam |
| 6,951,554 B2 | 10/2005 | Johansen |
| 6,962,584 B1 | 11/2005 | Stone |
| 6,962,585 B2 | 11/2005 | Poleo, Jr. |
| 6,967,767 B2 | 11/2005 | Nicholson |
| 6,970,732 B2 | 11/2005 | Winston |
| 6,973,346 B2 | 12/2005 | Hafer |
| 6,977,504 B2 | 12/2005 | Wright |
| 6,978,783 B2 | 12/2005 | Svendsen |
| 6,980,921 B2 | 12/2005 | Anderson |

(56) References Cited

U.S. PATENT DOCUMENTS

| | | |
|---|---|---|
| 6,986,764 B2 | 1/2006 | Davenport |
| 6,986,766 B2 | 1/2006 | Caldera |
| 6,989,004 B2 | 1/2006 | Hinchliffe |
| 6,990,427 B2 | 1/2006 | Kirsch |
| 7,015,859 B2 | 3/2006 | Anderson |
| 7,050,692 B2 | 5/2006 | Harlan |
| 7,059,330 B1 | 6/2006 | Makower |
| 7,063,610 B2 | 6/2006 | Mysker |
| 7,063,695 B2 | 6/2006 | Nield |
| 7,096,148 B2 | 8/2006 | Anderson |
| 7,128,735 B2 | 10/2006 | Weston |
| 7,141,041 B2 | 11/2006 | Seward |
| 7,163,535 B2 | 1/2007 | Ryba |
| 7,167,622 B2 | 1/2007 | Temelkuran |
| 7,172,576 B2 | 2/2007 | Sawa |
| 7,174,202 B2 | 2/2007 | Bladen |
| 7,186,252 B2 | 3/2007 | Nobis |
| 7,197,354 B2 | 3/2007 | Sobe |
| 7,244,234 B2 | 7/2007 | Ridley |
| 7,247,162 B1 | 7/2007 | Thornton |
| 7,257,302 B2 | 8/2007 | Fermann |
| 7,267,674 B2 | 9/2007 | Brucker |
| 7,273,469 B1 | 9/2007 | Chan |
| 7,273,478 B2 | 9/2007 | Appling |
| 7,284,981 B2 | 10/2007 | Schmid |
| 7,288,087 B2 | 10/2007 | Winston |
| 7,303,533 B2 | 12/2007 | Johansen |
| 7,331,954 B2 | 2/2008 | Temelkuran |
| 7,349,732 B1 | 3/2008 | Kil |
| 7,357,797 B2 | 4/2008 | Ryba |
| 7,377,910 B2 | 5/2008 | Katoh |
| 7,379,648 B1 | 5/2008 | Brooks |
| 7,381,200 B2 | 6/2008 | Katoh |
| 7,386,339 B2 | 6/2008 | Strommer |
| 7,391,561 B2 | 6/2008 | Di Teodoro |
| 7,412,132 B1 | 8/2008 | Liu |
| 7,430,352 B2 | 9/2008 | Di Teodoro |
| 7,450,618 B2 | 11/2008 | Dantus |
| 7,458,967 B2 | 12/2008 | Appling |
| 7,479,147 B2 | 1/2009 | Honeycutt |
| 7,483,204 B2 | 1/2009 | Harter |
| 7,499,756 B2 | 3/2009 | Bowe |
| 7,503,914 B2 | 3/2009 | Coleman |
| 7,513,886 B2 | 4/2009 | Konstantino |
| 7,519,253 B2 | 4/2009 | Islam et al. |
| 7,524,289 B2 | 4/2009 | Lenker |
| 7,524,316 B2 | 4/2009 | Hennings |
| 7,559,329 B2 | 7/2009 | Appling |
| 7,563,262 B2 | 7/2009 | Winston |
| 7,567,596 B2 | 7/2009 | Dantus |
| 7,572,254 B2 | 8/2009 | Hebert |
| 7,575,550 B1 | 8/2009 | Govari |
| 7,580,750 B2 | 8/2009 | Doron |
| 7,606,402 B2 | 10/2009 | Heimdal |
| 7,640,053 B2 | 12/2009 | Verin |
| 7,644,715 B2 | 1/2010 | Hayes |
| 7,651,503 B1 | 1/2010 | Coe |
| 7,666,161 B2 | 2/2010 | Nash |
| 7,699,790 B2 | 4/2010 | Simpson |
| 7,720,520 B2 | 5/2010 | Willis |
| 7,722,549 B2 | 5/2010 | Nakao |
| 7,724,787 B2 | 5/2010 | Murison et al. |
| 7,779,842 B1 | 8/2010 | Russo |
| 7,782,046 B2 | 8/2010 | Anderson |
| 7,787,506 B1 | 8/2010 | Jiang |
| 7,794,407 B2 | 9/2010 | Rothenberg |
| 7,809,222 B2 | 10/2010 | Hartl |
| 7,811,281 B1 | 10/2010 | Rentrop |
| 7,828,793 B2 | 11/2010 | Thompson |
| 7,834,331 B2 | 11/2010 | Ben-Yakar |
| 7,837,677 B2 | 11/2010 | Thompson |
| 7,837,678 B2 | 11/2010 | Thompson |
| 7,846,153 B2 | 12/2010 | Hebert |
| 7,879,011 B2 | 2/2011 | Chang |
| D634,007 S | 3/2011 | Zinger |
| 7,902,817 B2 | 3/2011 | Anderson |
| 7,911,202 B2 | 3/2011 | Anderson |
| 7,912,554 B2 | 3/2011 | Capuano |
| 7,914,442 B1 | 3/2011 | Gazdzinski |
| 7,921,854 B2 | 4/2011 | Hennings |
| 7,924,892 B2 | 4/2011 | Chuang |
| 7,927,784 B2 | 4/2011 | Simpson |
| 7,929,579 B2 | 4/2011 | Hohm |
| 7,931,659 B2 | 4/2011 | Bose |
| 7,942,852 B2 | 5/2011 | Mas |
| 7,951,094 B2 | 5/2011 | Johansen |
| 7,957,790 B2 | 6/2011 | Kleen |
| 7,959,608 B2 | 6/2011 | Nash |
| 7,963,947 B2 | 6/2011 | Kurth |
| 7,963,961 B2 | 6/2011 | Thompson |
| 7,963,962 B2 | 6/2011 | Thompson |
| 7,971,341 B2 | 7/2011 | Dukesherer |
| 7,975,528 B2 | 7/2011 | Hart |
| 7,976,518 B2 | 7/2011 | Shaughnessy |
| 7,976,533 B2 | 7/2011 | Larsson |
| 7,992,573 B2 | 8/2011 | Wilson |
| 7,993,359 B1 | 8/2011 | Atwell |
| 8,016,784 B1 | 9/2011 | Hayzelden |
| 8,043,285 B2 | 10/2011 | Thompson |
| 8,059,274 B2 | 11/2011 | Splinter |
| 8,062,226 B2 | 11/2011 | Moore |
| 8,073,019 B2 | 12/2011 | Liu |
| 8,097,012 B2 | 1/2012 | Kagarise |
| 8,100,893 B2 | 1/2012 | Dadisman |
| 8,104,483 B2 | 1/2012 | Taylor |
| 8,114,429 B2 | 2/2012 | Michal |
| 8,128,951 B2 | 3/2012 | Michal |
| 8,157,747 B2 | 4/2012 | Grata |
| 8,167,805 B2 | 5/2012 | Emery |
| 8,180,428 B2 | 5/2012 | Kaiser |
| 8,182,474 B2 | 5/2012 | Winston |
| 8,189,971 B1 | 5/2012 | Laurent |
| 8,200,314 B2 | 6/2012 | Bladen |
| 8,202,268 B1 | 6/2012 | Wells |
| 8,226,675 B2 | 7/2012 | Houser |
| 8,228,347 B2 | 7/2012 | Beasley |
| 8,238,386 B2 | 8/2012 | Limpert |
| 8,246,580 B2 | 8/2012 | Hopkins |
| 8,257,722 B2 | 9/2012 | Michal |
| RE43,750 E | 10/2012 | Martinelli et al. |
| 8,280,498 B2 | 10/2012 | Jalde |
| 8,291,915 B2 | 10/2012 | Farley |
| 8,298,215 B2 | 10/2012 | Zinn |
| 8,300,669 B2 | 10/2012 | Dantus |
| 8,317,779 B2 | 11/2012 | Mirkov |
| 8,321,019 B2 | 11/2012 | Esch |
| 8,348,844 B2 | 1/2013 | Kunjan |
| 8,350,183 B2 | 1/2013 | Vogel |
| 8,353,899 B1 | 1/2013 | Wells |
| 8,354,827 B2 | 1/2013 | Werle |
| 8,354,837 B2 | 1/2013 | Anderson |
| 8,365,741 B2 | 2/2013 | Hennings |
| 8,366,735 B2 | 2/2013 | Bose |
| 8,372,009 B2 | 2/2013 | Emery |
| 8,380,289 B2 | 2/2013 | Zellers |
| 8,388,541 B2 | 3/2013 | Messerly |
| 8,388,546 B2 | 3/2013 | Rothenberg |
| 8,391,956 B2 | 3/2013 | Zellers |
| 8,413,664 B2 | 4/2013 | Appling |
| 8,414,568 B2 | 4/2013 | Harlan |
| 8,422,134 B2 | 4/2013 | Wu |
| 8,425,501 B2 | 4/2013 | Appling |
| 8,428,747 B2 | 4/2013 | Coe |
| 8,432,417 B2 | 4/2013 | Beasley |
| 8,435,235 B2 | 5/2013 | Stevens |
| 8,439,874 B2 | 5/2013 | Hertweck |
| 8,442,618 B2 | 5/2013 | Strommer |
| 8,454,536 B2 | 6/2013 | Raulerson |
| 8,460,312 B2 | 6/2013 | Bose |
| 8,465,467 B2 | 6/2013 | Gao |
| 8,465,480 B2 | 6/2013 | Winston |
| 8,470,010 B2 | 6/2013 | Jakubowski |
| 8,478,382 B2 | 7/2013 | Burnside |
| 8,486,051 B2 | 7/2013 | Larsson |

(56) References Cited

U.S. PATENT DOCUMENTS

| | | | |
|---|---|---|---|
| 8,491,925 | B2 | 7/2013 | Michal |
| 8,500,697 | B2 | 8/2013 | Kurth |
| 8,512,256 | B2 | 8/2013 | Rothenberg |
| 8,512,326 | B2 | 8/2013 | Shadduck |
| 8,535,244 | B2 | 9/2013 | Chesnin |
| 8,535,279 | B2 | 9/2013 | Schweikert |
| 8,535,360 | B2 | 9/2013 | O'Dowd |
| 8,545,432 | B2 | 10/2013 | Renati |
| 8,545,468 | B2 | 10/2013 | Fabo |
| 8,551,067 | B2 | 10/2013 | Zinger |
| 8,563,023 | B2 | 10/2013 | Michal |
| 8,587,864 | B2 | 11/2013 | Harter |
| 8,597,193 | B2 | 12/2013 | Grunwald |
| 8,636,726 | B1 | 1/2014 | Wells |
| 8,636,729 | B2 | 1/2014 | Esch |
| 8,657,785 | B2 | 2/2014 | Torrance |
| 8,668,665 | B2 | 3/2014 | Gerg |
| 8,673,332 | B2 | 3/2014 | Michal |
| 8,684,953 | B2 | 4/2014 | Cabiri |
| 8,684,994 | B2 | 4/2014 | Lev |
| 8,696,695 | B2 | 4/2014 | Patel |
| 8,702,773 | B2 | 4/2014 | Keeler |
| 8,721,634 | B2 | 5/2014 | Esch |
| 8,728,066 | B2 | 5/2014 | Shadduck |
| 8,734,825 | B2 | 5/2014 | Michal |
| 8,752,598 | B2 | 6/2014 | Denenburg |
| 8,753,325 | B2 | 6/2014 | Lev |
| 8,758,333 | B2 | 6/2014 | Harlan |
| 8,764,728 | B2 | 7/2014 | Ciavarella |
| 8,767,287 | B2 | 7/2014 | Clowes |
| 8,774,907 | B2 | 7/2014 | Rothenberg |
| 8,781,555 | B2 | 7/2014 | Burnside |
| 8,784,394 | B2 | 7/2014 | Kerr |
| 8,801,693 | B2 | 8/2014 | He |
| 8,808,074 | B2 | 8/2014 | Kim |
| 8,814,922 | B2 | 8/2014 | Hennings |
| 8,840,606 | B2 | 9/2014 | Appling |
| 8,849,382 | B2 | 9/2014 | Cox |
| 8,852,145 | B2 | 10/2014 | Denenburg |
| 8,852,165 | B2 | 10/2014 | Mackay, II |
| 8,852,178 | B2 | 10/2014 | Thompson |
| 8,855,151 | B2 | 10/2014 | Harter |
| 8,858,455 | B2 | 10/2014 | Rothenberg |
| 8,861,075 | B2 | 10/2014 | Dantus |
| 8,864,745 | B2 | 10/2014 | Ciavarella |
| 8,864,754 | B2 | 10/2014 | Appling |
| 8,864,755 | B2 | 10/2014 | Appling |
| 8,881,735 | B2 | 11/2014 | Mitchell |
| 8,887,733 | B2 | 11/2014 | Appling |
| D720,451 | S | 12/2014 | Denenburg |
| 8,905,994 | B1 | 12/2014 | Lev |
| 8,915,896 | B2 | 12/2014 | Sanders |
| 8,920,402 | B2 | 12/2014 | Nash |
| 8,937,630 | B2 | 1/2015 | Beasley |
| 8,953,648 | B2 | 2/2015 | Ishaaya |
| 8,956,376 | B2 | 2/2015 | Alvarez |
| 8,961,551 | B2 | 2/2015 | Taylor |
| 8,965,490 | B2 | 2/2015 | Lee |
| 8,971,994 | B2 | 3/2015 | Burnside |
| 8,979,792 | B2 | 3/2015 | Lev |
| 8,979,828 | B2 | 3/2015 | Fix |
| 8,998,875 | B2 | 4/2015 | Lev |
| 8,998,936 | B2 | 4/2015 | Alvarez |
| 9,028,520 | B2 | 5/2015 | Taylor |
| 9,034,362 | B2 | 5/2015 | Michal |
| 9,044,829 | B2 | 6/2015 | Crist |
| 9,050,127 | B2 | 6/2015 | Bonnette |
| 9,066,736 | B2 | 6/2015 | Islam |
| 9,066,742 | B2 | 6/2015 | Splinter |
| D734,868 | S | 7/2015 | Gilboa |
| 9,119,656 | B2 | 9/2015 | Bose |
| 9,119,907 | B2 | 9/2015 | Sherman |
| 9,125,562 | B2 | 9/2015 | Spencer |
| 9,125,578 | B2 | 9/2015 | Grunwald |
| 9,132,211 | B2 | 9/2015 | Michal |
| 9,144,431 | B2 | 9/2015 | Friedman |
| D740,946 | S | 10/2015 | Szabo |
| 9,162,038 | B2 | 10/2015 | Rottenberg |
| D742,520 | S | 11/2015 | Szabo |
| D742,521 | S | 11/2015 | Szabo |
| D742,522 | S | 11/2015 | Szabo |
| 9,198,968 | B2 | 12/2015 | Michal |
| 9,199,011 | B2 | 12/2015 | Locke |
| 9,216,056 | B2 | 12/2015 | Datta |
| 9,220,523 | B2 | 12/2015 | Taylor |
| D748,266 | S | 1/2016 | Szabo |
| 9,238,122 | B2 | 1/2016 | Malhi |
| 9,248,221 | B2 | 2/2016 | Look |
| 9,254,175 | B2 | 2/2016 | Winston |
| 9,283,039 | B2 | 3/2016 | Harlan |
| 9,283,040 | B2 | 3/2016 | Hendrick |
| 9,287,677 | B2 | 3/2016 | Clowes |
| 9,289,173 | B2 | 3/2016 | Splinter |
| 9,289,226 | B2 | 3/2016 | Taylor |
| 9,291,663 | B2 | 3/2016 | Grace |
| 9,295,373 | B2 | 3/2016 | Torrance |
| D753,289 | S | 4/2016 | Shimon |
| D753,290 | S | 4/2016 | Shimon |
| 9,308,047 | B2 | 4/2016 | Taylor |
| 9,320,530 | B2 | 4/2016 | Grace |
| 9,333,007 | B2 | 5/2016 | Escudero |
| 9,339,206 | B2 | 5/2016 | Grunwald |
| 9,339,337 | B2 | 5/2016 | Fix |
| 9,345,508 | B2 | 5/2016 | Hendrick |
| 9,345,510 | B2 | 5/2016 | Patel |
| 9,358,042 | B2 | 6/2016 | Magee |
| 9,368,931 | B2 | 6/2016 | Bragagna |
| 9,408,665 | B2 | 8/2016 | Sauro |
| 9,408,998 | B2 | 8/2016 | Alvarez |
| 9,413,896 | B2 | 8/2016 | Bowe |
| 9,421,035 | B2 | 8/2016 | Hendrick |
| 9,421,065 | B2 | 8/2016 | Splinter |
| 9,440,047 | B1 | 9/2016 | Elberse |
| 9,456,672 | B2 | 10/2016 | Condon |
| 9,456,872 | B2 | 10/2016 | Hendrick |
| 9,510,854 | B2 | 12/2016 | Mallaby |
| D775,728 | S | 1/2017 | Cavada et al. |
| 9,566,116 | B2 | 2/2017 | Winston |
| 9,603,618 | B2 | 3/2017 | Grace |
| 9,622,819 | B2 | 4/2017 | Mitchell |
| 9,623,211 | B2 | 4/2017 | Hendrick |
| 9,636,482 | B2 | 5/2017 | Mcdaniel |
| 9,642,646 | B2 | 5/2017 | Patel |
| 9,649,158 | B2 | 5/2017 | Datta |
| 9,649,159 | B2 | 5/2017 | Keeler |
| 9,655,633 | B2 | 5/2017 | Leynov |
| 9,662,478 | B2 | 5/2017 | Browd |
| 9,668,765 | B2 | 6/2017 | Grace |
| 9,668,766 | B2 | 6/2017 | Rottenberg |
| 9,675,371 | B2 | 6/2017 | Shimon |
| 9,675,415 | B2 | 6/2017 | Varghese |
| 9,676,167 | B2 | 6/2017 | Marjanovic |
| 9,678,405 | B2 | 6/2017 | Mironov |
| 9,681,882 | B2 | 6/2017 | Garrison |
| 9,694,118 | B2 | 7/2017 | Esnouf |
| 9,724,122 | B2 | 8/2017 | Hendrick |
| 9,730,756 | B2 | 8/2017 | Ben Oren |
| 9,731,098 | B2 | 8/2017 | Hendrick |
| 9,731,113 | B2 | 8/2017 | Grace |
| 9,757,200 | B2 | 9/2017 | Magee et al. |
| 9,760,518 | B2 | 9/2017 | Grossman |
| 9,763,692 | B2 | 9/2017 | Bowe |
| 9,770,536 | B2 | 9/2017 | Speck |
| 9,774,161 | B2 | 9/2017 | Zach |
| 9,775,969 | B2 | 10/2017 | Alvarez |
| 9,795,505 | B2 | 10/2017 | Yu |
| 9,801,650 | B2 | 10/2017 | Taylor |
| 9,803,973 | B1 | 10/2017 | Sajedi |
| 9,808,275 | B2 | 11/2017 | Taylor |
| 9,808,277 | B2 | 11/2017 | Nash |
| 9,814,862 | B2 | 11/2017 | Alvarez |
| 9,820,761 | B2 | 11/2017 | Garrison |
| 9,821,090 | B2 | 11/2017 | Triffo |
| 9,827,055 | B2 | 11/2017 | Hendrick |

(56) References Cited

U.S. PATENT DOCUMENTS

| | | |
|---|---|---|
| 9,844,410 B2 | 12/2017 | Mitchell |
| 9,844,485 B2 | 12/2017 | Locke |
| 9,848,952 B2 | 12/2017 | Khanna |
| 9,855,100 B2 | 1/2018 | Splinter |
| 9,855,374 B2 | 1/2018 | Sherman |
| 9,864,140 B2 | 1/2018 | Adler |
| 9,878,399 B2 | 1/2018 | Liu |
| 9,882,342 B2 | 1/2018 | Zach |
| 9,883,877 B2 | 2/2018 | Look |
| 9,883,885 B2 | 2/2018 | Hendrick |
| 9,884,184 B2 | 2/2018 | Triffo |
| 9,895,473 B2 | 2/2018 | Look |
| 9,907,614 B2 | 3/2018 | Grace |
| 9,907,615 B2 | 3/2018 | Keeler |
| 9,913,688 B1 | 3/2018 | Karavitis |
| 9,918,729 B2 | 3/2018 | Taylor |
| 9,925,316 B2 | 3/2018 | Sanders |
| 9,925,366 B2 | 3/2018 | Grace |
| 9,925,371 B2 | 3/2018 | Grace |
| 9,931,166 B2 | 4/2018 | Sauro |
| 9,937,005 B2 | 4/2018 | Hendrick |
| 9,949,753 B2 | 4/2018 | Bowe |
| 9,958,385 B2 | 5/2018 | Manassen |
| 9,962,527 B2 | 5/2018 | Laudenslager |
| 9,980,743 B2 | 5/2018 | Grace |
| 9,999,468 B2 | 6/2018 | Chalfant |
| 10,010,657 B2 | 7/2018 | Torrance |
| 10,039,569 B2 | 8/2018 | Hendrick |
| 10,046,093 B2 | 8/2018 | Michal |
| 10,052,129 B2 | 8/2018 | Grace |
| 10,079,466 B2 | 9/2018 | Ishaaya |
| 10,080,608 B2 | 9/2018 | Datta |
| 10,085,883 B2 | 10/2018 | Auld |
| 10,092,357 B2 | 10/2018 | Fix |
| 10,092,363 B2 | 10/2018 | Magee |
| 10,105,533 B2 | 10/2018 | Grace |
| 10,111,709 B2 | 10/2018 | Taylor |
| 10,117,970 B2 | 11/2018 | Michal |
| 10,135,225 B2 | 11/2018 | Weichmann |
| 10,136,913 B2 | 11/2018 | Grace |
| 10,141,709 B2 | 11/2018 | Ishaaya |
| 10,149,718 B2 | 12/2018 | Fiser |
| 10,166,375 B2 | 1/2019 | Browd |
| 10,183,150 B2 | 1/2019 | Mcdaniel |
| 10,183,151 B2 | 1/2019 | Alvarez |
| 10,201,315 B2 | 2/2019 | Peatfield |
| 10,201,387 B2 | 2/2019 | Grace |
| 10,206,745 B2 | 2/2019 | Hendrick |
| 10,219,819 B2 | 3/2019 | Grace |
| 10,226,263 B2 | 3/2019 | Look |
| 10,236,952 B1 | 3/2019 | Sadot |
| 10,245,107 B2 | 4/2019 | Sierra |
| 10,258,792 B2 | 4/2019 | Archuleta |
| 10,265,520 B2 | 4/2019 | Grace |
| 10,271,904 B2 | 4/2019 | Islam |
| 10,285,726 B2 | 5/2019 | Nguyen |
| 10,305,244 B2 | 5/2019 | Sierra |
| 10,321,931 B2 | 6/2019 | Aljuri |
| 10,342,902 B2 | 7/2019 | Bagwell |
| 10,363,398 B2 | 7/2019 | Gerrans |
| 10,391,275 B2 | 8/2019 | Burnett |
| 10,405,924 B2 | 9/2019 | Bowe |
| 10,499,944 B2 | 12/2019 | Mallaby |
| 10,531,883 B1 | 1/2020 | Deville |
| 10,603,415 B2 | 3/2020 | Look |
| 10,702,292 B2 | 7/2020 | Look |
| 10,716,583 B2 | 7/2020 | Look |
| 10,716,880 B2 | 7/2020 | Culbert |
| 10,722,253 B2 | 7/2020 | Deville |
| 10,765,592 B2 | 9/2020 | Locke |
| 10,772,683 B2 | 9/2020 | Zabar |
| 10,792,103 B2 | 10/2020 | Zabar |
| 10,835,647 B2 | 11/2020 | Sherman |
| 10,835,711 B2 | 11/2020 | Yang |
| 10,993,731 B2 | 5/2021 | Leynov |
| 11,051,832 B2 | 7/2021 | Look |
| 11,090,117 B2 | 8/2021 | Zabar |
| 11,096,712 B2 | 8/2021 | Teigen |
| 11,197,683 B1 | 12/2021 | Teigen |
| 11,247,030 B2 | 2/2022 | Browd |
| 11,259,821 B2 | 3/2022 | Buck |
| 11,317,787 B2 | 5/2022 | Hillman |
| 11,337,712 B2 | 5/2022 | Teigen |
| 11,357,951 B2 | 6/2022 | Burnett |
| 11,369,435 B2 | 6/2022 | Khan |
| 11,400,255 B1 | 8/2022 | Chou |
| 11,406,402 B2 | 8/2022 | Deville |
| 11,432,835 B2 | 9/2022 | Shaffer |
| 11,464,528 B2 | 10/2022 | Brady |
| 11,471,582 B2 | 10/2022 | Yee |
| 11,490,909 B2 | 11/2022 | Look |
| 11,497,521 B2 | 11/2022 | Mallaby |
| 11,547,426 B2 | 1/2023 | Deville |
| 11,835,707 B2 | 12/2023 | Liang |
| 2001/0001314 A1 | 5/2001 | Davison |
| 2001/0016739 A1 | 8/2001 | Goldman |
| 2001/0016749 A1 | 8/2001 | Blatter |
| 2002/0016624 A1 | 2/2002 | Patterson |
| 2002/0045811 A1 | 4/2002 | Kittrell |
| 2002/0045890 A1* | 4/2002 | Celliers .................. A61B 18/26 606/7 |
| 2002/0072680 A1 | 6/2002 | Schock |
| 2002/0095087 A1* | 7/2002 | Mourad ................ A61B 8/0816 600/442 |
| 2002/0107445 A1 | 8/2002 | Govari |
| 2002/0173811 A1 | 11/2002 | Tu |
| 2002/0183729 A1 | 12/2002 | Farr |
| 2003/0009157 A1 | 1/2003 | Levine |
| 2003/0050686 A1 | 3/2003 | Raeder-Devens |
| 2003/0078568 A1 | 4/2003 | Caldera |
| 2003/0120256 A1 | 6/2003 | Lary |
| 2003/0125709 A1 | 7/2003 | Eidenschink |
| 2003/0125719 A1 | 7/2003 | Furnish |
| 2003/0171691 A1 | 9/2003 | Casscells |
| 2003/0181823 A1 | 9/2003 | Gatto |
| 2003/0181847 A1 | 9/2003 | Bruno-Raimondi |
| 2003/0181938 A1 | 9/2003 | Roth |
| 2003/0191460 A1 | 10/2003 | Hobbs |
| 2003/0199860 A1 | 10/2003 | Loeb |
| 2003/0199960 A1 | 10/2003 | Paskar |
| 2004/0044337 A1 | 3/2004 | Shafirstein |
| 2004/0059237 A1 | 3/2004 | Narayan |
| 2004/0073141 A1 | 4/2004 | Hartley |
| 2004/0093044 A1 | 5/2004 | Rychnovsky |
| 2004/0097806 A1 | 5/2004 | Hunter |
| 2004/0102766 A1 | 5/2004 | Poleo |
| 2004/0116775 A1 | 6/2004 | Taniguchi |
| 2004/0138562 A1 | 7/2004 | Makower |
| 2004/0142654 A1 | 7/2004 | Stammer |
| 2004/0162516 A1 | 8/2004 | Mandrusov |
| 2004/0193055 A1 | 9/2004 | Field |
| 2004/0236228 A1 | 11/2004 | Stoltz |
| 2005/0015123 A1 | 1/2005 | Paithankar |
| 2005/0020901 A1 | 1/2005 | Belson |
| 2005/0049510 A1 | 3/2005 | Haldeman |
| 2005/0107738 A1 | 5/2005 | Slater |
| 2005/0113798 A1 | 5/2005 | Slater |
| 2005/0131400 A1 | 6/2005 | Hennings |
| 2005/0143670 A1 | 6/2005 | Umeda |
| 2005/0157888 A1 | 7/2005 | Yang |
| 2005/0177132 A1 | 8/2005 | Lentz |
| 2005/0187537 A1 | 8/2005 | Loeb |
| 2005/0203497 A1 | 9/2005 | Speeg |
| 2005/0244101 A1 | 11/2005 | Kitabayashi |
| 2005/0251116 A1 | 11/2005 | Steinke |
| 2005/0288655 A1 | 12/2005 | Root |
| 2006/0025697 A1 | 2/2006 | Kurzweil |
| 2006/0069417 A1 | 3/2006 | Farley |
| 2006/0095015 A1 | 5/2006 | Hobbs |
| 2006/0095059 A1 | 5/2006 | Bleich |
| 2006/0106338 A1 | 5/2006 | Chang |
| 2006/0116605 A1 | 6/2006 | Nakao |
| 2006/0137345 A1 | 6/2006 | Cho |
| 2006/0142747 A1 | 6/2006 | Appling |

(56) References Cited

U.S. PATENT DOCUMENTS

| | | |
|---|---|---|
| 2006/0149218 A1 | 7/2006 | Slater |
| 2006/0173407 A1 | 8/2006 | Shaughnessy |
| 2006/0189967 A1 | 8/2006 | Masotti |
| 2006/0217655 A1 | 9/2006 | Mtullo |
| 2006/0229515 A1 | 10/2006 | Sharareh |
| 2006/0241397 A1 | 10/2006 | Govari |
| 2006/0241495 A1 | 10/2006 | Kurtz |
| 2006/0241572 A1 | 10/2006 | Zhou |
| 2006/0253112 A1 | 11/2006 | Suarez |
| 2006/0264905 A1 | 11/2006 | Eskridge |
| 2007/0010752 A1 | 1/2007 | Korhonen |
| 2007/0016007 A1 | 1/2007 | Govari |
| 2007/0016068 A1* | 1/2007 | Grunwald ............ A61B 5/742  600/468 |
| 2007/0016177 A1 | 1/2007 | Vaynberg |
| 2007/0073160 A1 | 3/2007 | Imam |
| 2007/0073268 A1 | 3/2007 | Goble |
| 2007/0073278 A1 | 3/2007 | Johnson |
| 2007/0123846 A1 | 5/2007 | Hennings |
| 2007/0129706 A1 | 6/2007 | Katoh |
| 2007/0135791 A1 | 6/2007 | Slater |
| 2007/0149985 A1 | 6/2007 | Cole |
| 2007/0167682 A1 | 7/2007 | Goldfarb |
| 2007/0167722 A1 | 7/2007 | Bladen |
| 2007/0167738 A1 | 7/2007 | Timinger |
| 2007/0167937 A1 | 7/2007 | Brown |
| 2007/0179485 A1 | 8/2007 | Yeik |
| 2007/0179486 A1 | 8/2007 | Welch |
| 2007/0179575 A1 | 8/2007 | Esch |
| 2007/0197891 A1 | 8/2007 | Shachar |
| 2007/0197926 A1 | 8/2007 | Danehorn |
| 2007/0208400 A1 | 9/2007 | Nadkarni |
| 2007/0213616 A1 | 9/2007 | Anderson |
| 2007/0233185 A1 | 10/2007 | Anderson |
| 2007/0239000 A1 | 10/2007 | Emery |
| 2007/0270688 A1 | 11/2007 | Gelbart |
| 2007/0299353 A1 | 12/2007 | Harlev |
| 2007/0299404 A1 | 12/2007 | Katoh |
| 2007/0299431 A1 | 12/2007 | Jakubowski |
| 2008/0015406 A1 | 1/2008 | Dlugos |
| 2008/0015559 A1 | 1/2008 | Appling |
| 2008/0071333 A1 | 3/2008 | Hayes |
| 2008/0082091 A1 | 4/2008 | Rubtsov |
| 2008/0097232 A1 | 4/2008 | Rothenberg |
| 2008/0114428 A1 | 5/2008 | Trembly |
| 2008/0119869 A1 | 5/2008 | Teague |
| 2008/0146918 A1 | 6/2008 | Magnin |
| 2008/0154257 A1* | 6/2008 | Sharareh ............ A61B 8/12  606/41 |
| 2008/0154293 A1 | 6/2008 | Taylor |
| 2008/0177183 A1* | 7/2008 | Courtney ........... G02B 23/2423  600/463 |
| 2008/0177186 A1 | 7/2008 | Slater |
| 2008/0177258 A1 | 7/2008 | Govari |
| 2008/0177259 A1 | 7/2008 | Wu |
| 2008/0188843 A1 | 8/2008 | Appling |
| 2008/0188910 A1 | 8/2008 | Spaide |
| 2008/0200873 A1 | 8/2008 | Espinosa |
| 2008/0208180 A1 | 8/2008 | Cartier |
| 2008/0221560 A1 | 9/2008 | Arai |
| 2008/0234711 A1 | 9/2008 | Houser |
| 2008/0249375 A1 | 10/2008 | Obel |
| 2008/0249399 A1 | 10/2008 | Appling |
| 2008/0262465 A1 | 10/2008 | Zinger |
| 2008/0275445 A1 | 11/2008 | Kelly |
| 2008/0296263 A1 | 12/2008 | Alexander |
| 2008/0300583 A1 | 12/2008 | Foley |
| 2008/0300662 A1 | 12/2008 | Taylor |
| 2008/0319418 A1 | 12/2008 | Chong |
| 2009/0005675 A1 | 1/2009 | Grunwald |
| 2009/0018486 A1 | 1/2009 | Goren |
| 2009/0018603 A1 | 1/2009 | Mitelberg |
| 2009/0048607 A1 | 2/2009 | Rockley |
| 2009/0082760 A1 | 3/2009 | Zinn |
| 2009/0099468 A1 | 4/2009 | Thiagalingam |
| 2009/0105654 A1 | 4/2009 | Kurth |
| 2009/0125007 A1* | 5/2009 | Splinter ............ A61B 5/1079  606/15 |
| 2009/0156926 A1 | 6/2009 | Messerly |
| 2009/0163899 A1 | 6/2009 | Burton |
| 2009/0177090 A1 | 7/2009 | Grunwald |
| 2009/0182281 A1 | 7/2009 | Kurth |
| 2009/0209907 A1 | 8/2009 | Grata |
| 2009/0234328 A1 | 9/2009 | Cox |
| 2009/0234344 A1 | 9/2009 | Lavender |
| 2009/0234378 A1 | 9/2009 | Escudero |
| 2009/0247823 A1 | 10/2009 | Yamamoto |
| 2009/0254078 A1 | 10/2009 | Just |
| 2009/0259124 A1 | 10/2009 | Rothenberg |
| 2009/0264769 A1 | 10/2009 | Sadaka |
| 2009/0264875 A1 | 10/2009 | Appling |
| 2009/0299351 A1 | 12/2009 | Dadisman |
| 2010/0010393 A1 | 1/2010 | Duffy |
| 2010/0016857 A1 | 1/2010 | Mckenna |
| 2010/0036227 A1 | 2/2010 | Cox |
| 2010/0036284 A1 | 2/2010 | Laynes |
| 2010/0049061 A1 | 2/2010 | Wilson |
| 2010/0057056 A1 | 3/2010 | Gurtner |
| 2010/0069897 A1 | 3/2010 | Spikker |
| 2010/0125253 A1 | 5/2010 | Olson |
| 2010/0152596 A1 | 6/2010 | Griffiths |
| 2010/0152720 A1 | 6/2010 | Sauro |
| 2010/0168572 A1 | 7/2010 | Sliwa |
| 2010/0168823 A1 | 7/2010 | Strisower |
| 2010/0191178 A1 | 7/2010 | Ross |
| 2010/0198150 A1 | 8/2010 | Michal |
| 2010/0198240 A1 | 8/2010 | Simpson |
| 2010/0198247 A1 | 8/2010 | Chang |
| 2010/0204569 A1 | 8/2010 | Burnside |
| 2010/0210995 A1 | 8/2010 | Jakubowski |
| 2010/0222664 A1 | 9/2010 | Lemon |
| 2010/0234925 A1 | 9/2010 | Harris |
| 2010/0280504 A1* | 11/2010 | Manzke ............ A61B 5/0084  606/14 |
| 2010/0286791 A1 | 11/2010 | Goldsmith |
| 2010/0296531 A1 | 11/2010 | Hohm |
| 2010/0305475 A1 | 12/2010 | Hinchliffe |
| 2010/0305715 A1 | 12/2010 | Mathis |
| 2010/0312263 A1 | 12/2010 | Moberg |
| 2010/0317981 A1 | 12/2010 | Grunwald |
| 2010/0318026 A1 | 12/2010 | Grunwald |
| 2010/0318067 A1 | 12/2010 | Klima |
| 2010/0331712 A1 | 12/2010 | Rothenberg |
| 2011/0015533 A1 | 1/2011 | Cox |
| 2011/0034922 A1 | 2/2011 | Thompson |
| 2011/0060300 A1 | 3/2011 | Weig |
| 2011/0134523 A1 | 6/2011 | Wu |
| 2011/0172586 A1 | 7/2011 | Hennings |
| 2011/0196248 A1 | 8/2011 | Grunwald |
| 2011/0201990 A1 | 8/2011 | Franano |
| 2011/0208075 A1 | 8/2011 | Giese |
| 2011/0213260 A1 | 9/2011 | Keel |
| 2011/0213446 A1 | 9/2011 | Tucek |
| 2011/0230763 A1 | 9/2011 | Emery |
| 2011/0230796 A1 | 9/2011 | Emery |
| 2011/0251519 A1 | 10/2011 | Romoscanu |
| 2011/0270238 A1 | 11/2011 | Rizq |
| 2011/0282188 A1 | 11/2011 | Burnside |
| 2011/0295108 A1 | 12/2011 | Cox |
| 2012/0046562 A1 | 2/2012 | Powers |
| 2012/0059270 A1 | 3/2012 | Grunwald |
| 2012/0065490 A1* | 3/2012 | Zharov ............ A61B 5/412  600/407 |
| 2012/0083702 A1 | 4/2012 | Ingold, Jr. |
| 2012/0095319 A1 | 4/2012 | Kondrosky |
| 2012/0109023 A1 | 5/2012 | Emery |
| 2012/0109191 A1 | 5/2012 | Marano, Jr. |
| 2012/0130228 A1 | 5/2012 | Zellers |
| 2012/0130415 A1 | 5/2012 | Tal |
| 2012/0136242 A1 | 5/2012 | Qi |
| 2012/0143029 A1 | 6/2012 | Silverstein |
| 2012/0209206 A1 | 8/2012 | Scandone, Jr. |
| 2012/0220854 A1 | 8/2012 | Messerly |
| 2012/0265183 A1 | 10/2012 | Tulleken |

(56) References Cited

U.S. PATENT DOCUMENTS

| | | |
|---|---|---|
| 2012/0269676 A1 | 10/2012 | Houser |
| 2012/0271170 A1 | 10/2012 | Emelianov |
| 2012/0283554 A1 | 11/2012 | Schweikert |
| 2013/0005236 A1 | 1/2013 | Kim |
| 2013/0006102 A1 | 1/2013 | Wilkes |
| 2013/0006229 A1 | 1/2013 | Delaney |
| 2013/0012839 A1 | 1/2013 | Emery |
| 2013/0018248 A1 | 1/2013 | Hurezan |
| 2013/0060116 A1 | 3/2013 | Messerly |
| 2013/0096545 A1 | 4/2013 | Laudenslager |
| 2013/0112606 A1 | 5/2013 | Fisher |
| 2013/0123597 A1 | 5/2013 | Rothenberg |
| 2013/0131643 A1 | 5/2013 | Parodi |
| 2013/0131644 A1 | 5/2013 | Parodi |
| 2013/0165815 A1 | 6/2013 | Zinn |
| 2013/0197306 A1 | 8/2013 | Armand |
| 2013/0211379 A1 | 8/2013 | Clair |
| 2013/0231660 A1 | 9/2013 | Edwards |
| 2013/0245434 A1 | 9/2013 | Messerly |
| 2013/0261614 A1 | 10/2013 | Appling |
| 2013/0274674 A1 | 10/2013 | Fischell |
| 2013/0289546 A1 | 10/2013 | Stoltz |
| 2013/0296693 A1 | 11/2013 | Wenzel |
| 2013/0303886 A1 | 11/2013 | Ludwin |
| 2013/0304034 A1 | 11/2013 | Cabiri |
| 2013/0310680 A1* | 11/2013 | Werahera ............ A61B 5/0035 600/478 |
| 2013/0338517 A1 | 12/2013 | Rothenberg |
| 2013/0345541 A1 | 12/2013 | Nau, Jr. |
| 2014/0031674 A1 | 1/2014 | Newman |
| 2014/0031800 A1 | 1/2014 | Ben Oren |
| 2014/0046261 A1 | 2/2014 | Newman |
| 2014/0052114 A1 | 2/2014 | Ben-Oren |
| 2014/0074049 A1 | 3/2014 | Veldhuijzen |
| 2014/0081118 A1 | 3/2014 | Reinhold, Jr. |
| 2014/0081292 A1 | 3/2014 | Moll |
| 2014/0107475 A1 | 4/2014 | Cox |
| 2014/0133814 A1 | 5/2014 | Stevens |
| 2014/0142398 A1 | 5/2014 | Patil |
| 2014/0180034 A1 | 6/2014 | Hoseit |
| 2014/0188062 A1 | 7/2014 | James |
| 2014/0188133 A1 | 7/2014 | Misener |
| 2014/0243659 A1 | 8/2014 | Rothenberg |
| 2014/0263207 A1 | 9/2014 | Liu |
| 2014/0275918 A1 | 9/2014 | Muse |
| 2014/0275922 A1 | 9/2014 | Ciavarella |
| 2014/0276682 A1 | 9/2014 | Hendrick |
| 2014/0276689 A1 | 9/2014 | Grace |
| 2014/0296767 A1 | 10/2014 | Franano |
| 2014/0303492 A1 | 10/2014 | Burnside |
| 2014/0343398 A1 | 11/2014 | He |
| 2014/0343482 A1 | 11/2014 | Mackay |
| 2014/0358134 A1 | 12/2014 | Appling |
| 2015/0018701 A1 | 1/2015 | Cox |
| 2015/0025402 A1 | 1/2015 | Rothenberg |
| 2015/0025465 A1 | 1/2015 | Ciavarella |
| 2015/0038953 A1 | 2/2015 | Varghese |
| 2015/0057648 A1 | 2/2015 | Swift |
| 2015/0080716 A1 | 3/2015 | Powers |
| 2015/0112189 A1 | 4/2015 | Carron |
| 2015/0164573 A1 | 6/2015 | Delaney |
| 2015/0182168 A1 | 7/2015 | Draper |
| 2015/0223775 A1 | 8/2015 | Hamilton, Jr. |
| 2015/0238091 A1* | 8/2015 | Iyer ................. A61B 5/0095 600/407 |
| 2015/0282734 A1 | 10/2015 | Schweikert |
| 2015/0320480 A1 | 11/2015 | Cosman, Jr. |
| 2015/0359595 A1 | 12/2015 | Ben Oren et al. |
| 2016/0029902 A1 | 2/2016 | Smith |
| 2016/0030647 A1 | 2/2016 | Franano |
| 2016/0030648 A1 | 2/2016 | Franano |
| 2016/0135712 A1 | 5/2016 | Holochwost |
| 2016/0135883 A1 | 5/2016 | Herscher |
| 2016/0320210 A1 | 11/2016 | Nelson |
| 2017/0100142 A1 | 4/2017 | Look |
| 2017/0189124 A1 | 7/2017 | Canfield |
| 2017/0215837 A1 | 8/2017 | Ramakrishna |
| 2017/0246444 A1 | 8/2017 | Domatch |
| 2017/0333000 A1 | 11/2017 | Nystrom |
| 2018/0028794 A1 | 2/2018 | Browd |
| 2018/0036513 A1 | 2/2018 | Cruz, Jr. |
| 2018/0078171 A1 | 3/2018 | Cruz, Jr. |
| 2018/0104390 A1 | 4/2018 | Kilcran |
| 2018/0207397 A1 | 7/2018 | Look |
| 2019/0015157 A1 | 1/2019 | Grace |
| 2019/0056242 A1 | 2/2019 | Foster |
| 2019/0216476 A1 | 7/2019 | Barry |
| 2019/0290815 A1 | 9/2019 | Antonicelli |
| 2019/0336732 A1 | 11/2019 | Laudenslager |
| 2019/0343445 A1 | 11/2019 | Burnett |
| 2020/0009301 A1 | 1/2020 | Yee |
| 2020/0015840 A1 | 1/2020 | Mallaby |
| 2020/0022711 A1 | 1/2020 | Look |
| 2020/0179576 A1 | 6/2020 | Wood |
| 2020/0179578 A1 | 6/2020 | Look |
| 2020/0206457 A1 | 7/2020 | Boling |
| 2020/0281610 A1 | 9/2020 | Look |
| 2020/0289722 A1 | 9/2020 | Culbert |
| 2020/0297362 A1 | 9/2020 | Deville |
| 2020/0337772 A1 | 10/2020 | Ben-Oren |
| 2020/0367917 A1 | 11/2020 | Teigen |
| 2020/0397957 A1 | 12/2020 | Teigen |
| 2021/0038306 A1 | 2/2021 | Mcloughlin |
| 2021/0069467 A1 | 3/2021 | Garrison |
| 2021/0093756 A1 | 4/2021 | Sherman |
| 2021/0109340 A1 | 4/2021 | Kaicheng |
| 2021/0128182 A1 | 5/2021 | Teigen |
| 2021/0315598 A1 | 10/2021 | Buck |
| 2022/0008090 A1 | 1/2022 | Look |
| 2022/0031930 A1 | 2/2022 | Downey |
| 2022/0096104 A1 | 3/2022 | Ogle |
| 2022/0152345 A1 | 5/2022 | Simiele |
| 2022/0152346 A1 | 5/2022 | Burnett |
| 2022/0176031 A1 | 6/2022 | Cheng |
| 2022/0193366 A1 | 6/2022 | Cheng |
| 2022/0211437 A1 | 7/2022 | Ben-Oren |
| 2022/0218365 A1 | 7/2022 | Deville |
| 2022/0257268 A1 | 8/2022 | Culbert |
| 2022/0280171 A1 | 9/2022 | Teigen |
| 2022/0338887 A1 | 10/2022 | Nair |
| 2022/0339338 A1 | 10/2022 | Nair |
| 2022/0339339 A1 | 10/2022 | Nair |
| 2022/0378443 A1 | 12/2022 | Look |
| 2022/0378450 A1 | 12/2022 | Culbert |
| 2022/0379081 A1 | 12/2022 | Look |
| 2022/0379082 A1 | 12/2022 | Look |
| 2022/0379083 A1 | 12/2022 | Look |
| 2022/0379084 A1 | 12/2022 | Look |
| 2022/0379085 A1 | 12/2022 | Look |
| 2022/0379086 A1 | 12/2022 | Look |
| 2022/0387052 A1 | 12/2022 | Look |
| 2022/0387752 A1 | 12/2022 | Look |
| 2022/0387753 A1 | 12/2022 | Look |
| 2023/0026412 A1 | 1/2023 | Teigen |
| 2023/0099283 A1 | 3/2023 | Deville |
| 2023/0100426 A1 | 3/2023 | Deville |
| 2023/0301708 A1 | 9/2023 | Mickelsen |
| 2023/0329780 A1 | 10/2023 | Liu |
| 2023/0408329 A1 | 12/2023 | Zabar |

FOREIGN PATENT DOCUMENTS

| | | |
|---|---|---|
| CA | 1326800 | 2/1994 |
| CA | 2820664 | 12/2013 |
| CA | 3017252 C | 12/2019 |
| CA | 3105728 A1 | 1/2020 |
| CN | 1049287 A | 2/1991 |
| CN | 1261774 A | 8/2000 |
| CN | 2713994 | 8/2005 |
| CN | 101170959 | 4/2008 |
| CN | 101795630 | 8/2010 |
| CN | 101816557 A | 9/2010 |
| CN | 101925333 A | 12/2010 |
| CN | 102209490 A | 10/2011 |

(56) References Cited

FOREIGN PATENT DOCUMENTS

| | | |
|---|---|---|
| CN | 102665541 A | 9/2012 |
| CN | 102821679 A | 12/2012 |
| CN | 103189009 A | 7/2013 |
| CN | 103750858 A | 4/2014 |
| CN | 104718000 A | 6/2015 |
| CN | 102821679 B | 4/2016 |
| CN | 112533550 A | 3/2021 |
| DE | 8905642 U1 | 8/1989 |
| DE | 60316175 T2 | 5/2008 |
| EP | 0311295 A2 | 4/1989 |
| EP | 0341943 | 11/1989 |
| EP | 1174082 A1 | 1/2002 |
| EP | 1567082 | 8/2005 |
| EP | 1610855 A2 | 1/2006 |
| EP | 1709987 | 10/2006 |
| EP | 1887940 A2 | 2/2008 |
| EP | 2134402 A2 | 12/2009 |
| EP | 2152150 A1 | 2/2010 |
| EP | 2170162 A1 | 4/2010 |
| EP | 2219526 A2 | 8/2010 |
| EP | 2226031 A1 | 9/2010 |
| EP | 2247234 A1 | 11/2010 |
| EP | 2265175 A2 | 12/2010 |
| EP | 2313143 A1 | 4/2011 |
| EP | 2337491 A1 | 6/2011 |
| EP | 2399507 | 12/2011 |
| EP | 2440122 A1 | 4/2012 |
| EP | 2474268 A1 | 7/2012 |
| EP | 2482719 A1 | 8/2012 |
| EP | 2517622 A2 | 10/2012 |
| EP | 2531098 A1 | 12/2012 |
| EP | 2575611 A1 | 4/2013 |
| EP | 2632360 A1 | 9/2013 |
| EP | 2712547 A1 | 4/2014 |
| EP | 3025175 A1 | 6/2016 |
| EP | 3423124 A4 | 10/2019 |
| EP | 3806757 A4 | 5/2022 |
| ES | 2465915 T3 | 6/2014 |
| GB | 1533204 A | 11/1978 |
| IL | 126284 A | 12/2002 |
| IL | 224434 A | 12/2016 |
| JP | S6159236 A | 3/1986 |
| JP | H01178011 | 7/1989 |
| JP | 2000131412 A | 5/2000 |
| JP | 2011504766 A | 2/2011 |
| JP | 2013518676 | 5/2013 |
| JP | 5452500 B2 | 3/2014 |
| JP | 6083604 U | 12/2014 |
| JP | 2021532850 A | 12/2021 |
| KR | 20210035811 A | 4/2021 |
| WO | 9214515 A1 | 9/1992 |
| WO | 9509575 A1 | 4/1995 |
| WO | 9834673 | 8/1998 |
| WO | 0245601 A1 | 6/2002 |
| WO | 03057060 A1 | 7/2003 |
| WO | 2004021886 A1 | 3/2004 |
| WO | 2004043280 A1 | 5/2004 |
| WO | 2007125638 | 11/2007 |
| WO | 2008124790 | 10/2008 |
| WO | 2008129326 A1 | 10/2008 |
| WO | 2008131017 A2 | 10/2008 |
| WO | 2009003138 A1 | 12/2008 |
| WO | 2009070616 A2 | 6/2009 |
| WO | 2009085489 A2 | 7/2009 |
| WO | 2009120240 A1 | 10/2009 |
| WO | 2009137262 A2 | 11/2009 |
| WO | 2010022370 A1 | 2/2010 |
| WO | 2010030820 A1 | 3/2010 |
| WO | 2010144922 A1 | 12/2010 |
| WO | 2011019760 A2 | 2/2011 |
| WO | 2011041450 A1 | 4/2011 |
| WO | 2011097312 A1 | 8/2011 |
| WO | 02011107117 A1 | 9/2011 |
| WO | 2012024577 A2 | 2/2012 |
| WO | 2012040487 A1 | 3/2012 |
| WO | 2012058461 A1 | 5/2012 |
| WO | 2012064769 A2 | 5/2012 |
| WO | 2012068365 A2 | 5/2012 |
| WO | 2012114333 A1 | 8/2012 |
| WO | 2012114334 A1 | 8/2012 |
| WO | 2012151396 | 11/2012 |
| WO | 2013172970 A1 | 11/2013 |
| WO | 2014118738 A1 | 8/2014 |
| WO | 2016044411 A1 | 3/2016 |
| WO | 2017127722 A1 | 7/2017 |
| WO | 2017155994 A1 | 9/2017 |
| WO | 2018019829 A1 | 2/2018 |
| WO | 2018053115 A1 | 3/2018 |

OTHER PUBLICATIONS

Alexander (1991) Tissue pathologies uncovered by spectral analysis. J Clin Laser Med Surg 9(4): 238-241.

Almeida, et al, RF Endovenous ClosureFAST Versus Laser Ablation for the Treatment of Great Saphenous Reflux: A Multicenter, Single-blinded, Randomized Study, J Vase Interv Radiol 2009, 20:752-759.

Ambrosini, V. et al., Excimer laser in acute myocardial infarction: Single centre experience on 66 patients, International Journal of Cardiology 127 (2008) 98-102.

Chong, et al, Technical Tip: Cold Saline Infiltration Instead of Local Anaesthetic in Endovenous Laser Treatment, Phlebology vol. 21 No. 2, 2006, oo 88-89.

Coe, M. Sean, et al., Excimer Laser Lead Extraction Catheter with Increased Laser Parameters, Lasers in Surgery: Advanced Characterization, Therapeutics, and Systems XI R. Rox Anderson et al., Editors, Proceedings of SPIE vol. 4244 (2001), 8 pages.

Cordis® Outback® Re-Entry Catheter, Chronic Total Occlusion (CTO) Technologies brochure, Dec. 2008.

Cummings et al., (2004) Gastric bypass for obesity: mechanisms of weight loss and diabetes resolution. J Clin Endocrinol Metab 89(6): 2608-15.

Dimatteo, et al (2010) EUS-guided Nd: YAG laser ablation of normal pancreatic tissue: a pilot study in a pig model, Gastrointest. Endosc. 72(2): 358-63.

Doganci, et al, Comparison of 980 nm Laser and Bare-tip Fibre with 1470 nm Laser and Radial Fibre in the Treatment of Great Saphenous Vein Varicosities: A Prospective Randomised Clinical Trial, Eur J Vase Endovasc Surg, 2010, pp. 254-259.

Du, etal, PhotochemCAD: A Computer-Aided Design and Reseach Tool in Photochemistry, Photochemisty and Photobiology, 1998, 68(2), pp. 141-142.

Dunst, et al, Diffuse Phlegmonous Phlebitis After Endovenous Laser Treatment of the Greater Saphenous Vein, Journal of Vascular Surgery, vol. 43 No. 5, 2006, pp. 1056-1058.

Elias, et al, Treating the Small Saphenous Vein, Endovascular Today, Aug. 2008, pp. 60-64.

Endovascular Today, Supplement to Endovascular Today, Nov./Dec. 2004, pp. S1-S35.

Esenaliev, R.O., et al, Laser Ablation of Atherosclerotic Blood Vessel Tissue Under Various Irradiation Conditions, IEEE Transactions on Biomedical Engineering, vol. 36, No. 12, (Dec. 1989) pp. 1188-1194.

Fleischer and Sharma (2008) Endoscopic Ablation of Barrett's Esophagus Using the Halo System. Dig Dis 26(4): 280-284.

Fleischer and Sharma (2009) Endoscopic Ablation of Barrett's Esophagus Using the Halo® System. Dig Dis 26(4): 280-284.

Fleischer and Sharma, Endoscopic Ablation of Barrett's Esophagus Using the HALO® System. Mönkemüller K, Wilcox CM, Muñoz-Navas M (eds):Interventional and Therapeutic Gastrointestinal Endoscopy. Front Gastrointest Res. Basel, Karger, 2010, vol. 27, pp. 140-146.

Grundfest et al., (1985) Pulsed ultraviolet lasers and the potential for safe laser angioplasty. Am J Surg 150(2): 220-226.

Herzog, Amir et al., Spatial-coherence effect on damage occurrence in multimode optical fibers using nanosecond pulses, Advanced Photonics © 2014 OSA, 1 page.

(56) References Cited

OTHER PUBLICATIONS

Hongbao, Ma et al., Interaction of excimer laser with blood components and thrombosis, Life Science Journal, vol. 5, Mo 3, 2008, 8 pages.
International Preliminary Report on Patentability, PCT/IL2017/050498, Nov. 6, 2018, 7 pages.
International Search Report 03763292_SESR, dated Jan. 28, 2010.
International Search Report 04256733 ESR, dated Jan. 14, 2005.
International Search Report EP03252158_AESR dated Aug. 29, 2003, 1 page.
International Search Report for PCT/IL2015/050480 Completed Oct. 19, 2015; Mailed Oct. 21, 2015, 6 pages.
International Search Report PCT-US-03-21213 ISR, dated Mar. 29, 2004.
International Search Report PCT-US-08-059791 IPRP, dated Nov. 4, 2008.
International Search Report PCT-US-08-059791 ISR, dated Nov. 4, 2008.
International Search Report PCT-US-08-059791 WOSA, Nov. 4, 2008.
International Search Report PCT/IL2017/050498 Completed Aug. 15, 2017; Mailed Sep. 10, 2017, 4 pages.
International Search Report, PCT/IB2014/058688, Jun. 15, 2014, 5 pages.
International Search Report, PCT/IL2012/000088, Jul. 17, 2012, 2 pages.
International Search Report, PCT/IL2012/000089, Jul. 13, 2012, 2 pages.
International Search Report, PCT/IL2015/050529, Sep. 16, 2015, 5 pages.
International Search Report, PCT/IL2017/050498, Nov. 17, 2017, 4 pages.
Jackson (2009) High-power and highly efficient diode-cladding-pumped holmium-doped flouride fiber laster operating at 2.94 microm. Opt Lett 34(15):2327-2329.
Jackson et al., (2007) Directly diode-pumped holmium fiber lasers. Optics Letters 32(17): 2496-2498.
Jansen, E. Duco et al., Excimer, Ho: YAG, and Q-switched Ho: YAG ablation of aorta: a comparison of temperatures and tissue damage in vitro, Applied Optics, vol. 32, No. 4, Feb. 1, 1993, 9 pages.
Kabnick, et al., EVL Ablation Using Jacket-Tip Laser Fibers, Endovascular Today, Jul. 2009, pp. 77-81.
Leopardi, et al, Systematic Review of Treatments for Varicose Veins, Ann Vasc Surg 2009: 23:264-276.
Litvack, et al, (1988) Pulsed laser angioplasty: wavelength power and energy dependencies relevant to clinical application. Lasers Surg Med 8(1): 60-65.
Mackay, et al, Saphenous Vein Ablation, Endovascular Today, Mar. 2006, pp. 44-48.
Memetoglu, et al, Combination Technique of Tumescent Anesthesia During Endovenous Laser Therapy of Saphenous Vein Insufficiency, Interactive Cardiovascular and Thoracic Surgery 11, 2010, pp. 774-778.
Min, et al, Endovenous Laser Treatment of Saphenous Vein Reflux: Long-Term Results, J Vasc Interv Radiol 2003, 14:991-996.
Min, et al, Endovenous Laser Treatment of the Incompetent Greater Saphenous Vein, J Vasc Interv Radiol 2001, 12:1167-1171.
Murphy-Chutorian et al., (1985) Selective absorption of ultraviolet laser energy by human atherosclerotic plaque treated with tetracycline. Am J Cardiol 55(11): 1293-1297.
Neev, Joseph, Ph. D., Two-Lasers Assisted Ablation: A Method for Enhancing Conventional Laser Ablation of Materials, Lasers in Surgery and Medicine 19:130-134 (1996).
Oraevsky, Alexander A., Plasma Mediated Ablation of Biological Tissues with Nanosecond-to-Femtosecond Laser Pulses: Relative Role of Linear and Nonlinear Absorption, IEEE Journal of Selected Topics in Quantum Electronics, vol. 2, No. 4, Dec. 1996, 9 pages.

Pace, E., et al, Fast Stable Visible-blind and Highly Sensitive CVD Diamond UV Photo Detectors for Laboratory and Space Applications, Diamond and Related Materials, vol. 9, Issues 3-6 (Apr.-May 2000) pp. 987-993.
Pandya et al (2015) Radiofrenquency ablation of pancreatic ductal adenocarcinoma: The past, the present and the future, World Journal of Gastrointestinal Oncology, Feb. 15, 2015, vol. 7, No. 2, pp. 6-11.
Papaioannou, Thanassis, et al., Excimer Laser Assisted Thrombolysis: The Effect of Fluence, Repetition Rate, and Catheter Size, Lasers in Surgery: Advanced Characterization, Therapeutics, and systems XII, Kenneth E. Bartels et al., Editors, Proceedings of SPIE vol. 4609 (2002), 6 pages.
Papaioannou, Thanassis, et al., Particulate debris analysis during excimer laser thrombolysis: An in-vitro study., Lasers in Surgery: Advanced Characterization, Therapeutics, and systems XII, Kenneth E. Bartels et al., Editors, Proceedings of SPIE vol. 4609 (2002), 9 pages.
Park, et al, Fluoroscopy-Guided Endovenous Foam Sclerotherapy Using a Microcatheter in Varicose Tributaries Followed by Endovenous Laser Treatment of Incompetent Saphenous Veins: Technocal Feasibility and Early Results, Dermatol Surg 2009, 35:804-812.
Partial European Search Report, EP19177412, Jul. 17, 2019, 1 page.
Pories and Albrecht (2001) Etiology of type II diabetes mellitus: role of the foregut. World J Surg 25(4): 527-31.
Pories et al., (2011) The surgical treatment of type two diabetes mellitus. Surg Clin North Am 91(4): 821-36.
Prince, M.R., et al, Preferential Light Absorption in Atheromas in Vitro—Implications for Laser Angioplasty, J of Clin Investigation, vol. 78(1) (Jul. 1986) pp. 295-302.
Proebstle, et al, Thermal Damage of The Inner Vein Wall During Endovenous Laser Treatment: Key Role of Energy Absorption by Intravascular Blood, Dermatol Surf 2002:28596-600.
Proebstle, et al, Treatment of the Incompetent Great Saphenous Vein by Endovenous RF Powered Segmental Therman Ablation: First Clinical Experience, Journal of Vascular Surgery, 2008, pp. 151-156.e1.
Richou, B, et al., Delivery of 10-mw Nd:YAG Laser Pulses by Large Core Optical Fibers: Dependence of the Laser-Itensity Profile on Beam Propagation, Applied Optics, vol. 36, No. 7 (1997) pp. 1610-1614.
Ronkainen et al., (2005) Prevalence of Barrett's esophagus in the general population: an endoscopic study. Gastroenterology 129(6): 1825-1831.
Ronkainen, Jukka, et al., Prevalence of Barrett's Esophagus in the General Population: An Endoscopic Study, Gastroenterology 2005; 129:1825-1831.
Rubino and Gagner (2002) Potential of surgery for curing type 2 diabetes mellitus. Ann Surg 236(5): 554-559.
Rubino and Marescaux (2004) Effect of duodenal-jejunal exclusion in a non-obese animal model of type 2 diabetes: a new perspective for an old disease. Ann Surg 239(1): 1-11.
Rubino et al, (2006) The mechanism of diabetes control after gastrointestinal bypass surgery reveals a role of the proximal small intestine in the pathophysiology of type 2 diabetes. Ann Surg 244(5): 741-749.
Rubino et al., (2004) The early effect of the Roux-en-Y gastric bypass on hormones involved in body weight regulation and glucose metabolism. Ann Surg 240(2): 236-42.
Schmedt, et al, Evaluation of Endovenous RF Ablation and Laser Therapy with Endoluminal Optical Coherence Tomography in an Ex Vivo Model, Journal of Vasc Surg, 2007, pp. 1047-1058.
Schmidt-Uhling, T, et al, New Simplified Coupling Scheme for the Delivery of 20MW Nd:YAG Laser Pulses by Large Core Optical Fibers, Applied Physics B, Lasers and Optics, vol. 72, (2001) pp. 183-186.
Schwarz, et al, Endovenous Laser Ablation of Varicose Veins with the 1470-nm Diode Laser, Journal of Vasc Surg vol. 51, No. 6, pp. 1474-1478. (2010).
Schwarzwälder and Zeller (2010) Debulking procedures: potential device specific indications. Tech Vasc Interv Radiol 13(1): 43-53.

(56) References Cited

OTHER PUBLICATIONS

Shangguan, HanQun, et al., Microsecond Laser Ablation of Thrombus and Gelatin Under Clear Liquids: Contact Versus Noncontact, IEEE Journal of Selected Topics in Quantum Electronics, vol. 2, No. 4, Dec. 1996, 8 pages.
Shuto, et al., Fiber Fuse Phenomenon in Step-Index Single-Mode Optical Fibers, IEEE Journal of Quantum Electronics, vol. 40, No. 8, 2004, pp. 1113-1121.
Sikorska and Pan (2004) The Effect of Waveguide Material and Shape on Acoustic Emission Transmission Characteristics, Part 1: Traditional Features. Journal of Acoustic Emission 22: 264-273.
Skorczakowski et al., (2010) Mid-infrared Q-switched Er:YAG laser for medical applications. Laser Physics Letters 7(7): 498-504.
Smucler, et al, Invasive Leg Veins Treatment with 1064/1319 Nd:YAG Laser/Combination with Dye Laser Treatment, SPIE vol. 3590, pp. 78-87. (1999).
Tabbara, et al, Laser-Fused Biologic Vascular Graft Anastomoses, Journal of Investigative Surgery, 6:3, 289-295. (1993).
Taylor, et al, Long Saphenous Vein Stripping Under Local Anaesthesia, Annals of the Royal College of Surgeons of England, 1981, vol. 63, pp. 206-207.
Taylor, Rod S., et al, Dependence of the XeCI Laser Cut Rate of Plaque on the Degree of Calcification, Laser Fluence, and Optical Pulse Duration, Lasers in Surgery and Medicine, vol. 10, Issue 5, (1990) pp. 414-419.
Topaz, On, M.D. et al., "Optimally Spaced" Excimer Laser Coronary Catheters: Performance Analysis, Journal of Clinical Laser Medicine & Surgery vol. 19, No. 1, 2001, Mary Ann Liebert, Inc., pp. 9-14.
Verdam et al., (2012) An update on less invasive and endoscopic techniques mimicking the effect of bariatric surgery. J Obes 2012:597871, pp. 1-11.
Vuylsteke, et al, Intraluminal Fibre-Tip Centring Can Improve Endovenous Laser Ablation: A Histological Study, Eur J Vase Endovasc Surg, 2009, pp. 1-7.
Wang et al., (2013) Total transmission and total reflection of acoustic wave by zero index metamatehals loaded with general solid defects. Journal of Applied Physics 114(19): 194502, pp. 1-5.
Written Opinion of the International Searching Authority PCT/IL2017/050498; Mailed Sep. 10, 2017, 6 pages.
Written Opinion of the International Searching Authority, PCT/IL2012/000089, Jul. 13, 2012, 8 pages.
Written Opinion of the International Searching Authority, PCT/IL2014/058688, Jun. 15, 2014, 6 pages.
Written Opinion of the International Searching Authority, PCT/IL2015/050480, Oct. 21, 2015, 7 pages.
Written Opinion of the International Searching Authority, PCT/IL2015/050529, Sep. 16, 2015, 5 pages.
Written Opinion of the International Searching Authority, PCT/IL2017/050498, Nov. 9, 2017, 6 pages.
International Preliminary Report on Patentability issued in App. No. PCT/IB2022/061041, dated May 30, 2024, 17 pages.
Chinese Office Action (with English translation) for App. No. CN201780056055.6, dated May 8, 2021, 14 pages.
Dilaveris, P. E. et al. P-Wave Dispersion: A Novel Predictor of Paroxysmal Atrial Fibrillation, A. N. E., 2001, pp. 159-165, 6(2).
EPO search report in EPO application 15777248.4-1657/3128906 (counterpart EPO application) dated Oct. 25, 2017, 7 pages.
Feld, G. K. et al. Radiofrequency Catheter Ablation for the Treatment of Human Type 1 Atrial Flutter, Identification of a Critical Zone in the Reentrant Circuit by Endocardial Mapping Techniques, Circulation, pp. 1233-1240, Oct. 1992 vol. 86, No. 4, American Heart Association, Dallas, TX.
International Search Report and Written Opinion dated Nov. 29, 2017 issued in PCT Patent Application No. PCT/US2017/051544.
International Search Report and Written Opinion for PCT/US2018/066656 dated Mar. 25, 2019.
International Search Report and Written Opinion issued in PCT/US2017/050619 on Nov. 6, 2017 (7 pages).
International search report in counterpart PCT/2015/024893, dated Aug. 19, 2015, 6 pages.
Japanese Office Action in JP App. No. 2017-504605 (counterpart to the present application) 8 pages.
Jenkins, J. M. Computer Diagnosis of Abnormal Cardiac Rhythms Employing a New P-Wave Detector for Internal Measurement, Computers and Biomedical Research, 1978, pp. 17-33, vol. 11, Academic Press.
Jenkins, J. M. et al. Computer Diagnosis of Supraventricular and Ventricular Arrhythmias, A New Esophageal Technique, Circulation, Nov. 1979, pp. 977-987, vol. 60, No. 5, American Heart Association, Dallas, TX.
Mohammad, S. N. et al. A Signals and Systems and Object Oriented Programming Approach to Development of ECG Analysis Software, Computers in Cardiology, 2002, pp. 153-156, vol. 29, Institute of Electrical and Electronics Engineers, Inc.
Notice of Allowance dated Jul. 16, 2020 for U.S. Appl. No. 15/670,460 (pp. 1-8).
Office Action dated Apr. 3, 2020, for U.S. Appl. No. 14/937,194 (pp. 1-16).
Office Action dated Apr. 18, 2022 for U.S. Appl. No. 16/800,313 (pp. 1-11).
Office Action dated Jun. 10, 2021 for U.S. Appl. No. 16/226,866 (pp. 1-22).
Office Action dated Mar. 30, 2020, for U.S. Appl. No. 15/670,460 (pp. 1-6).
Office Action dated Nov. 17, 2020 for U.S. Appl. No. 14/937,194 (pp. 1-20).
Office Action dated Oct. 6, 2021 for U.S. Appl. No. 16/226,866 (pp. 1-20).
Office Action dated Oct. 7, 2020 for U.S. Appl. No. 16/148,656 (pp. 1-11).
Rangayyan, R. M. Analysis of Concurrent, Coupled, and Correlated Processes, Biomedical Signal Analysis: A Case-Study Approach, 2002, pp. 61-71, Institute of Electrical and Electronics Engineers, Inc.
Smith et al., "Intravenous Electrocardiogramce for Placement of Peripherally Inserted Central Catheters" (2010), 43, pp. 274-278.

* cited by examiner

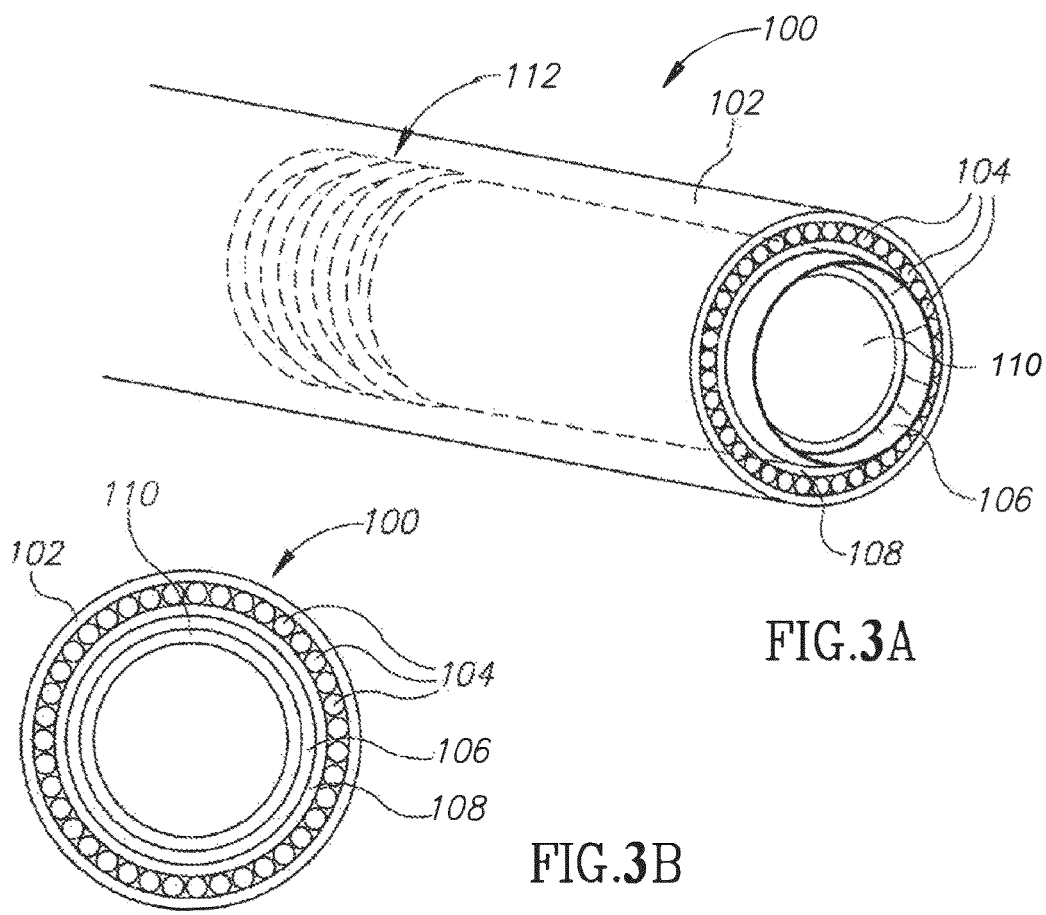
FIG.3A
FIG.3B
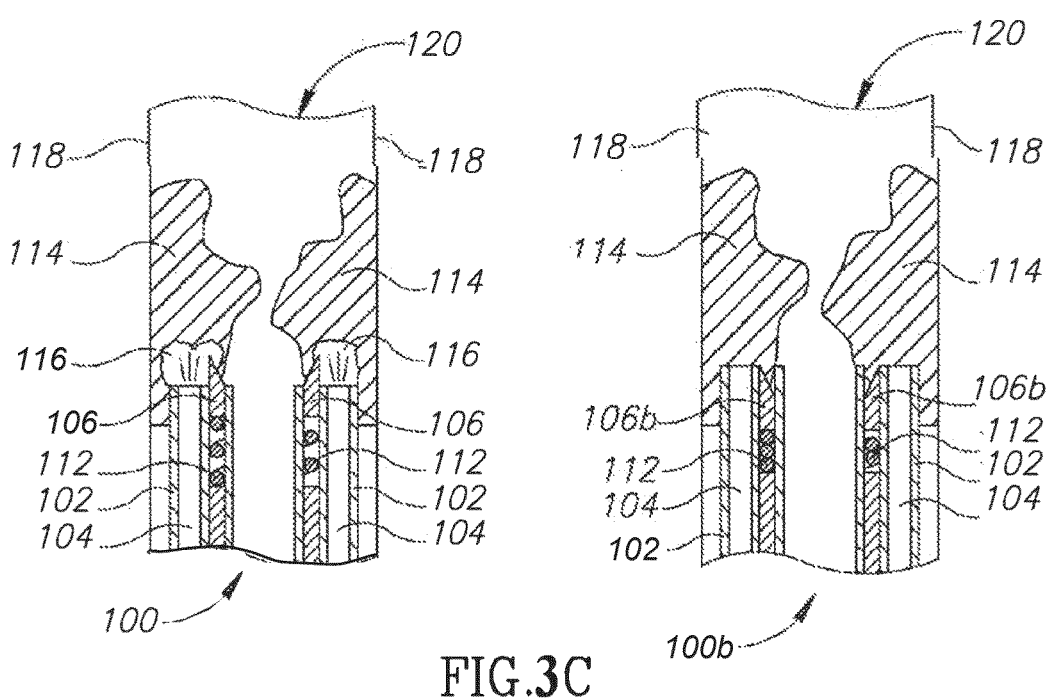
FIG.3C

SYSTEM AND METHODS FOR LESION CHARACTERIZATION IN BLOOD VESSELS

CROSS REFERENCE TO RELATED APPLICATIONS

This present application claims priority under 35 U.S.C. § 119(e) to U.S. Provisional Patent Application No. 62/856,829, filed Jun. 4, 2019. This present is a Continuation-in-Part application of parent application U.S. patent application Ser. No. 14/764,180, filed Jan. 31, 2014, which published as U.S. Patent Application Publication Number 2015/0359595, which claims priority to U.S. Provisional Patent Application No. 61/758,830, filed Jan. 31, 2013.

FIELD OF THE INVENTION

The invention relates to the use of hybrid catheters in various cutting and therapeutic procedures, using a combination of laser or electrical discharge energy operating in conjunction with mechanical cutting, especially for treatment in vascular vessels.

The invention also relates to systems and methods for real-time monitoring of laser ablation procedures, specifically for real-time monitoring of laser ablation procedures using an acoustic device for acoustic signal processing to monitor tissue type, treatment efficiency, and catheter location.

BACKGROUND

There is an unmet need in the art for devices, systems and methods that would allow efficient and effective vascular interventions as well as removal of challenging lesions in the body. One current need in laser atherectomy is a real-time monitoring of ablation procedures using an acoustic device for acoustic signal processing to monitor tissue type, treatment efficiency, and catheter location within the treated vessel or the target site. Currently, the user of such a laser system, typically a physician or doctor, has no real-time indication whether the laser catheter is ablating a non-target tissue, such as an arterial or other vessel wall, a non-target material, such as a stent, or a target tissue, such as fibrotic tissue, thrombotic tissue, or other lesion. Ablation of non-target tissue is undesirable as it may damage an endothelial tissue layer of an arterial or vessel wall, or damage other critical body structures.

SUMMARY

According to some embodiments, a device comprises: a catheter comprising a plurality of optical fibers to transmit laser radiation from a catheter distal end onto a region of target tissue; a mechanical cutting element co-axially aligned with the catheter distal end such that mechanical cutting is performed on the same region of the target tissue where the laser radiation is applied; and at least one acoustic device to detect at least one acoustic signal generated by impingement of the laser radiation onto the target tissue.

According to some embodiments, the device comprises a laser device comprising a processor coupled to a memory, a display unit, an acoustic device interface, a catheter connector interface, and at least one of any of the following instructions coupled to the memory: an acoustic signal processing instruction, a tissue classification instruction, and/or a treatment efficiency processing instruction.

According to some embodiments, the catheter to operably couple to the catheter interface of the laser device; wherein at least one acoustic device to operably couple to the acoustic signal interface of the laser device.

According to some embodiments, the device comprises the memory to receive and store the at least one detected acoustic signal, and when executed by the processor the acoustic signal processing instruction to apply a noise reduction algorithm to the at least one detected acoustic signal.

According to some embodiments, the laser radiation has a wavelength of up to 532 nm, a pulse energy power density of 30-60 mJ/mm2, and a wavelength of up to 1064 nm.

According to some embodiments, the device comprises when executed by the processor the tissue classification instruction to apply a tissue classification algorithm to the at least one detected acoustic signal thereby classifying the target tissue into a specific tissue type.

According to some embodiments, the noise reduction algorithm extracts at least one acoustic feature from the at least one detected acoustic signal.

According to some embodiments, when executed by the processor the acoustic signal processing instruction to apply a machine learning algorithm on the extracted features to compare the feature of the at least one acoustic signal with a database of stored acoustic signal features.

According to some embodiments, when executed by the processor the treatment efficiency processing instruction to apply a tissue efficiency algorithm to the at least one detected acoustic signal thereby determining the efficiency of the impingement of the laser radiation onto the target tissue.

According to some embodiments, a laser device comprises a processor coupled to a memory, a catheter connector interface, and at least one of any of the following instructions coupled to the memory: an acoustic signal processing instruction, a tissue classification instruction, and/or a treatment efficiency processing instruction; a catheter to operably couple to the catheter interface of the laser device, the catheter comprising a plurality of optical fibers to transmit laser radiation from a catheter distal end onto a region of target tissue; at least one acoustic device in communication with the laser device and to detect an acoustic signal generated by impingement of the laser radiation onto the target tissue; the memory to receive the detected acoustic signal; and when executed by the processor the acoustic signal processing instruction to apply a noise reduction algorithm.

According to some embodiments, wherein the noise reduction algorithm thereby extracts an acoustic feature from the at least one detected acoustic signal.

According to some embodiments, when executed by the processor the tissue classification instruction to apply a tissue classification algorithm to the at least one detected acoustic signal thereby classifying the target tissue into a specific tissue type.

According to some embodiments, when executed by the processor the acoustic signal processing instruction to apply a machine learning algorithm on the extracted features to compare the feature of the at least one acoustic signal with a database of stored acoustic signal features.

According to some embodiments, when executed by the processor the treatment efficiency processing instruction to apply a tissue efficiency algorithm to the at least one detected acoustic signal thereby determining the efficiency of the impingement of the laser radiation onto the target tissue.

According to some embodiment, a method comprises placing a catheter in a patient's vessel, the catheter comprising a plurality of optical fibers to transmit laser radiation from a catheter distal end onto a region of target tissue; coupling the catheter to a laser device comprising a processor coupled to a memory, a catheter connector interface, and at least one of any of the following instructions coupled to the memory: an acoustic signal processing instruction, a tissue classification instruction, and/or a treatment efficiency processing instruction; transmitting laser radiation from the catheter distal end onto the region of target tissue, thereby generating an acoustic signal; detecting the acoustic signal using an acoustic device in communication with the laser device; and filtering the detected acoustic signal.

According to some embodiments, the method further comprises the step of filtering the detected acoustic signal further comprising the steps of executing the acoustic signal processing instruction to apply a noise reduction algorithm thereby extracting at least one feature of the detected acoustic signal.

According to some embodiments, the method further comprises the step of executing the tissue classification instruction to apply a tissue classification algorithm to the detected acoustic signal thereby classifying the target tissue into a specific tissue type.

According to some embodiments, during the step of executing the acoustic signal processing instruction further comprising the step of applying a machine learning algorithm on the extracted features to compare the detected acoustic signal with a database of stored acoustic signals.

According to some embodiments, the method further comprising the step of placing the at least one acoustic device at a sensing location.

According to some embodiments, wherein the sensing location is outside of the patient's body and on the patient's skin.

According to some embodiments, the method comprises placing a catheter in a patient's vessel, the catheter comprising a plurality of optical fibers to transmit laser radiation from a catheter distal end onto a region of target tissue; coupling the catheter to a laser device comprising a processor coupled to a memory, an acoustic signal process instructions coupled to the memory, a display, an acoustic signal interface, and a catheter interface, the memory to receive an acoustic signal; coupling at least one acoustic device to the acoustic signal interface of the laser system, the at least one acoustic device to detect the acoustic signal generated by impingement of the laser radiation onto the target tissue; and determining the tissue type of the target tissue by the processor executing the acoustic signal process instruction to classify the received acoustic signals obtained from the at least one acoustic device. The method may further comprise the step of applying a noise reduction algorithm thereby extracting acoustic features from the at least one received acoustic signal; and/or applying an algorithm on the extracted features to determine any one of the following: a composition of the a target tissue; a position of the distal end of the catheter relative to the region of the target tissue; if laser radiation is being applied to a blood vessel wall; if laser radiation is being applied to a stent; or if laser radiation is being applied to the target tissue. The method may further comprise the step of applying a machine learning algorithm on the extracted features to compare at least one received acoustic signal with a database or a library of stored acoustic signals. The method may further comprise the step of placing the at least one acoustic device at a sensing location, and wherein the sensing location is outside of the patient's body and on the patients skin.

According to some embodiments, the method comprises: inserting an atherectomy device, such as the catheter described above and comprising at least one optical fiber, operatively coupled to a laser source into the vasculature of a patient; transmitting laser radiation towards a tissue, thereby generating an acoustic wave and/or detectable acoustic signals; detecting the acoustic signal utilizing at least one acoustic device; converting the received acoustic signal to an electrical signal; analyzing the electrical signal of the received acoustic signal utilizing a processor; and determining a treatment parameter based on the analyzation of the acoustic signal received. Such determined treatment parameter(s) based on the analysis of the received acoustic signals by the processor may include, but is not limited to: the type of a tissue upon which the laser radiation is impinged; the location of the atherectomy device or catheter within the treatment site; the type of lesion in the treatment site; if the laser energy is being applied in only blood; and/or if the laser energy is being applied to a vessel wall. According to some embodiments, impingement of the laser radiation on the tissue ablates at least part of the tissue.

According to some embodiments, the method comprises stopping the laser radiation by the processor if the tissue is identified as being a non-target tissue, including, but not limited to, the wall of the blood vessel.

According to some embodiments, the method further comprises storing the acoustic signal information in a memory of the unit and/or an online database or information bank. According to some embodiments, the method further comprises processing the acoustic signal obtained from the acoustic sensor by a processor. According to some embodiments, the step of signal processing comprises applying an algorithm for filter or reducing unwanted background noise, characterizing tissue types being impinged by the laser energy, and/or comparing the received audio signals to audio signals of previous treatments. According to some embodiments, the comparing step comprises applying a machine learning algorithm on the received acoustic signal.

In this disclosure, a number of embodiments are described, which provide practical solutions to some of the problems still existent with these devices, and to propose new structures and methods of use. There is therefore provided, a device for performing cutting action on a region of a tissue, comprising: (i) an applicator adapted to direct energy from the distal end of the device onto the region of the tissue, (ii) an element for performing mechanical cutting, the element being aligned such that the mechanical cutting is performed in the same regions of the tissue where the energy is applied, and (iii) at least one acoustic sensor disposed in the distal region of the device, wherein when the energy is pulsed, the at least one acoustic sensor can perform imaging of the tissue by detecting acoustic signals generated therein by impingement of the pulsed energy in the tissue.

In such a device, the energy may be laser energy, and the acoustic signals are generated by the photo-acoustic effect, or alternatively, the energy may be RF electrical discharge energy, and the acoustic signals are generated by the thermo-acoustic effect (the conversion of heat energy to sound energy or vice versa). In the case of laser energy, the applicator may be an array of optical fibers adapted to direct the pulsed laser energy onto the region of the tissue. The optical fibers may be arranged in a circular disposition, and the element for performing mechanical cutting may then be a circular cutter co-axially aligned with the optical fibers.

Additional implementations may involve either use of the pulsed energy also to degrade the tissue or use of a separate source of pulsed energy to degrade the tissue.

Aspects of the disclosure, in some embodiments thereof, relate to systems and methods for identification and/or characterization of lesions inside blood vessels, including utilizing a laser system configured to transmit laser radiation towards and/or onto a lesion within a blood vessel, monitoring ablation of the lesion utilizing at least one acoustic sensor, wherein the acoustic sensor is an external acoustic sensor positioned outside the patient's body.

Advantageously, the acoustic signal is derived from the laser ablation itself. That is, according to some embodiments and without being bound by any theory, the acoustic signal may be derived from "micro-explosions" caused by mechanical changes in the tissue as a result of the laser ablation. The processor may thus determine the type of lesion and/or the efficiency of the ablation process based on the acoustic analysis and/or classification of the laser ablation process itself. According to some embodiments the acoustic signal is obtained from a laser pulse that is below the effective ablation threshold to sense the target prior to effective ablation, i.e., pulse energies below 40 mJ/mm2.

According to some embodiments, transmission of laser energy illuminates only a section of said optical fibers, and wherein transmission of the laser radiation and the detecting of the type of tissue are repeated a few times, each time other section of the optical fibers are illuminated, thereby giving an indication to the treating physician about the different types of lesions located at the circumference distally to the distal end of the optical fibers.

The laser system described herein, including the acoustic sensing and feedback technology, and methods for using the same may be useful for such treatments including, but not limited to: Barrett's Esophagus management; gastroenterology—such as for removal of sessile and flat lesions in the GI track; analogous applications requiring removal of tissue from the inner walls in gynecology and urology interventions; atherectomy; angioplasty; debulking of plaque in in-stent restenosis; leads extraction; thrombectomy in chronic peripheral and coronary artery diseases; management of acute blockage of vessels in coronary; neurovascular applications; treatment of BPH; other benign tissue lesions which needs debulking—uterine fibroids, thyroid nodules, breast, ovarian cysts, benign vascular tumors, treatment of prostate cancer, and/or treatment of any other localized cancer According to some embodiments the acoustic signal is obtained from a laser pulse that is below the effective ablation threshold to sense the target prior to effective ablation, i.e., pulse energies below 40 mJ/mm2. In these methods, the operator controls the process based on either light based or acoustic, photoacoustic imaging to control the depth of penetration to avoid perforation and/or to detect margins of the area that needs to be removed to improve clinical efficacy.

BRIEF DESCRIPTION OF THE FIGURES

FIG. 3A shows an exemplary cylindrical tip section of a hybrid catheter in perspective view;

FIG. 3B shows an exemplary cylindrical tip section of a hybrid catheter in a front view;

FIG. 3C shows an exemplary cylindrical tip section of a hybrid catheter inside a vessel with partial plaque blockage in a cross-sectional view;

FIGS. 11A-11B illustrates an angiography images from the provided example;

DETAILED DESCRIPTION

Figure 1:
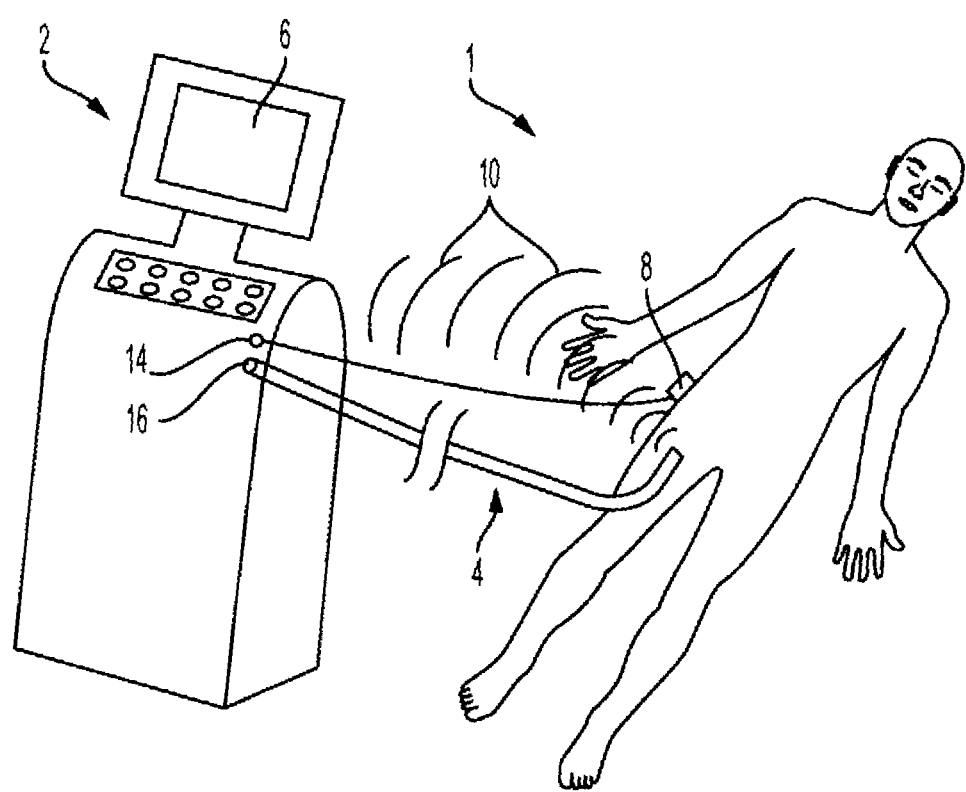
FIG. 1 illustrates a laser ablation system and tissue classification system in accordance with examples of this disclosure.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

The terminology used herein is for the purpose of describing particular embodiments only and is not intended to be limiting.

As used herein, the singular forms "a", "an" and "the" are intended to include the plural forms as well, unless the context clearly indicates otherwise. It will be further understood that the terms "comprises" or "comprising", when used in this specification, specify the presence of stated features, integers, steps, operations, elements, or components, but do not preclude or rule out the presence or addition of one or more other features, integers, steps, operations, elements, components, or groups thereof. Unless otherwise defined, all technical and scientific terms used herein have the same meaning as commonly understood by one of ordinary skill in the art to which this invention belongs.

As shown in FIGS. 1-3C, there is provided a laser ablation and tissue classification system 1 for applying laser ablation and monitoring the laser ablation treatment of tissue or lesions within a blood vessel or other non-vasculature tissue of a patient. The system 1 comprises a laser ablation and tissue classification device 2, a laser catheter 4, and an acoustic device 8.

The laser catheter 4 may comprise optical fibers 104, as described in more detail below, a laser catheter proximal end operatively coupleable to the laser device 2, a laser catheter distal end to be placed inside a blood vessel or other treatment site and configured to emit laser radiation from the optical fibers 104, and a laser catheter shaft extending therebetween.

In some embodiments the acoustic device 8 may be embedded in or part of the laser device 2. In some embodiments, the acoustic device 8 may be embedded in and part of the laser catheter 4, as described in more detail below. In some embodiments, the acoustic device 8 may be incorporated into the laser ablation and tissue classification device 2. In some embodiments, the acoustic device 8 may be a separate component operatively coupleable to the laser ablation and tissue classification device 2 through at least one acoustic device connectors 16, as described in more detail below. In some embodiments, the acoustic device 8 may be embedded in and part of the laser catheter 4, as described in more detail below. As described herein, the acoustic device 8 may comprise an acoustic transducer, an acoustic sensor, an acoustic detector, and/or an acoustic recorder. While these terms may be used interchangeably, they all include the functionality of receiving an audio signal, receiving an electrical acoustic signal, converting a received audio signal to an electrical audio signal; and/or recording the received audio signal or electrical acoustic signal. Audio device 8 may include, but not limited to, a recorder, stereo microphones (such as TASCAM DR-100MK III onboard dual (directional/omnidirectional) stereo microphones with integrated shock mounts); hydrophones (such as Benthowave BII-7006, 0-100 kHz flat response hydrophone); an external ultrasound sensor used for monitoring of the laser ablation process, or a piezo pressure sensor.

Figure 2:
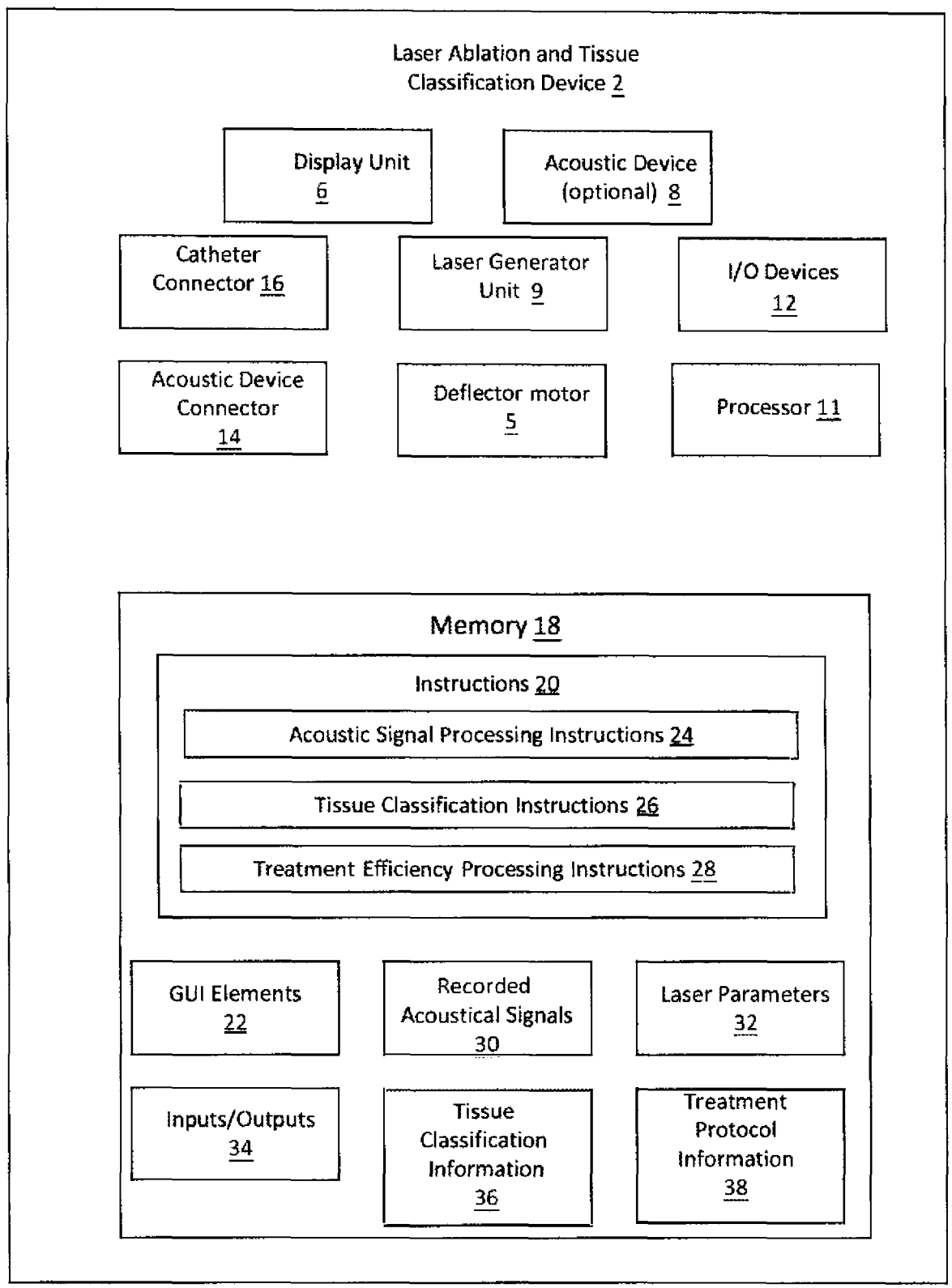
FIG. 2 illustrates a laser ablation and tissue classification device in accordance with examples of this disclosure.

Referring now to FIG. 2, an embodiment of the laser ablation and tissue classification device 2 is illustrated. Laser ablation/tissue classification device 2 comprises a display unit 6, either an acoustic device 8 incorporated in the laser ablation/tissue classification device 2 or an at least one acoustic device connector 14 to operatively couple the laser ablation/tissue classification 2 to an external acoustic device (not shown here), an at least one catheter connector 16 to operatively couple the laser ablation/tissue classification device 2 to the laser catheter 4, a laser generator unit 9, to modify the laser beam to a customized laser profile, and I/O devices 12 by way of non-limiting examples, may include a keyboard or other input device, external data storage, and network connections.

According to some embodiments, the tip section 100 of the catheter is deflectable, and the deflection may be controlled by a motor that is connected to and in communication with the processor. The system may control the motor and thereby the movement of the tip section 100 of the catheter in response to the processing of the audio signals 10 received during a treatment. For example, according to some embodiments, if the tissue identified is a wall of the blood vessel, the motor deflects the catheter tip 100 radially in direction of the center of the blood vessel. Such an embodiment may be advantageous in applications such as lead extraction to prevent or avoid unwanted perforation of SVC vein. For example, this system may comprise automatically (i) controlling the catheter tip 100 movement, such that the catheter tip 100 moves and/or deflects to prevent unwanted vessel perforation, and/or (ii) controlling the delivery of laser energy to the catheter. Furthermore, the system may comprise an option to stop delivering laser energy (or reduce the laser power to an acceptable level) to the catheter when the acoustic feedback is received and the acoustic feedback processor determines that a physician or user is shooting the laser energy in only blood without any lesion present, or shooting laser energy in a stent without lesion present.

According to some embodiments, the tip section 100 of the catheter is deflectable and comprises a deflection element (such as the tip deflection elements shown in FIG. 4A and described in detail below). The deflection of the tip section 100 of the catheter 4 may be controlled by a deflection motor 5 that is operatively coupled to the catheter 4 and in communication with processor 11. The laser ablation/tissue classification system 1 may control the deflection motor 5 and thereby the movement of the tip section 100 in response to either a user input and/or a control signal. By way of non-limiting example, the user may enter a motor activation request through the GUI interface on the display unit 6 which will cause the deflection motor 5 to activate. In another example, the system 1 automatically pause laser energy delivery and then deflect the catheter distal tip section 100. If the tissue classification process described herein identifies tissue as having an acoustical profile associated with non-target tissue, such as a vessel wall, blood, or a stent, the processor 11 may generate a control signal indicating such. That control signal may then be used by processor 11 to pause energy delivery and activate the deflection motor 5 causing the catheter distal tip section 100 to be deflected away from the vessel wall thereby avoiding emitting laser radiation onto the non-target tissue. According to some embodiments, if the tissue identified is a wall of the blood vessel, the deflection motor 5 deflects the tip section 100 radially in direction of the center of the blood vessel. In another embodiment, if the tissue identified is blood or not a natural object, such as a stent, rather than the targeted lesion, the tip section 100 of the catheter may be deflected, either automatically or based on user input, in a direction away from the blood or and toward the lesion, typically a deflection away from the center of the vessel.

The laser generator unit 9 generates laser energy for ablation procedure and may be of any variety of laser generator unit 9 arranged to generate pulsed or continuous laser beams, as described herein in more detail below. The display unit 6 displays information to a user through a graphical user interface (GUI) or other methods known in the art The computer 13 comprises a processor(s) 11, a memory 18 coupled to the processor 11 and containing instructions executable by the processor(s) 11. The processor(s) 11 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor(s) 11 may include graphics processing portions and may include dedicated memory, multiple-threaded processing and/or some other parallel processing capability. In some examples, the processor(s) 11 may be an application specific integrated circuit (ASIC) or a field programmable integrated circuit (FPGA). In some implementations, the processor(s) 11 may be circuitry arranged to perform particular computations, such as, related to artificial intelligence (AI), graphics and machine learning.

Such circuitry may be referred to as an accelerator. Processor(s) 11 can include multiple processors, such as, for example, a central processing unit (CPU) and a graphics processing unit (GPU).

The memory 18 stores instructions 20 to be executed by the processor 11 as well as and data elements used in the execution of those instructions 20. Memory 18 may include both volatile and nonvolatile memory, which are both examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), dynamic random access memory (DRAM), NAND memory, NOR memory, phase-change memory, battery-backed volatile memories, networked storage devices, and the like. The memory 18 may include a number of memories including a main random access memory (RAM) for storage of instructions and data during program execution and a read only memory (ROM) in which read-only non-transitory instructions are stored. Memory 18 may include a file storage subsystem providing persistent (non-volatile) storage for program and data files. Memory 18 may further include removable storage systems, such as removable flash memory.

The memory 18 may be configured to store the basic programming and data constructs that provide the functionality of the disclosed processes and other embodiments thereof that fall within the scope of the present inventions. Memory 18 stores instructions 20 including customized processing instructions. These customized processing instructions may include an acoustical signal processing instructions 24, tissue classification instructions 26, and a treatment efficiency processing instructions 28 as will be discussed in more detail below. Memory 18 also stores data including graphical user interface elements 22, laser parameters 32, recorded acoustic signals 30, tissue classification information 36, treatment protocol information 38, and input/output data 34. Laser parameters 32 may include information regarding the laser settings including wavelength, pulse and continuous modes, and pulsing sequences, while treatment protocol information 38 may include data such as laser catheter configurations, laser catheter sizes, laser energy delivery levels (such as fluence) and other laser thresholds. Input/output data 34 may include data associated with user inputs, control signals generated by instructions 20, and inferences from a machine learning models. During operation, processor 11 leads and executes instructions 20 to implement various embodiments of the invention, as described in more detail below. Memory 18 may also provide a repository for storing data used by the instructions 20 or data generated by execution of the instructions 20 including acoustical signal recordings generated past medical laser procedures.

The system 1 described herein comprises a hybrid catheter that may be based on a combination of laser and mechanical removal (also "debulking") of an undesired material from a bodily lumen or other body tissue. In vascular interventions, the catheter may be configured to weaken and/or even cut and detach undesired material with a laser and then, even in cases where the thrombotic or plaque-like material was not entirely removed, detaching the remaining material by mechanical means, such as using a blade 106. The laser may change the mechanical characteristics of tissue, and thereby improve performance of mechanical tools such as various types of blades or shavers. By way of example, the laser may make a soft tissue crispier so it can be effectively crushed using the mechanical tool 106.

Advantageously, usage of such catheters may obviate the need to photo-ablate (evaporate) most or all of the undesired material. Accordingly, the process may be faster and result in less mechanical stress associated with the treatment, and less side effects such as thermal injury resulting from photo ablation. The process may allow using smaller lasers wherein energy is focused at a smaller area and wherein mechanical tools remove traces remaining in the treated area and facilitate further penetration of the laser beam to proceed in effective ablation. In addition, challenging calcified tissue may be successfully treated, despite the difficulty in many of today's common mechanical or excimer lasers to delicately detach such tissue from the vessel's walls. Such catheters advantageously provide for controlled cutting of plaque with minimal or no damage to the vessel's walls.

Such hybrid catheters may be used (for example in atherectomy) alone and/or in conjunction with low pressure balloon angioplasty, stenting, for treating in-stent restenosis with no damage to the stent, and/or for treatment of acute blockages due to plaques and or thrombus (thrombectomy). Another example is in use of debulking in AV shunts which are known to get blocked in patients that undergo dialysis and or when vascular grafts are used. Accordingly ablation of graft either artificial or natural can be avoided when ablation of such is identified.

The terms "cut", "dissect", "resect", "detach", "debulk" and "remove" may be used here interchangeably.

Referring now to FIGS. 3A-3C, the catheters may comprise a tip section 100, which may be essentially in a cylindrical shape, having circumferentially-directed laser optics 104, optionally in the form of one or more optical fibers 104, configured to deliver laser radiation, and a circular-action cutter 106 including one or more blades configured to assist in cutting and/or detaching undesired materials (also "deposits") from an inner surface of a blood vessel. The one or more optical fibers 104 may be circumferentially-directed, namely, they may be located along an inner surface of the cylindrical tip section 100, which is near the periphery of the tip section 100.

Alternatively, the circumferentially-directed optical fibers 104 may be located elsewhere but directed, by way of orientation and/or optical focusing, to radiate an area in front of the circumference of the tip section 100.

The circular-action cutter 106 may be located in a central part of the tip section 100, for example, surrounded by the optical fibers 104. Alternatively, the circular-action cutter 106 may be located in the periphery of the tip section 100 and the one or more optical fibers 104 are located in a central part of the tip section 100, for example, surrounded by blades.

The one or more optical fibers 104 and the one or more blades may be located in the periphery of the tip section 100.

The one or more optical fibers 104 and the one or more blades are located in a central part of the tip section 100.

The circular-action cutter 106 lays on a spring so that a maximum force applied by the cutter is predetermined in order to avoid potential damage yet be effective. The tip section 100 may include an inner channel maintained at a relative low pressure to suck the undesired material which may be plaque, thrombus material, debris, saline solution used for cleaning and/or the like. The catheter may optionally include an aspiration and/or infusion channel which is used to aspirate debris created during the procedure or infuse solution such as saline Optionally, a motor is provided to rotate the circular-action cutter 106 in order to improve fragment cutting and/or detaching. Additionally, or alternatively, the motor or a different motor may be used to rapidly vibrate the circular-action cutter 106 in order to improve fragment cutting and/or detaching.

Accordingly, based on the identified tissue classification, the system 1 is capable of (i) adjusting the tip section 100 position either automatically or upon user input (ii) automatically pausing or terminating laser energy delivery upon identification of non-targeted ablation (iii) automatically adjusting or prompting the user to adjust laser energy levels to be delivered based on the identified tissue and (iv) resuming energy delivery after adjustments to the tip section 100 and/or energy level have been made. Real-time adjustment features have significant clinical advantages over prior art laser devices and treatments.

An example of an appropriate laser of some embodiments is a solid state ultraviolet (UV) laser emitting pulses in approximately 355 nm and/or 266 nm. An example of an appropriate laser is the Qauntel CFR400, emitting 50 mJ, 10 ns pulses of 355 nm at 50 Hz and/or 40 mJ of 266 nm at 40 Hz. Another example is an Excimer laser.

In case of using significantly high repetition rates, thermal effects in the tissue may become a problem. This can be at least partially resolved by minimizing ablation area (depth and width), use of short laser pulses and with saline flushing. Another option includes sequential illumination of fibers in a manner that not all the fibers are exposed to laser ration simultaneously, in order to enable thermal relaxation of the affected tissue.

Dyes or substrates may be used to enhance absorption at certain wavelengths, such as 355 nm. For example, sensitization with hematoporphyrin or tetracycline prior to the procedure, in order to enhance ablation of the pretreated atheromatous plaque but not insensitive or normal arterial wall.

Another example is a laser emitting pulsed radiation in the mid-infrared (IR) region, such as in the range of 2.8-3 micrometers, a range where water is very effectively absorbed. Additionally, or alternatively, radiation at around 2 microns may be used, with a preference for thulium laser emitting at 1910-1940 nm range wherein there is higher absorption of water preferably combined with Q-switched modulation wherein ablation is more effective and reduces lateral damage. For 3 micron emission, an Er:YAG may be used, or another source such as a Mid-IR Holmium Fiber Laser Directly Pumped with Diode Laser that emits at 2840 nm using fluoride fibers.

Yet another example is usage of a third harmonic of a Nd:YAG laser at 355 nm, preferably a compact, all solid state, diode pumped laser. The 355 nm radiation usually has a deeper penetration capability compared to the 308 nm radiation, in the depth range of 100 micron or more in relevant tissues and materials. Optionally, very short pulse widths (such as <10 ns) are used, in order to obtain a higher power density, and, in particular, to be able to ablate calcified plaques. In accordance with some embodiments, the energy per pulse is in the range of 10-100 mJ and the pulse frequency is in the range of 10-100 Hz. Optionally, the area of ablation may be flushed with a saline solution in order to reduce side effects (such as cavitation), clean the area of ablation and catheter and/or facilitate collection of debris.

One of the advantages of using 355 nm radiation is that is considered relatively nonmutagenic. The 308 nm radiation of the xenon chloride laser is in the UVB range, which is known to have mutagenic risks.

Some studies have indicated that third harmonic lasers are generally less suitable to endovascular interventions than 308 nm lasers, due to longer penetration rates and reduced effectiveness of ablation. The present embodiments, however, may successfully utilize third harmonic Nd:YAG lasers instead of complex and expensive Excimer lasers. The present embodiments address several problems. For example, in some embodiments, it may not be necessary to laser-ablate all the material whose removal is desired, but rather the laser and the mechanical cutter may share the task; the laser may ablate and/or weaken at least some of the material, while the mechanical cutter completes the job by finally detaching the material from the walls.

A laser that emits radiation in 266 nm may be used. This wavelength has a shorter penetration rate in addition use of compact Excimer laser emitting radiation at 308 nm, as currently used, can be utilized with the current embodiments. According to some embodiments, a system may include means that enable an operator to switch between 266 nm and 355 nm, generated from the same Nd:YAG laser, and means to control power, repetition rate and/or exposure/illumination of specific fiber groups.

An alternative embodiment has replaced UV lasers with a laser with radiation in the 2 micron or 2.8-3 microns, in which ablation is very effective.

Holmium lasers are conventionally used for 2 microns but Thulium lasers have a stronger water absorption and smaller absorption length, which makes them especially suitable for some embodiments. For example, pulsed fiber thulium laser is used. Alternatively, a solid state laser may be used in order to increase pulse power per pulse, which is currently limited in fiber lasers and in view of the limited pulse rate that can be used in order to minimize heat accumulation and damage.

Laser in 2.8-3 micrometer may be Er:YAG. Er:YAG Q-switched are available with pulses in the hundreds of nanosecond range, which may be suitable for present embodiments. Another laser example which may be suitable for specific embodiments is Pantec's model DPM-15 solid state laser, emitting microsecond pulses in the mJ range at hundred of KHz.

Fiber lasers which may be directly diode-pumped, such as a Mid-IR Holmium Fiber Laser, are used. This laser may be pumped from ground level to an excited energy band with radiation at about 1150 nm, and the relaxation bands may lead to emission at 2840 nm and 2100 nm in relaxation to ground state. Accordingly, this laser may be directly pumped with recently developed high-power, high-brightness diode lasers based on highly strained quantum wells that produce output at 1148 nm.

The laser may be selected according to the selected resonator optics, for example fluoride fiber lasers to emit laser radiation on the 2.9-µm transition and silica fiber lasers to emit radiation on the 2.1-µm transitions. An advantage of an embodiment using a laser in the region of 2.9-3 micron is that the absorption is very high and results in very short length of absorption, in the order of 15 microns only. Therefore, the relaxation time is shorter so the pulse rate may be increased to above 100 Hz in order to accelerate the procedure.

In addition to the laser beam that interacts with the undesired material, a laser with controlled pulse rate and/or power may be used to interact with the liquid between the fiber tip (exit of laser beam) and tissue, either to allow for "opening" of a passage for the beam (e.g., a channel wherein light is not absorbed when UV radiation is used) to the tissue prior and adjunctive to the required interaction with the tissue, and/or to facilitate the process (when mid-IR radiation is used) benefiting from the "water spray" effect. By way of clarification the tip can be in mechanical contact with the tissue being ablated or not.

In a similar manner, if instead of the use of laser energy to generate the incision through which the blade penetrates, electrical energy is used, then thermo-acoustic imaging, based on the principle of the thermo-acoustic effect may be used instead of photo-acoustic energy.

The laser optics will now be discussed in greater detail. The laser beam may be directed through fibers each having a core diameter optionally in the range of 40-250 microns. In a configuration where the catheter's circumference is, for example, 15 mm, using fibers with an outer diameter of 50 microns will result in using approximately 300 fibers with a cross-section area smaller than 1 $mm^2$, so that for a coupling efficiency of 75%, the energy at the exit of each fiber will be close to 40 mj/mm when pumped with a 50 mJ laser. Adequate fibers for some embodiments may be all-silica fibers with a pure silica core. These fibers can usually withstand about 5 $J/cm^2$ the input. Some embodiments include fibers with a numerical aperture (NA) in the range of 0.12-0.22. An example of a relevant fiber is FiberTech Optica's SUV100/110AN fiber for UV application and the low OH version SIR100/140AN for use with laser in the 1900-2100 nm range or Infrared Fiber Systems, IR Photonics and A.R.T. Photonics GmbH fibers for transmission of radiation in the 2900-3000 range. Embodiments of single mode or multimode may be realized while preservation of beam quality is important but not mandatory in certain embodiments. Some embodiments may include microlenses at the tip area to manipulate the beam at each individual fiber exit.

The power required for effective ablation with 355 nm, 10 nsec pulses (approximately 30-60 $mJ/mm^2$) is close to the damage threshold of certain fibers or above it, which lead, in existing products, to the need of extended pulse length, for example. High peak power may be maintained and accordingly the catheter may include means for delivery of the laser power through relatively bigger optical fibers, e.g. 100 or even 300 micron fibers that do not extend all the way to the end of the tip section, as schematically illustrated in FIGS. 3A-4A.

The remainder of the catheter's shaft may, in some embodiments, be biocompatible polymer tubing, optionally coated, to minimize friction with the vessel's walls.

Tip section 100 is positioned at the distal end of the hybrid catheter, the end which is inserted into the blood vessel. Tip section 100 may include a housing 102, for example a cylindrical one, at least one optic fiber(s) 104 positioned along an inner surface of housing 102, and a circular-action cutter (or simply "cutter") 106 positioned inwardly of the optic fibers. Alternatively, (not shown) the circular-action cutter may be positioned outwardly of the optic fibers. It is intended that the following description of the embodiments in which the circular-action cutter is positioned inwardly, be applied, mutatis mutandis, to the alternative, not-shown embodiment. Optionally, optic fiber(s) 104 are delimited and/or supported by a first inner wall 108. Further optionally, cutter 106 is delimited and/or supported by a second inner wall 110.

The catheter may be used with a standard guidewire.

The catheter may be connected to a suction pump that generates low pressure to collect undesired material, saline and/or the like through the catheter. The pump may be a peristaltic pump, which mounts externally to the fluid path, to avoid any contamination of the pump. Optionally, this obviates the need to use disposable parts.

Optic fibers 104, serving as the laser optics of the present hybrid catheter, may be connected, at their proximal end (not shown) to the laser ablation and tissue classification device 2 characterized by one or more of the parameters laid out above. Optic fibers 104 may deliver the laser beams from the laser ablation and tissue classification device 2 towards the intervention site in the body. In tip section 100 of FIG. 3C, optic fibers 104 are shown as they emit laser towards target tissue 114. One or more regions 116 in target tissue 114 may consequently be modified or even ablated by the laser. Then, cutter 106 may more readily cut into target tissue 114 and detach at least a part of it from the inner surface 118 of a vessel wall.

The annular blade of cutter 106 may have sufficiently thin edges, such as around 100 microns. Suitable blades may be tailor-made by companies such as MDC Doctor Blades, Crescent and UKAM. The blade may optionally be mounted at the end of a rotatable tube rotated. Such tubes are available from manufacturers such as Pilling, offering a line of laser instrumentation and blade manufacture. The blade may be metal or manufactured by molding a material such as plastic which is optionally coated with a coating having proper characteristics for in-vivo use.

An exemplary tip section may have an external diameter of approximately 5 mm, an internal diameter (within the innermost layer, be it the cutter or an extra wall) of approximately 3.4 mm, and optical fibers each having an approximately 0.1-0.2 mm diameter.

Figure 4A:
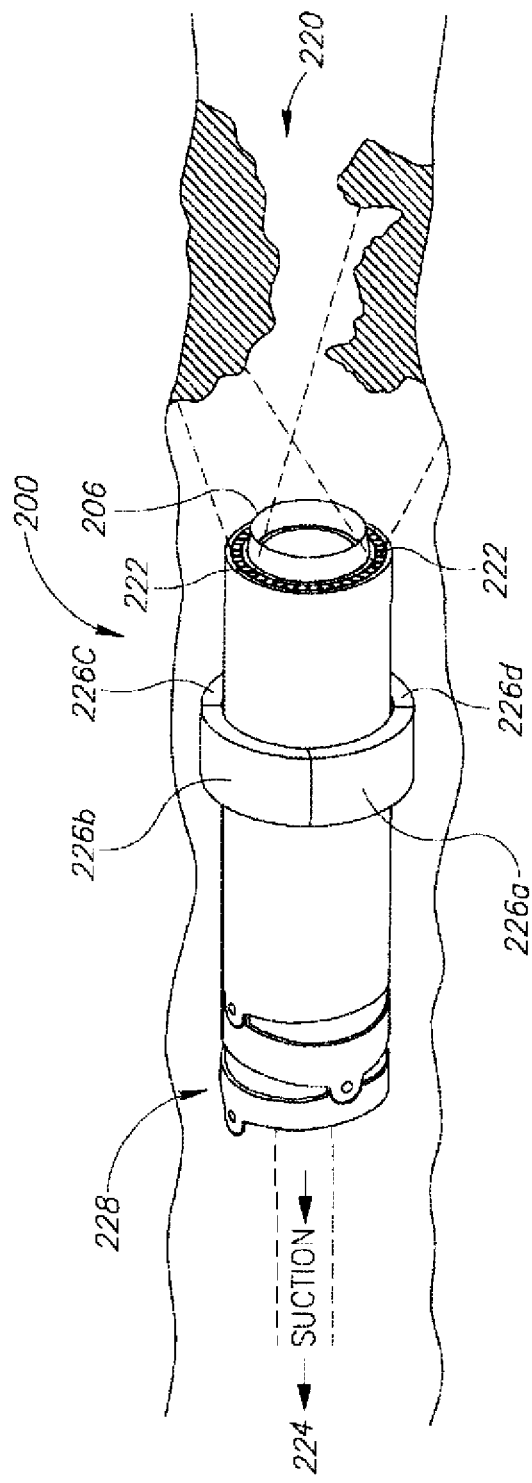
FIGS. 4A-4E depict prospective and partial cross-sectional views of a hybrid catheter tip section illustrating location of an acoustic sensor.

Reference is now made to FIG. 4A, which shows a tip section 200 of a hybrid catheter, which may be similar to tip section 100 of FIGS. 3A-3B with one or more alterations: First, one or more fibers 222 of the optical fibers existing in tip section 200 may be used for imaging the lumen of a blood vessel 220 by transporting reflected and scattered light from inside the lumen to an external viewing and/or analysis device (not shown) located externally to the body. This may aid in avoiding perforation of vessel 220 and allowing for on-line monitoring of the intervention process. Second, tip section 200 may be maneuverable, so as to allow different viewing angles and/or in order to align the laser beams and a cutter 206 differently. Third, a cleaning channel (not shown) may be present inside tip section 200 and extending outside the body, through which channel suction 224 is applied in order to evacuate debris of the undesired material which were treated by the lasers and/or cutter 206. Similar embodiments can be used for resection of lesions and controlled incisions in other applications to enable imaged guided procedure. These optional alternations are now discussed in greater detail: The angle of tip section 200 may be controlled to enable by means of tip deflection, enabling removal of material in a cross-section larger than the catheter size. This may be done by mechanical means, such as by selective inflation and deflation of at least two balloons (not shown) attached to the tip section externally at different angles, or a balloon with different compartments 226a-d. Another example is usage of links forming a joint 228, controllable from outside the body using one or more wires (not shown).

A conventional manner for detection of plaque and other lesions and for monitoring of vessel treatment is based on ultrasound and fluoroscopy. Here, however, one or more fibers 222 may be utilized for detection of lesions and/or to monitor the intervention process on-line, based on the reflection and/or scattering of the laser light from the vessel and/or the deposits. Alternatively or additionally, a different source of illumination may be used, such as through one or more other fibers. The captured light may be transmitted to a sensor such as a CCD, a CMOS or a MOS. The sensing may include a filter or means for spectral imaging, to gain information about the material characteristics (plaque, tissue, calcified plaque, blood clot, etc.). This may enable a quick and effective procedure with minimal risk of perforation, and may enable debulking procedures wherein a guidewire cannot or should not be used.

According to one implementation of the hybrid catheters described in the present disclosure, the photo-acoustic effect is used to obtain image information regarding the position of the catheter tip, and information on structures or layers deeper from the surface than is obtainable by optical imaging. A penetration of 1 mm. or more may be readily achieved. This enables the physician to plan the advancement of the tip more safely than could be done using optical imaging, and to thus avoid perforation or damage to nerves, blood vessels and to enable the detection of boundaries for optimized resection or incisions. This increases the safety and control of the procedure.

The pulsed laser used for ablation, such as at 335 nm, or a weaker pulse, or pulses at another wavelength such as 532 or 1064 nm may be used to generate acoustic signals that depend on the absorption of the laser light and the mechanical characteristics of the tissue. The acoustic signals may be monitored by one or more acoustic devices that could be for example, piezoelectric or capacitive micromachined ultrasonic transducers, such as are shown in http://www-kyg.stanford.edu/khuriyakub/opencms/en/research/cmuts/general/index.html, which can be embedded in the catheter tip and/or placed outside of a patient's body on the skin of the patient. Additionally, the acoustic devices may also include a fiber optic in which light is used to assess pressure in the catheter distal end.

An advantage of embedding the acoustic device 230 in the catheter tip or near the catheter distal end, as compared to placing the acoustic device 230 outside the patient's body, is to lessen background noise or increase sensitivity of the acoustic device 230. The acoustic device may transmit the acoustic signal to a processor either via a transmission line embedded within the catheter or wirelessly. For example, the transmission line may be embedded within the catheter can electrically connect the acoustic device 230 to the Laser ablation and tissue classification device 2.

The acoustic device 230 can be a single element or an array of elements to create an image. The acoustic device may optionally operate in the 1-100 MHz range to provide high spatial resolution. The acoustic device element can be of size ranging from <100 micrometer to a few mm and in some embodiments can be based on miniature IVUS sensor design for 1 mm catheters.

Figure 4C:
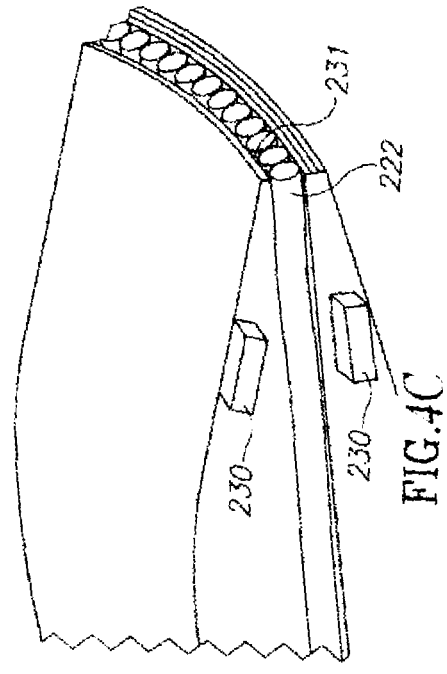
Figure 4D:
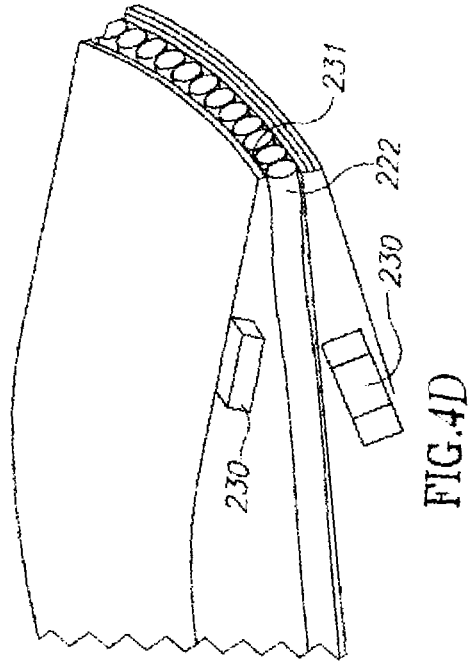
Figure 4B:
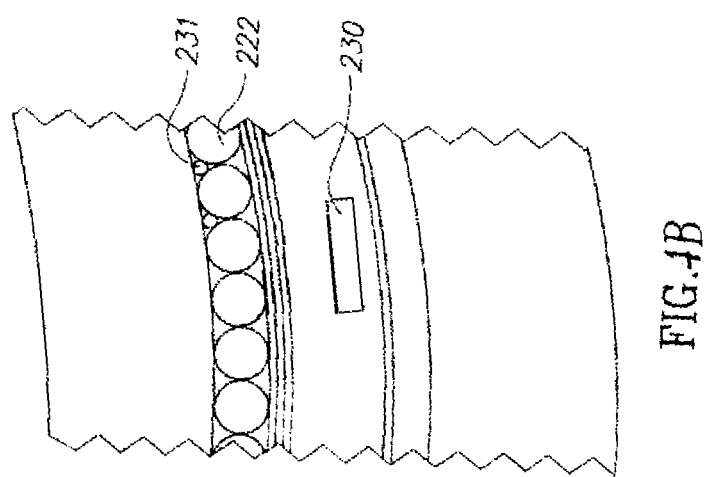
Figure 4E:
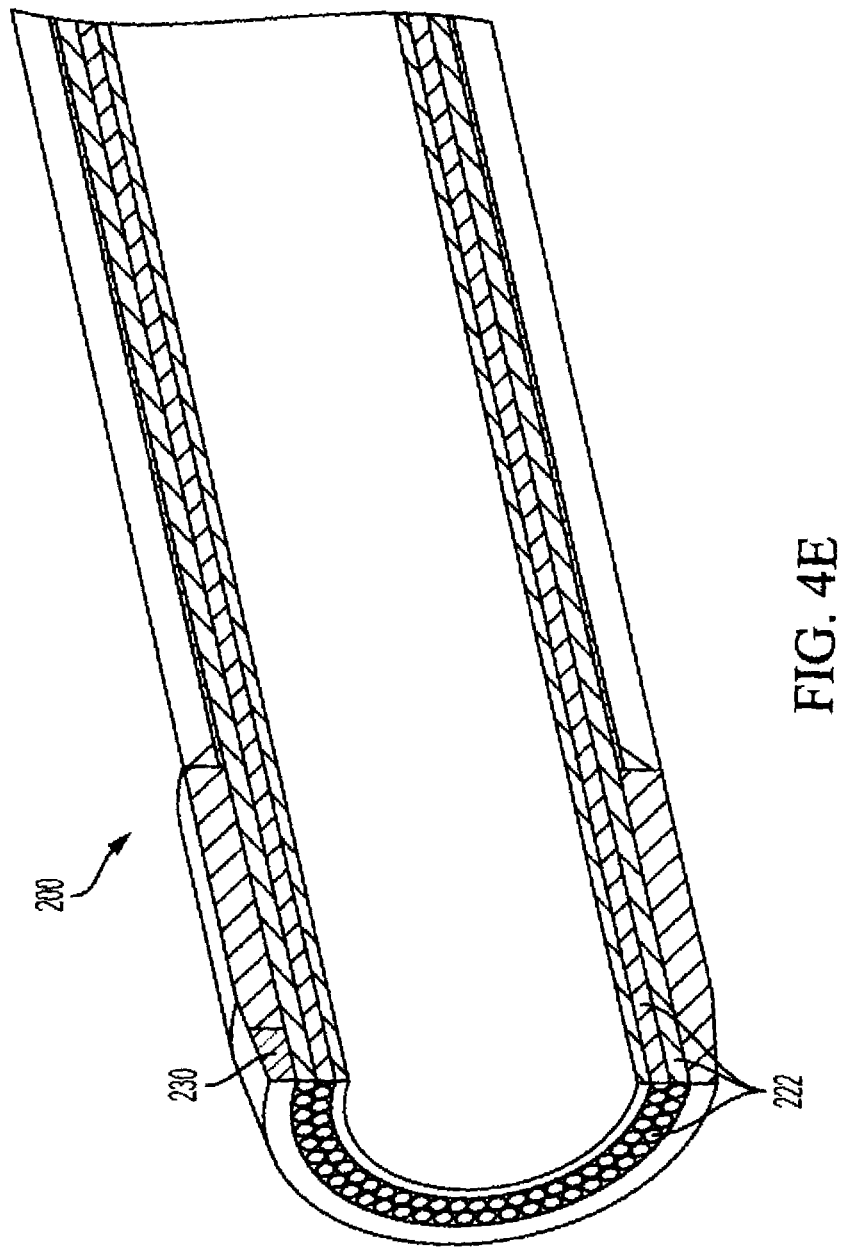

In one example, placement of such acoustic devices is illustrated in FIGS. 4A-4D, showing the acoustic device 230 placed very close to the distal end of the catheter or in contact with the tip. In order to enable assembly in a small profile catheter tip, elements such as acoustic waveguides or materials are selected for facilitating transmission and decreasing reflection (due to impedance mismatch) of acoustic signals inside the catheter until they get to the acoustic device. Components and elements for so doing are known in the art. The tip may also incorporate saline irrigation paths that can improve acoustic signal coupling, in addition to cleaning of the optical path and fiber optic edge. Exemplary irrigation openings 231 are also shown in FIGS. 4A to 4C and can be located in between the optical fibers 222 as shown, or directly installed in the walls (not shown in the drawings).

Examples of the acoustic device used for these embodiments may include small piezo electric sensors, other catheter sensors known in the art. Examples of the acoustic device used for wire sensors may include any small acoustic sensors, such as capacitive micromachined ultrasound transducers, or otherwise known in the art.

In some embodiments, the acoustic signals may be monitored by one or more acoustic devices that are separate from the catheter but still placed into the patient's body during treatment (not shown). In one example, the acoustic device may be placed on a distal end or along the distal end of a secondary catheter or other medical device (such as a guidewire or other wire sensor) and advanced near the treatment site.

In some embodiments, and as shown in FIG. 1, the acoustic device 8 may be placed outside of the patient's body and in close proximity to the treatment area, including on the surface of the patient's body, during treatment. Ideally, for this embodiment the acoustic device 8 placed on the patient's body and in close proximity to the treatment area would receive the acoustic signals generated during treatment without obstacles that block the acoustic signals thus reducing potential for unwanted feedback or background noise. An advantage of placing the acoustic device 8 on the surface of the patient's body over or in close proximity to the treatment site is an increase in sensitivity of the acoustic readings due to the acoustic signal not being attenuated and/or modified in air or the noise from the treatment room surroundings. In this embodiment, acoustic device 8 that includes an angular view mode may be used. Alternatively, the acoustic device 8 may also be integrated into the laser system, thereby no need to contact the patient or move the acoustic device as catheter advances.

Figure 9:
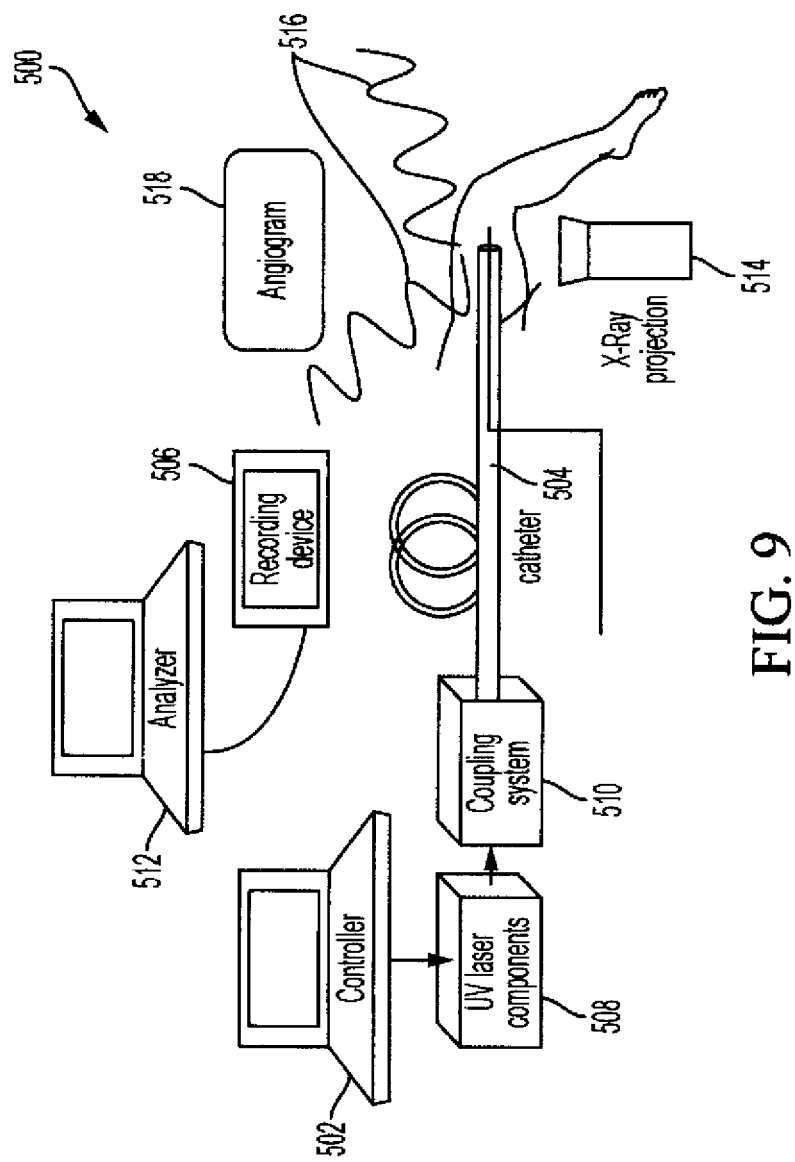
FIG. 9 illustrates an exemplary embodiment of the laser ablation and tissue classification system.
Figure 10:
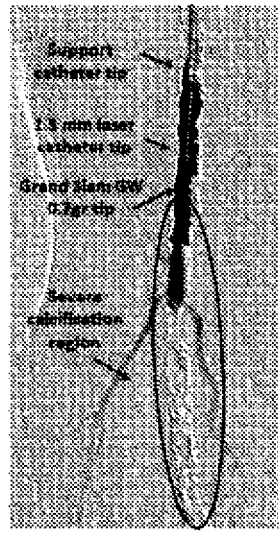
FIGS. 10A-10C illustrates an angiography images from the provided example.
Figure 10:
Figure 10:
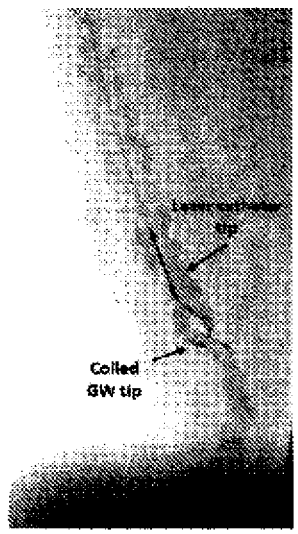

In some embodiments, the acoustic device 8 may be external and not placed directly on the patients skin during treatment, as shown in the embodiment illustrated in FIG. 9, which includes a recording device. Advantageously, utilizing an external acoustic device such as a recording device 506 may remove the need for modifying the laser catheters to incorporate the acoustic device and may thus significantly reduce any potential complications in manufacturing a catheter with incorporated sensors. Also, this embodiment may eliminate a potential need to sterilize the acoustic device 506 and/or avoid the need to place anything additional on the patient's skin during treatment. It is understood that utilizing an external sensor not on the patient's skin may elevate unwanted feedback or background noise in the signal obtained. However, by applying the herein disclosed algorithm(s), the unwanted feedback or background noise can be significantly reduced and/or sufficiently eliminated to provide reliable real-time monitoring of the ablation process.

In any of the embodiments described above, the system may include an algorithm to reduce background noise; to filter the acoustic signals received by the acoustic device; to compare the acoustic signals received by the acoustic device with acoustic signals from previous treatments; to identify tissue types being ablated based on the received acoustic signals; and/or to identify the location of the catheter in the blood vessel based on the received acoustic signals.

The algorithm may complete the following instructions including, but not limited to: (i) read the data from the acoustic device, such as a TASCAM DR-100MK III, by passing through the WAV file in intervals of up to 3 msec (it is naturally a LPF of 333 Hz); (ii) search for a relevant signal value that is higher than a threshold value; (iii) extract a desired signal by determining if the relevant signal value is within an interval of time (such as up to 0.3 msec) and is bigger in a given factor than any other value in the remaining 2.7 msec interval it is detected as a relevant signal to be processed; and/or (iv) filter the desired signals by the definition of the MFCC features (by tuning the parameters of the MFCC calculations) and the SVM classifier. The algorithm may complete the following instructions including, but not limited to (i) reading or analyzing the data from the WAV files to variables; (ii) extracting the desired signals; (iii) calculating the MFCC of the data; (iv) dividing the data classes (using previous treatment data as described in more detail below); (v) dividing the data to train, validation & test datasets; (vi) fitting the model using an SVM model; and/or (vii) predicting the datasets; and plotting the confusion matrix results.

For example: when a 40 Hz laser at a pulse width of less than about 200 nanoseconds (capable of inducing ablation with a sharp acoustic signal) is used, signals obtained at within 1-2 microseconds after the laser pulse can be analyzed to detect primary effects and signals obtained at about 1 microseconds to 5 milliseconds after the laser pulse can be analyzed to detect secondary effects. As a non-limiting example, when laser radiation is impinged in blood without touching calcium, the primary effect may be the acoustic signals generated by the blood, and the secondary effect may be the breaking of the calcium as a result of the cavitation bubble of the blood.

Referring now to FIGS. 5-8C, provided herein is a method for treating blood vessels of a patient. Flowcharts 300, 313, 321, and 329 are shown to be cyclic however according to other embodiments, and as further elaborated below a non-cyclic version of the method is also envisaged and within the scope of this disclosure.

Figure 5:
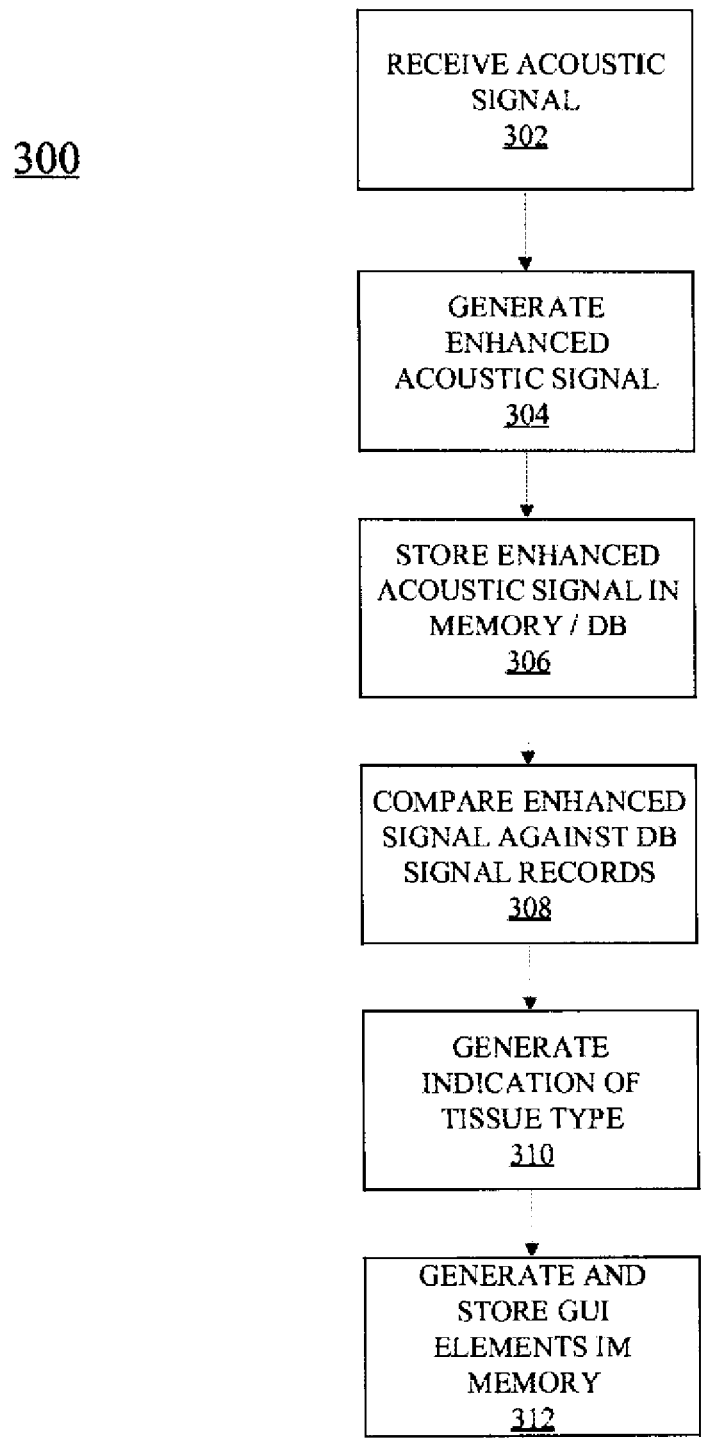
FIG. 5 illustrates a routine 300 in accordance with an exemplary embodiment.

[1] Reference is now made to FIG. 5, which depicts a non-limiting routine 300 which may be implemented by a laser ablation and tissue classification system 1 during a medical treatment procedure. At block 302, an acoustical signal 10 generated by the application of laser energy to tissue is received. At block 304, an enhanced acoustic signal 10 is generated using noise reduction, filtering and other processes described elsewhere. As shown in block 306, the enhanced acoustical signal is stored in memory 11. Optionally, the signal may be stored in treatment database 1202. At block 308, the enhanced signal is compared against acoustical signal data records previously stored in the treatment database 1202. At block 310, indications of tissue type are generated based on the comparison performed at block 308. Graphical data comprising an indication of the tissue type is generated at block 312. This graphical data may be stored in memory 11 as GUI elements 22.

Figure 6A:
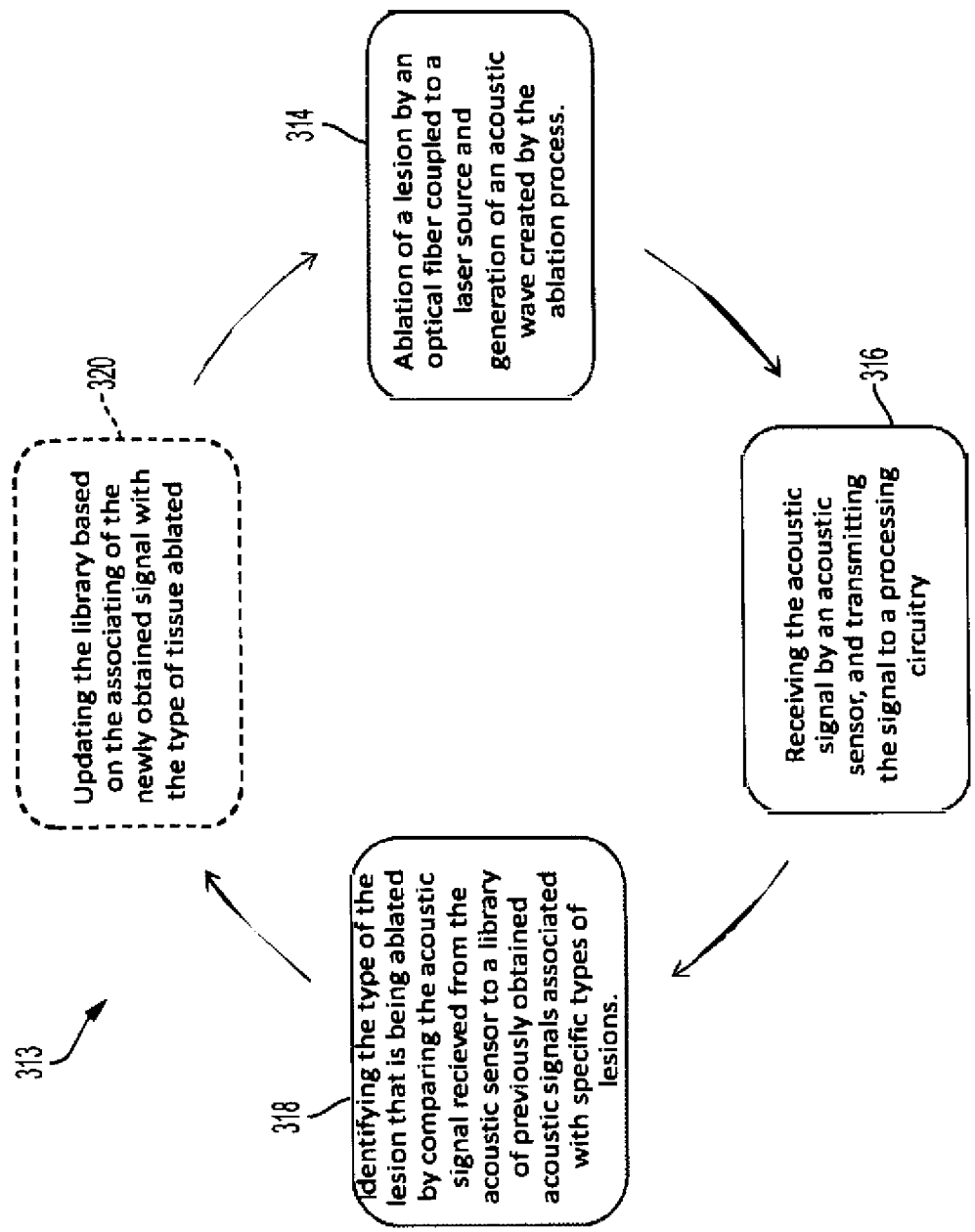
FIG. 6A illustrates a routine 313 in accordance with an exemplary embodiment.

Referring now to FIG. 6A, according to some embodiments, as shown in flow chart 313, a method includes a step of ablating a lesion using one or more optical fibers functionally associated with a laser source and as a result of the laser ablation generating an acoustic signal 314. The method may include the steps of receiving and/or sensing an acoustic signal by an acoustic device, and transmitting the signal to a processor or processing circuitry 316. The processing circuitry may identify the type of lesion found within the blood vessel by comparing the obtained acoustic signal to a library of previously obtained acoustic signals 318.

According to some embodiments, the identifying the type of lesion step 318 may include signal processing algorithm(s) and/or a machine learning algorithm, as described in more detail below. According to some embodiments, the signal processing may include a noise reduction algorithm and/or a feature extraction algorithm. According to some embodiments, the processing may include classifying the obtained signal by applying a classification instruction. For example, the processor learns the features of each class of tissue based on the acoustic signal it produces while being ablated. The classification is determined by the best fit of the new unseen data to the trained data.

Optionally, the method may include a step of updating the library and/or the machine learning algorithm with the newly obtained signal data 320.

Figure 6B:
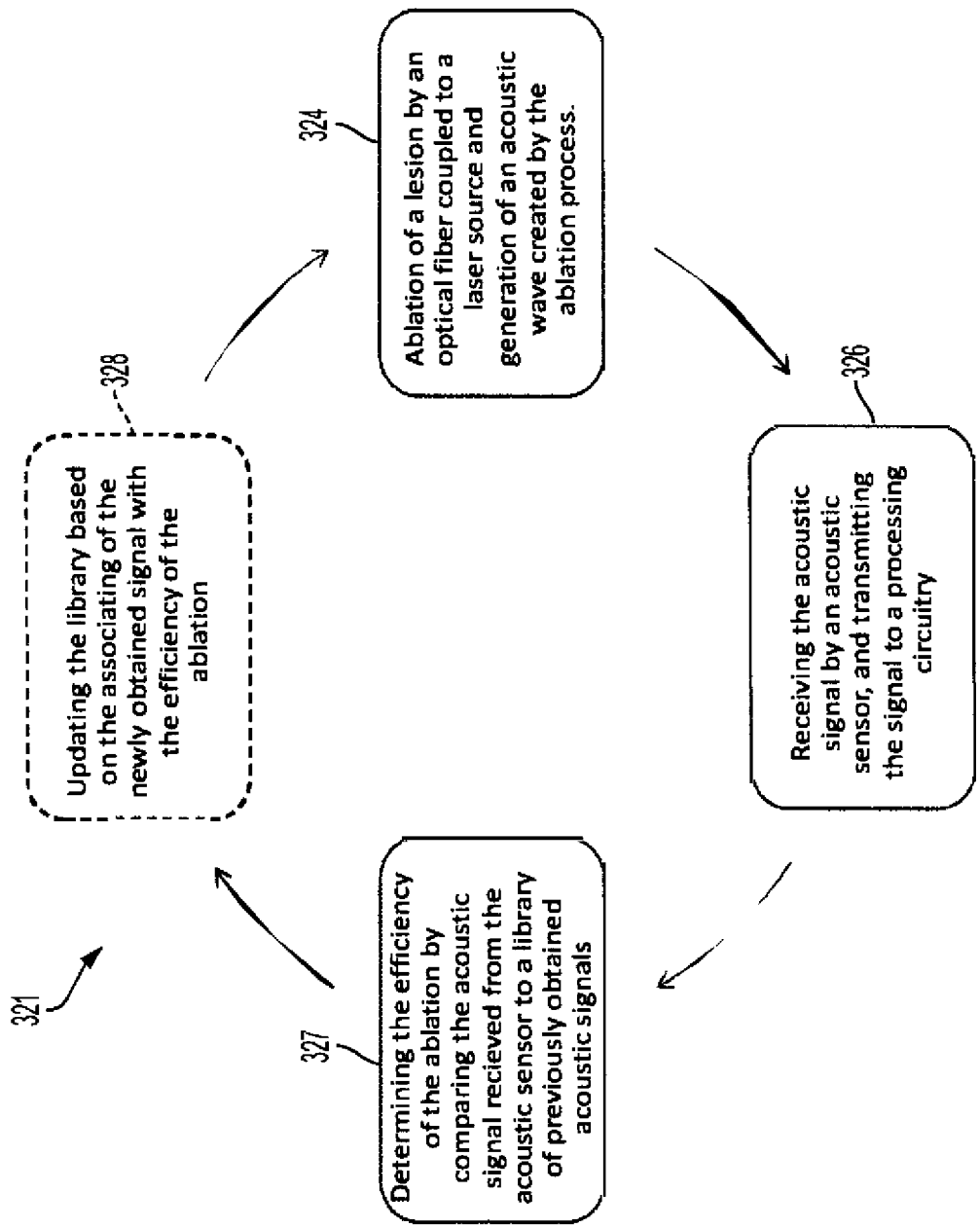
FIG. 6B illustrates a routine 321 in accordance with an exemplary embodiment.

Reference is now made to FIG. 6B, which schematically illustrates a flowchart 321 of a method for identification of ablation efficiency of lesion within a blood vessel; according to some embodiments of the present invention.

According to some embodiments, the method includes a step of ablating a lesion using one or more optical fibers functionally associated with a laser source and as a result of the laser ablation generating an acoustic signals 324.

The method further includes a step of receiving and/or sensing the acoustic signal using acoustic device and transmitting the signal to a processing circuitry 326.

The processing circuitry may then determine the efficiency of the ablation by comparing the obtained acoustic signal to a library of previously obtained acoustic signals 327.

According to some embodiments, the determining the efficiency of the ablation step 327 may include signal processing algorithm(s) and/or a machine learning algorithm, as described in more detail below. According to some embodiments, the signal processing may include a noise reduction algorithm and/or a feature extraction algorithm. According to some embodiments, the processing may include classifying the obtained signal by applying a classification instruction. For example, the processor learns the features of each class of tissue based on the acoustic signal it produces while being ablated. The classification is determined by the best fit of the new unseen data to the trained data.

Optionally, the method may include a step of updating the library and/or the machine learning algorithm with the efficiency of the newly obtained signal data 328.

Figure 6C:
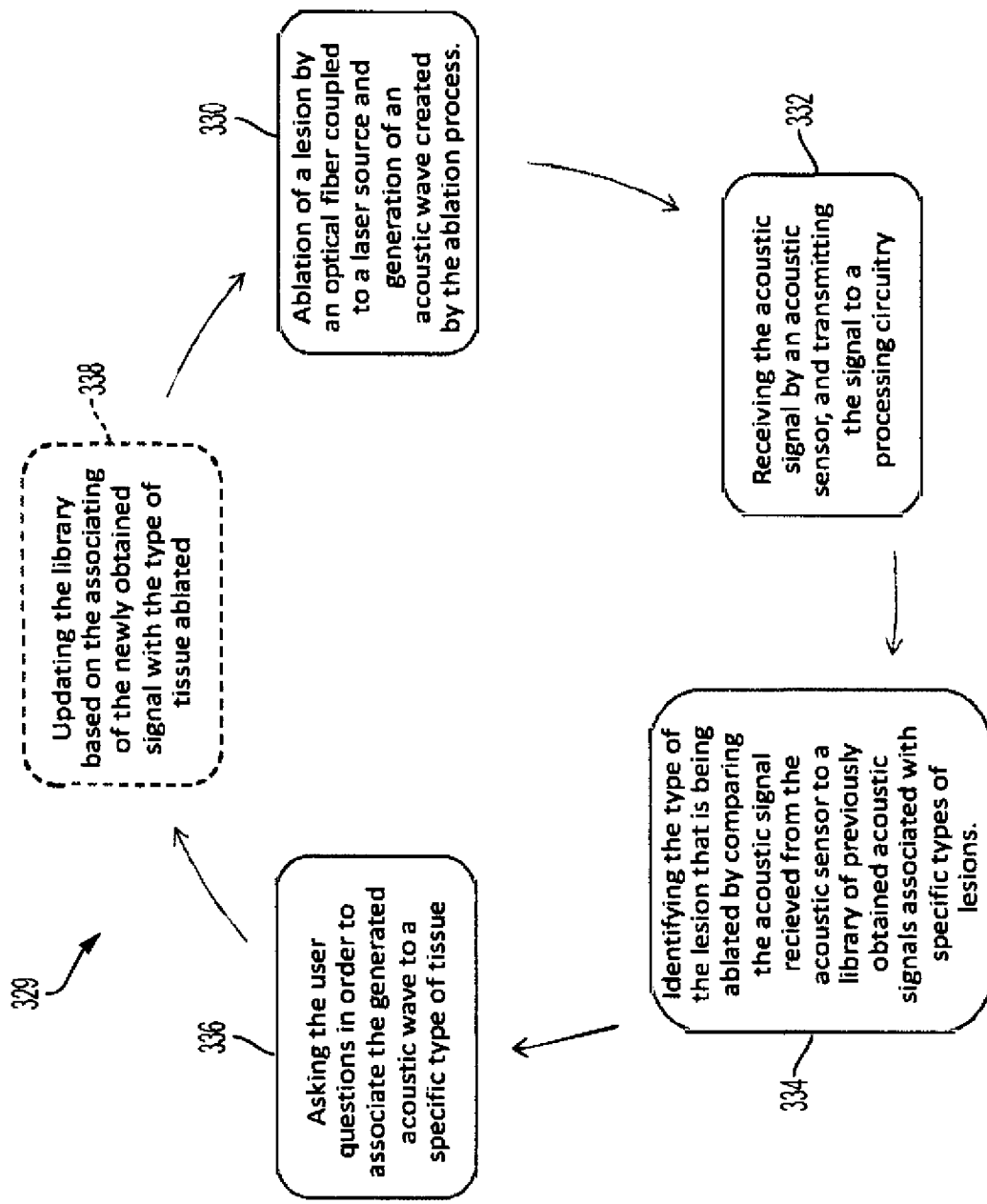
FIG. 6C illustrates a routine 329 in accordance with an exemplary embodiment.

Reference is now made to FIG. 6C, according to some embodiments, the method for identification of a type of lesion within a blood vessel includes a step of ablating a lesion using one or more optical fibers functionally associated with a laser source and as a result of the laser ablation generating an acoustic signal 330. The method further includes a step of receiving and/or sensing the acoustic signal using acoustic device and transmitting the signal to a processing circuitry 332. The processing circuitry may then identify the ablation efficiency by comparing the obtained acoustic signal to a library of previously obtained acoustic signals 334.

According to some embodiments, the step of identifying the type of lesion step 334 may include signal processing algorithm(s) and/or a machine learning algorithm, as described in more detail below. According to some embodiments, the signal processing may include a noise reduction algorithm and/or a feature extraction algorithm. According to some embodiments, the processing may include classifying the obtained signal by applying a tissue classification instruction. For example, the processor learns the features of each class of tissue based on the acoustic signal it produces while being ablated. The classification is determined by the best fit of the new unseen data to the trained data.

The method may further include a step of asking the user questions in order to associate the generated acoustic signal to a specific type of tissue according to some embodiments 336. Optionally, the method may include a step of updating the library and/or the machine learning algorithm with the newly obtained signal data 328.

If the method includes the step of asking the user questions 336 in order to associate the generated acoustic signal to a specific type of tissue, according to some embodiments, this may then include additional method steps. For example, the GUI may prompt the user with questions either after the procedure ends, or alternatively during the procedure. The method may include generating prompts on the GUI to provide the user with information in order to associate the generated acoustic signal to a specific type of tissue. For example: if the system identifies/determined an acoustic signal as being generated from laser impingement on a stent, an option on a GUI may provide warning to the user: "Has the laser worked inside a stent?" According to the feedback of the user on the GUI, this feedback and procedure result data may be used for future treatments and incorporated into the machine learning algorithms if a similar/identical acoustic signal is associated with presence of a stent.

Figure 7:
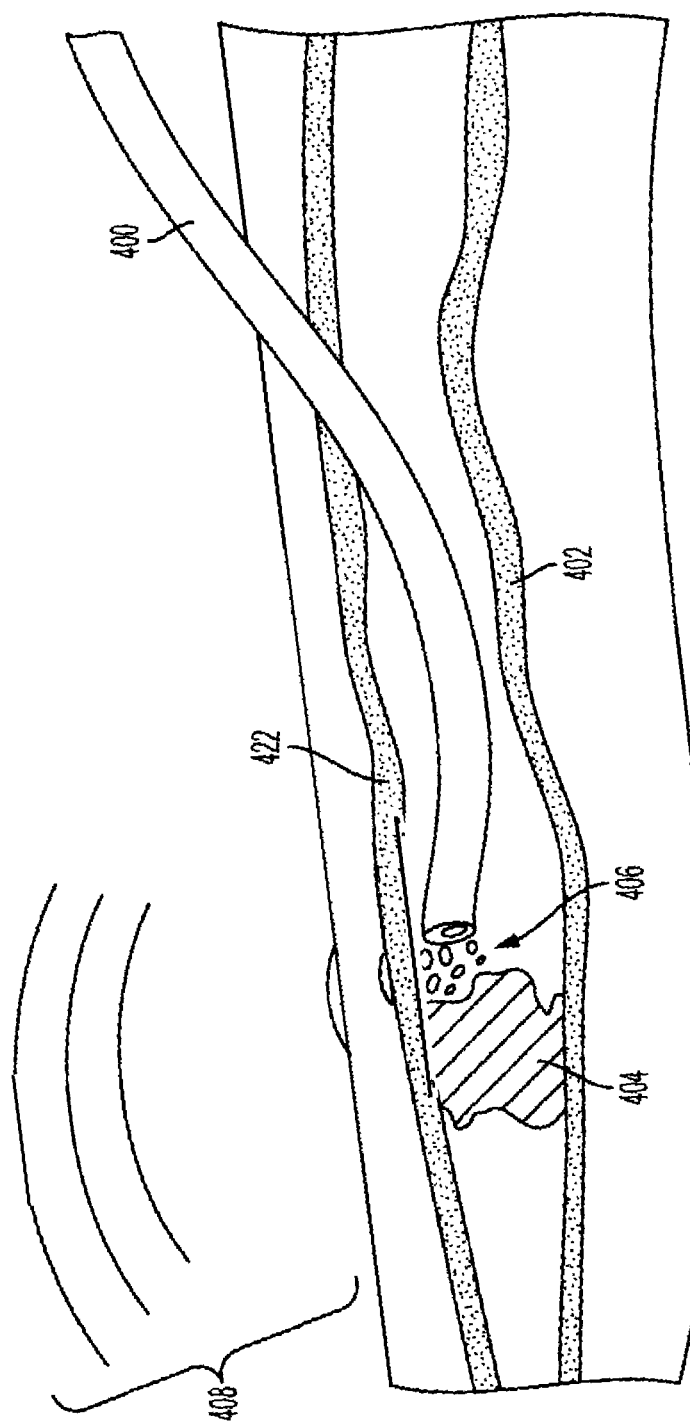
FIG. 7 shows the acoustical signals generated during use of an exemplary cylindrical tip section of a hybrid catheter inside a vessel.
Figure 8A:
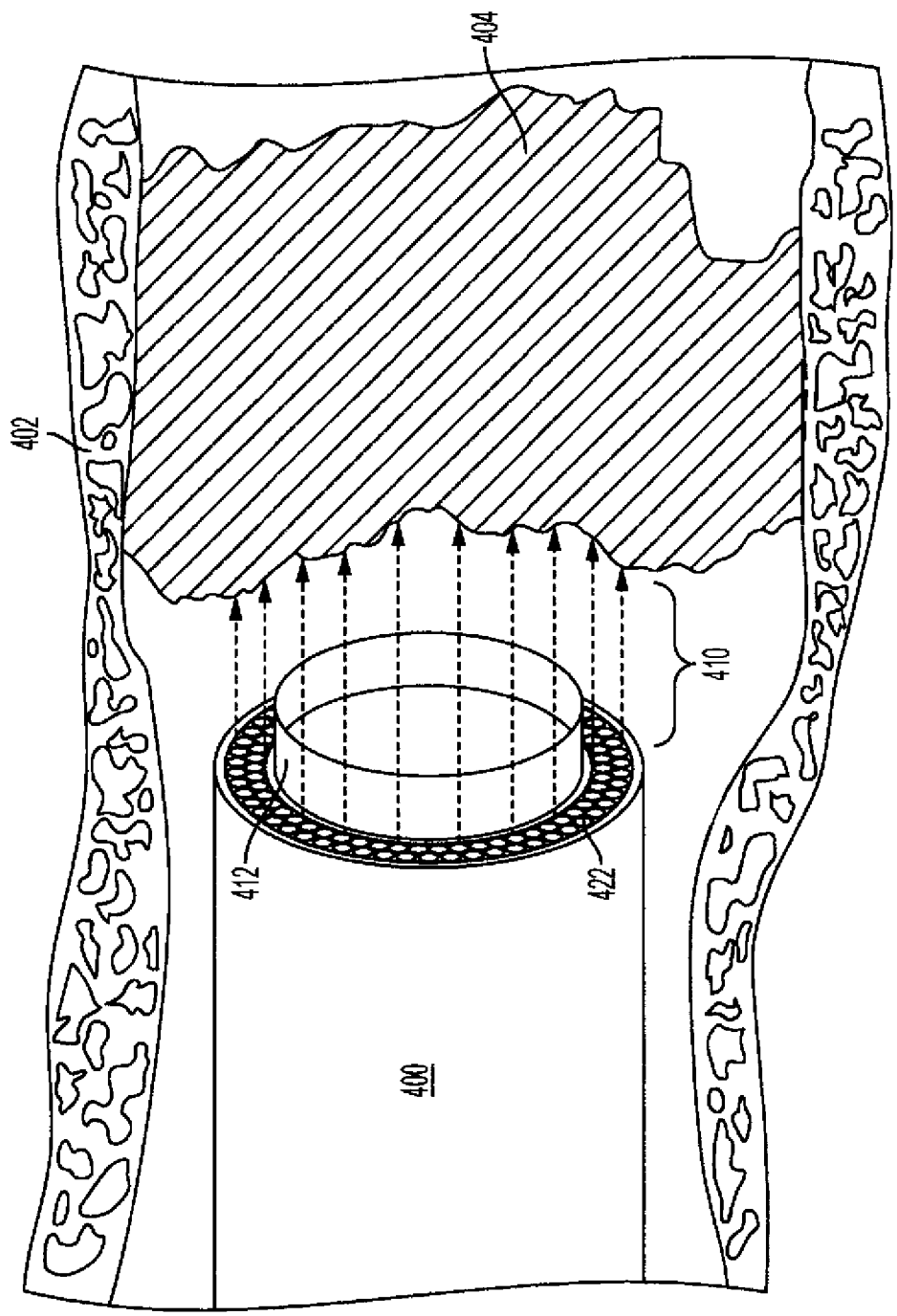
FIG. 8A-C illustrate delivery of laser radiation from the distal ends of the hybrid catheter to a CTO, blood and vessel wall.
Figure 8B:
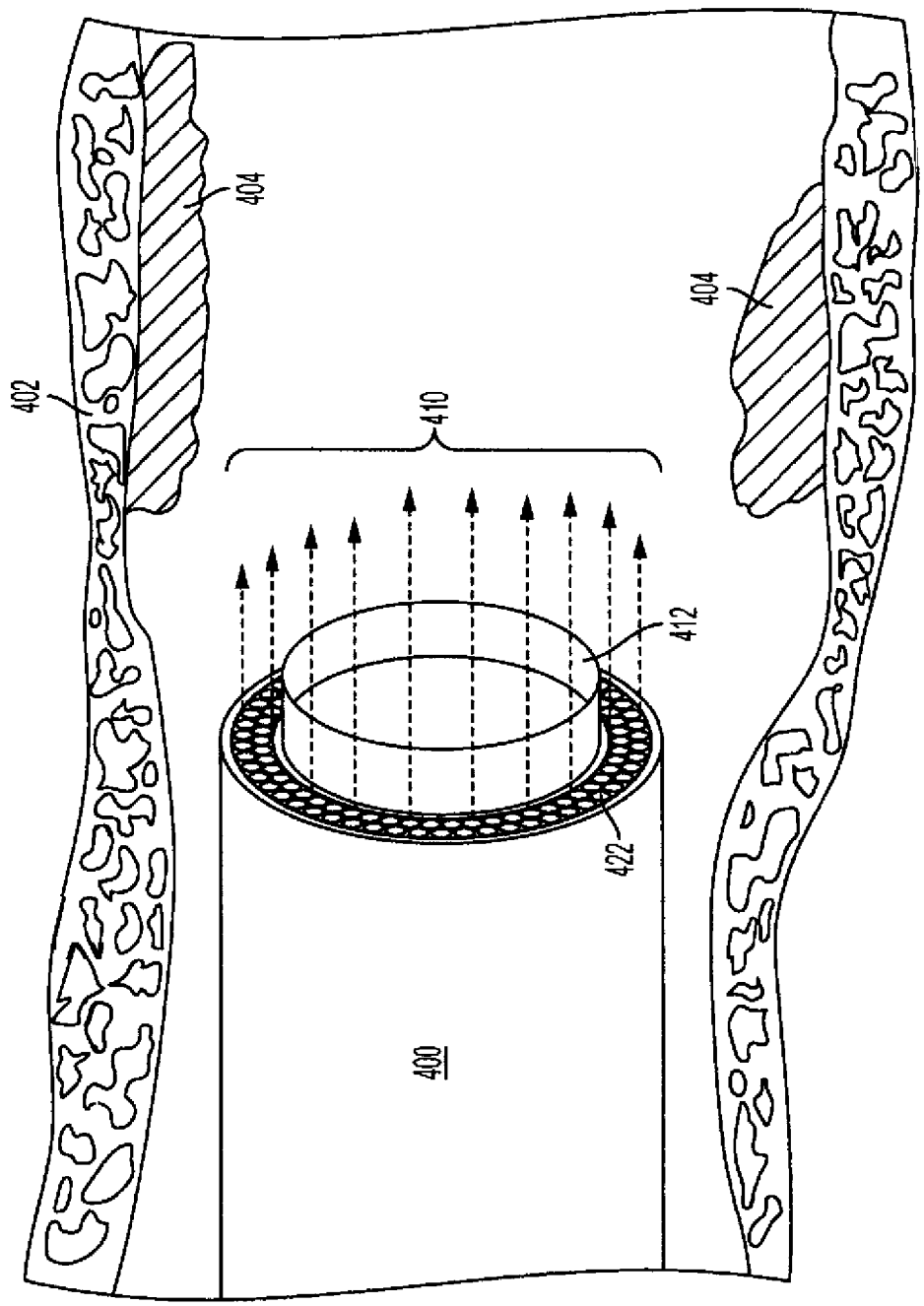
Figure 8C:
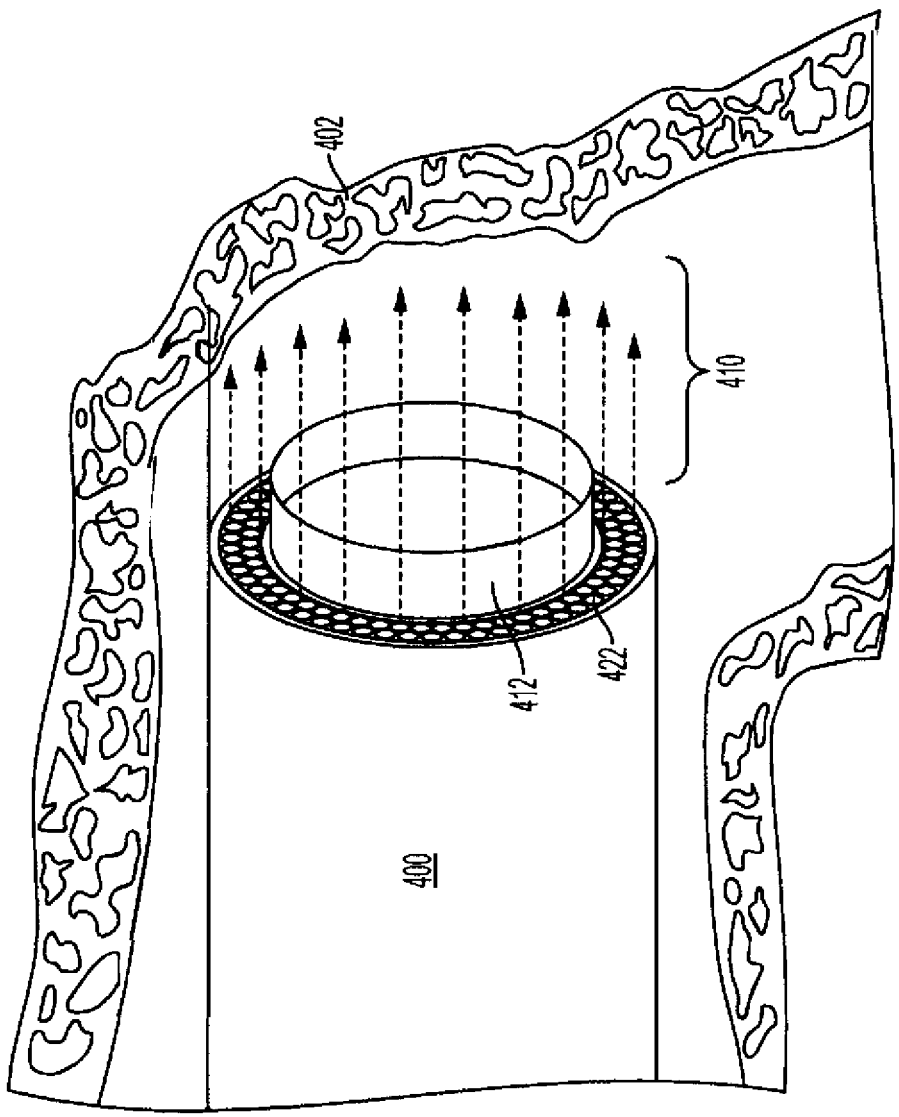

Referring now to FIGS. 7-8C, methods of operation and use of the device are discussed. First, a user may manually enter treatment protocol data, including, but not limiting to, vessel type, lesion type, location of lesion through an input device such as a keyboard, touch-screen GUI interface or other known devices. After the laser generator is activated and catheter is connected via catheter connector, laser parameters may be set, displayed and/or adjusted using I/O devices. In non-limiting examples, laser parameters may include waveform type (continuous or pulsed), pulse width, power settings, and/or fluence laser. If the acoustic device is not incorporated within the laser ablation and tissue classification device, the user may operatively connect the acoustic device to the laser ablation and tissue classification device. The user may place the acoustic device on the patient's body (if required in the particular embodiment). Alternatively, if the acoustic device is part of the laser catheter 400 (as described above) or intended to be placed inside the patient's vessel, the user may prepare the acoustic device as required. Next, the user may place the laser catheter 400 into the patients vasculature, such as a blood vessel 402, and advance the laser catheter 400 towards the target tissue 422 of the treatment site.

In some embodiments, the user may activate the laser ablation and tissue classification device and select an option to deliver a low laser energy (such as energy having a fluence below 50 mJ/mm2) test pulse(s) to the target tissue 422. Such low laser energy test pulses may be used to confirm or identify lesion type, such as target tissue 422 vs. non-target tissue such as a blood vessel 402, before starting delivery of laser energy at power levels necessary for the ablation procedure. In some embodiments, acoustic signals generated by the low energy threshold pulse may be captured and transmitted using high-sensitivity acoustic sensors located at catheter tip section. If the delivered test pulse(s) energy level is insufficient to a generate a sound wave detectable by an acoustic sensor, a pressure sensor may be used to capture changes in pressure due to the test pulse. In some embodiments, a MEMS piezoresistor sensor, which converts pressure signals into electrical signals may be incorporated into the catheter tip. The electrical signals generated by the test pulse(s), whether from an acoustical or pressure wave, may then be used as input into a processor and storage in the treatment database. The treatment database may store data records associated with previously acquired test signals and be accessed to generate pre-treatment feedback using the same processes used to generate feedback during a treatment procedure. In some advantageous aspects, pre-treatment feedback allows user to (1) identify the tissue type the test pulse is acting upon (2) confirm that the catheter tip is positioned correctly and (3) adjust position of the catheter if needed prior to start of ablative energy delivery.

Next, the user may select an option to begin the laser ablation procedure and deliver the laser radiation 410 from the optical fibers 422 required to perform the intended photo-ablation on the target tissue 422. Photo-ablation may include, but not limited to, deliver of laser radiation sufficient to result in photo-mechanical ablation of the target tissue 422, including, but not limited to, cavitation bubbles 406, jet formation, and/or shockwaves, vaporization of the target tissue 422, and/or photo-chemical ablation of the target tissue 422. The user may advance the catheter tip 400 at the desired rate. Forward advancement of the catheter tip 400 may force the cutter element 412 into the target tissue 422, thereby aiding in debulking the target tissue 422, as described in more detail herein.

The system may provide real-time information through the GUI interface based on the acoustic feedback received during the ablation of the target tissue 422. For example, the system may provide the user with real-time information specific to the tissue classification, tissue type, ablation efficiency, and catheter tip 400 location in the vasculature.

For example, if the catheter tip 400 has been placed into a blood vessel of a patient and advanced towards a target tissue 404 to be treated. As laser energy it transmitted from the optical fibers 422 of the catheter photoablation occurs (as described above) resulting in cavitation bubbles 406 to form near the treatment site, as shown in FIG. 7. These cavitation bubble 406 together with the other mechanisms of action resulting from the laser ablation generate the acoustical signals 408 (shown here for representations purposes only) that will be received, transmitted, classified, and otherwise processed by the system.

As shown in FIG. 8, illustrates a method of using the system and devices disclosed herein in a vessel having a chronic total occlusion (CTO). In at least one embodiment of the method a user has placed the catheter inside a blood vessel 402 and advanced the catheter tip 400 towards a target tissue 404, such as a CTO, within a treatment site. The user has activated the laser device and the optical fibers 422 of the catheter tip 400 are shown transmitting and/or emitting laser radiation (depicted by arrows 410) onto the target tissue 404 thereby generating and/or emitting a unique acoustic signal indicative of the tissue type—here a CTO. Before the user advances the catheter tip 400, and in some embodiments debulks the target tissue 404 with the cutter element 412, the system receives, records, processes, and/or analyzes the received acoustic signal generated from laser impingement on a target tissue 404.

The user may perform an interactive process with the laser system by ablating the tissue to be treated; receiving real-time information on the GUI based on the tissue classification analysis performed on the received acoustical feedback, including, but not limited to, the type of tissue being ablated and the ablation efficiency; and adjusting certain treatment parameters throughout the ablation (if required). For example, after the tissue has been ablated and the acoustical feedback has been processed, the GUI may then provide a notification to the user to determine if any of the treatment parameters need to be adjusted. Treatment parameters to be adjusted include, but are not limited to, (i) repositioning the catheter; (ii) adjust laser energy levels; (iii) adjust laser energy parameters; (iv) terminating the laser procedure; and/or (iv) temporarily pausing laser energy delivery. If the user selects yes to catheter repositioning, the user may continue to advance the catheter toward the target site, retract catheter away from the target site, and/or deflect catheter in a certain direction. In some embodiments, the system may activate the deflection motor to aid in the deflection and repositioning of the catheter.

Post-treatment, the GUI may include options that allow the user to provide additional input and information about treatment options and/or provide the user with notifications about the treatment procedure including, but not limited to: the laser energy ablating target tissue; the tissue type being ablated by the laser energy; the amount of target tissue being treated or that has been treated; additional input and information about the type of target tissue that was treated and/or is being treated in real-time, for example was the tissue type treated/being treated: calcified lesion; plaque; thrombus; and/or non-target tissue.

The system may also provide real-time feedback to help a user determine if a treatment parameter needs to be adjusted based on the acoustic feedback received and processed during the ablation.

FIG. 8B illustrates delivery of laser energy into blood within a vessel. In at least one embodiment of the method a user has placed the catheter inside a blood vessel 402. In this example, when the user activates the laser device the laser radiation 410 will be emitted into blood and generate a unique acoustical profile or feedback indicative of blood, rather than a lesion. The system receives, records, processes, and/or analyzes the received acoustic signal generated from laser impingement in blood. Identification of blood/laser interaction by the system may indicate that the procedure has resulted in removal of sufficient target tissue from the original lesion to reestablish vessel patency and/or that the catheter is not positioned correctly.

The user may perform an interactive process with the laser system by ablating the tissue to be treated; receiving real-time information on the GUI based on the tissue classification analysis performed on the received acoustical feedback, including, but not limited to, the type of tissue being ablated and the ablation efficiency; and adjusting certain treatment parameters throughout the ablation (if required), including stopping the delivery of laser energy to the catheter. For example, after delivering laser energy into blood and the acoustical feedback has been processed, the GUI may then provide a notification to the user that the laser energy is being delivered in only blood to determine if any of the treatment parameters need to be adjusted in response. Treatment parameters to be adjusted include, but not limited to, (i) repositioning the catheter toward a target tissue 404; (ii) adjust laser energy levels to avoid unwanted effects of delivering energy in only blood; (iii) adjust laser energy parameters; (iv) terminating the laser procedure; (v) temporarily pausing laser energy delivery; and/or (vi) the amount of fibers activated and/or illuminated can be controlled. If the system determines the laser energy is being delivered in only blood it can control the total energy transmitted to the tissue by instead of firing the entire fiber bundle individual fibers can be illuminated, such as by scanning a laser beam in the coupling of laser to catheter. If the user selects yes to catheter repositioning, the user may continue to advance the catheter toward the target site, retract catheter away from the target site, and/or deflect catheter in a certain direction. In some embodiments, the system may activate the deflection motor to aid in the deflection and repositioning of the catheter. Depending on the user input to the system in response to these notifications the system may automatically stop the laser device.

Post-treatment, the GUI may include options that allow the user to provide additional input and information about treatment options and/or provide the user with notifications about the treatment procedure, including, but not limited to: was laser transmitted in blood; tissue type detected as blood; was laser transmitted on a blood vessel; was laser transmitted in a stent; laser transmitted on a blood vessel is recognized; and/or did any safety or unexpected events occur.

As shown in FIG. 8C, in at least one embodiment of the method a user has placed the catheter inside a vessel wall 402 and advanced the catheter tip 400 towards a target tissue 404 within a treatment site. In this example, when the user activates the laser device the laser radiation 410 will be emitted into a vessel wall 402. Emitting the laser radiation 410 into a blood vessel wall 402 will generate a unique acoustical feedback profile indicative of a blood vessel wall. The system will receive, records, processes, and/or analyzes the received acoustic signal generated from laser impingement on the blood vessel wall 401.

Being able to detect the unique acoustical feedback profile indicative of a blood vessel wall may be advantageous during a lead extraction procedure. For example, if during a lead extraction procedure the unique acoustical feedback profile indicative of a blood vessel wall is detected the system may automatically pause laser energy delivery during treatment may prevent perforation of the superior vena cava during lead extraction procedures. Complications associated with unintended ablation of stents during in-stent restenosis procedures may be avoided. Such an embodiment may be advantageous in asymmetrical lesions which are not clearly delineated during pre-treatment imaging. In other advantageous aspects of the invention, real-time feedback during the treatment may contribute to increased procedural success rates (as defined for example by percentage increase in vessel patency), decrease treatment times and reduce the incidence of necessary re-treatment procedures.

The user may perform an interactive process with the laser system by ablating the tissue to be treated; receiving real-time information on the GUI based on the tissue classification analysis performed on the received acoustical feedback, including, but not limited to, the type of tissue being ablated and the ablation efficiency; and adjusting certain treatment parameters throughout the ablation (if required), including stopping the delivery of laser energy to the catheter. For example, after delivering laser energy on a blood vessel 402 and the acoustical feedback has been processed, the GUI may then provide a notification to the user that the laser energy is being delivered on a blood vessel 402 to determine if any of the treatment parameters need to be adjusted in response. Treatment parameters to be adjusted include, but not limited to, (i) repositioning the catheter away from the blood vessel 402; (ii) adjust laser energy levels to avoid unwanted effects of delivering energy on a blood vessel 402 (and thereby avoiding unwanted vessel perforation); (iii) adjust laser energy parameters; and/or (iv) terminate the laser procedure. If the user selects yes to catheter repositioning, the user may continue to advance the catheter toward the target site, retract catheter away from the target site, and/or deflect catheter in a certain direction—for example away from the wall of the blood vessel 402 and towards the lumen. In some embodiments, the system may activate the deflection motor to aid in the deflection of the catheter away from the wall of the blood vessel 402.

Depending on the user input to the system in response to these notification the system may automatically stop the laser radiation 410 from being emitted from the catheter to avoid unwanted injury, such as perforation of the blood vessel 402. The user may then verify that the catheter is not shooting on the blood vessel and will be able to reactivate the laser. In some embodiments the laser energy maybe automatically reduced in such a case instead on stopping the laser.

In some embodiments, the physician determines that the catheter is not shooting on the blood vessel, they may press "Ignore" or otherwise disarm the warning on the GUI and continue with the procedure.

Post-treatment, the GUI may include options that allow the user to provide additional input and information about treatment options and/or provide the user with notifications about the treatment procedure, including, but not limited to: laser shot on wall of the blood vessel; laser shooting in blood vessel; has a perforation occurred during the procedure; has a dissection been noticed during the procedure; was laser shot in blood; was catheter stacked in the lesion; and any safety or unexpected events occur.

It may be advantageous to add a question to the user about the certainty of the identification by the acoustic signal feedback feature. This could be by giving a scale to the user, wherein 1 is for not certain and 5 is for certain. Other methods may also be used.

It is possible that noise level and the distance between the acoustic device and the treatment site may vary from one hospital to another, it is possible that each system will have its own library of acoustic signals and its associated tissue type.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

Certain treatment parameters may define a specific acoustic signal, such treatment parameters may comprise any of the following: lesion type; vessel size, vessel location, extent of blockage, size of catheter and fluence. Additionally, any of these treatment parameters may be entered into the GUI by the user prior to the start of a treatment procedure. Moreover, the system may provide the user with an option of delivering laser at a lower energy than the ablation threshold for sensing the acoustic signals.

The acoustic signal may change as the treatment progresses and can be used to indicate the extend of the treatment, such as the catheter is only partially through the lesion or the catheter has successfully passed through the lesion.

The acoustical signal may be derived from laser/tissue mechanisms of action including: photomechanical, photochemical, plasma formation, photo-thermal or vaporization

EXAMPLE

Referring now to FIG. 9-FIG. 11B, the following description includes a post-classification of ablated tissues using acoustic signals recorded by an audio sensor, including a microphone, placed outside of the patient's body during an atherectomy procedure using a 355 nm solid-state laser atherectomy procedures performed with a step-by-step ("SBS") approach, some with highly sever calcified lesions.

The classification results of these ablation signals recordings showed 93.7% classification accuracy with arterial vs. non-arterial wall material. The results of these first acoustic post-classification in SBS cases demonstrate recording the acoustic signals using a non-contact audio sensor, such as a microphone, may serve for an on-line classification of ablated tissue. Advantageously, this system and method of use could be used to confirm correct positioning of the treatment device in the vasculature, determine the type of tissue being ablated, warn the user of ablation of non-target tissue, and reduce the risk of vessel perforation using 355 nm laser.

Disclosed herein is a method for recording audio signals during a treatment procedure and a method for post processing of the audio signals recorded during the treatment procedure. The experimental use of the disclosed system during this human study achieved high accuracy differentiating arterial vs non-arterial wall material using the recorded audio signals and post processing method of such signals. This human study constituted a proof of concept to perform an on-line monitoring of intravascular material treated in endovascular procedures in human, specifically in cases of challenging occlusions, using the acoustic signals recorded from an audio sensor, including, but not limited to a microphone outside of the body without direct contact with the patient.

The experimental setup for recording ablation acoustic signals during laser atherectomy in human, as shown in FIG. 9. The system 500 used comprised a controller 502, a catheter 504, a recording device 506, a laser device 508, a coupling system 510 to couple the laser device 508 together with the catheter 504, an analyzer 512, an x-ray projection 514, a angiogram machine 518, and illustrative representations of the acoustic signals 516 (shown here for representations purposes only) generated as a result of the laser ablation procedure. The acoustic signal(s) formed 516 and/or generated from the inside of the artery during laser operation were strong enough to be sensed or recorded in the room space. The experimental setup included the commercial laser ablation system comprising UV laser 508 and catheters 504—with fluence of 50 or 60 mJ/mm2 per pulse, 355 nm wavelength, repetition rate of 40 Hz, and s pulse duration of between 1-25 ns; the laser pulses are coupled to a dedicated catheter. The specific and dedicated parts of the experimental set up for the acoustic signals recording comprised an audio sensor, which for this experiment included a recording device 506—TASCAM DR-100mkIII, 192 kHz. This recording device 506 has onboard dual build directional stereo microphones with an integrated shock mount structure to suppress unwanted vibrations and handling noises. The experimental system also comprised an audio signal analysis program 512, such as MATLAB. In addition, the experimental system comprised a standard angiogram setup 518, the medical team's operating tools, and working channel for any standard percutaneous endovascular intervention performed in the catheterization lab.

This experiment included recording and analyzing acoustic signals from five subjects that underwent SBS procedures.

One of the five cases had two extremely severely calcified Femoropopliteal occlusions in their left leg, one was a 10 cm occlusion in the mid superficial femoral artery (SFA), and a second was a 3 cm in the first segment of the popliteal artery. According to baseline imaging, the artery was very tortuous due to the intraluminal and circular calcification that could be seen on Computed Tomography (CT), and angiographic opacities demonstrating severe calcification along the entire occlusions that were also noted on fluoroscopic angiography. This case demonstrated the system described herein, including the audio sensor together with the audio signal analysis program, successfully recorded acoustic signals generated during the SBS approach during the laser ablation and the user was able to identify, retrospectively, whether non-target tissue (such as vessel wall) was ablated during the treatment.

As illustrated in FIG. 9, the ablation acoustic signals 516 were measured remotely using a recording device 506 from the room space, meaning outside of the body and not within the vessel being treated during the laser atherectomy. The audio signals 516 were recorded and sensed with unwanted background noise typical to the standard catheterization laboratory environment. The audio sensor recording device 506 was held by hand at approximately a distance of 1.5 m 0.5 m from the patient and it was verified that distance was kept at every laser activation. The directional microphones of the audio sensor recording device were remotely pointing to the ablated area, without exceeding an approximately 45 degrees cone in both horizontal and azimuthal axes.

Since the sensitivity to the acoustic signal(s) received from patients undergoing atherectomy treatment needed to be determined, one of the cases was started with a moderate audio sensitivity recording setting in order to avoid clipping of the audio data. After observing results with the moderate audio sensitivity recording setting, a higher audio sensitivity recording setting was used with success. It was observed in some cases the acoustic signals were smaller than the environmental noise in the room. One reason for the change in signal strength in these cases could be attributed to low local absorption, different catheter advancement rates, and/or different acoustic paths. In these scenarios, the acoustic signals could be defined by an algorithm as undetected and ignored. After the procedure was finalized, the recorded waveform audio (WAV) files were analyzed and marked the times when the laser was activated inside the artery. A defined artificial signal during lasing was observed. The next step was to extract the laser activation log from the laser console and compare the laser activation log to the marking in the WAV files. In addition, videos of all the fluoroscopic angiograms were recorded during the procedures. The fluoroscopic angiograms were reviewed and classified which tissue was in contact with the catheter's tip during lasing retrospectively. The information from the fluoroscopic angiograms were correlated by comparing them against the laser log and the markings in the WAV files. The WAV file was divided into separate signals then classified using a Support Vector Machine (SVM) classifier.

The machine learning classification algorithm used is based on the SVM classifier. SVM is a supervised learning algorithm that can be applied for classification using hyperplanes built from support vectors of the data set. In most cases, it requires a "hands-on" feature definition and selection.

The algorithm was written in MATLAB 2018a and implemented using Intel i5-6300U CPU. First, the signals are rescaled to a minimum value of −1 and a maximum value of 1. Then, a Mel-frequency cepstral coefficients (MFCC) feature is extracted. The data that was fed into the MFCC was each single pulse (pulse duration of 3 mseconds, corresponding to 577 discrete points). After the calculation of the signals' features, the data (composed of each signal features) is trained using the "fitcecoc" Matlab command and fits a multiclass model for SVM. When running hyper parameters optimization (optimization of the algorithm parameters for accuracy improvement), the variance between the results was very small; hence, we excluded the hyper parameters from the algorithm.

Furthermore, the machine leaning algorithm may improve the precision (true positive divided by the sum of true positive and false positive) at the expense of recall (true positive divided by the sum of true positive and false negative) and accuracy. This is important when less tolerance to the false-positive error (predicting non-arterial tissue where in fact it is arterial tissue), rather than the false-negative error (predicting arterial tissue where it is in fact non-arterial tissue), is needed. This was achieved by tuning the weights in the classifier of the machine learning algorithm.

Figures 11, 11A:

This example included a case with extremely severe calcification in two different lesions with total length of 13 cm to show the accuracy of the acoustic signals from what one skilled in the art may consider a challenging SBS case. FIGS. 10A-C demonstrates some of the steps during the SBS procedure, angiographically (FIG. 10A angiogram before lasing; FIG. 10B lasing with a 1.5 mm laser catheter; and FIG. 10C after advancing the GW in an SBS approach). The points in which the catheter, in any one of the attempts to ablate, could have been pointing to the vessel wall, can be easily identified using the disclosed system and method herein. By way of example, a user may be able to use the audio feedback to determine the type of tissue being ablated and use the images from an angiogram to assist in determine the exact location of the in the patient's vasculature. For example, if such incident would have been taking place during the procedure, this could have been detected by the algorithm and the user may have been altered of such via a warning or other indication, including, but not limited to, some visual indication on the GUI, a light or other visual warning on the capital equipment, and/or an audio warning (such as beeps or specific sounds emitted from the capital equipment). However, since the acoustic signals were analyzed retrospectively, and with high accuracy, most of the acoustic signals from this case were found to be non-arterial wall signals and matching to calcification and fibrotic tissue, it was confirmed that the SBS procedure was indeed successful and that the acoustic signals indicated as such. A final result of full recanalization compared to the original two occlusions can be seen in FIGS. 11A-11B, supporting the acoustic findings, with no dissections in the arterial wall, FIG. 11A showing the angiogram before lasing, and FIG. 11B showing the angiogram after the end of the whole procedure.

This example showed that recording through the air with a microphone and not by direct contact (i.e. to the patient's leg) with a hydrophone, allows for using and analyzing audio signal feedback to determine highly classified tissue with significant accuracy.

Application of the tissue classification instructions in real-time could detect a deviation into or against the arterial wall in real-time and a suitable warning (as described above) to the physician could have been provided in real-time.

The capture of acoustic signals derived from the short laser activation in the mentioned case of the sub-intimal penetration, emphasizes the importance of the acoustic signal recording during SBS cases, and as mentioned before, it will be more important in a less tissue-selective laser (Excimer 308 nm) where injury of the vessel wall is of higher probability. In this sub-intimal case, if the acoustic classification monitoring was employed on-line, it could have warned the physician in real-time once trying to advance the laser catheter (which only followed the previous GW that penetrated the arterial wall), that the catheter is eventually positioned across an endothelial tissue of the artery wall instead of an atheroma of the occlusion, a warning that could have guide the physician to reconsider the approach.

Although none of the cases in this small example was an in-stent restenosis, online acoustic monitoring may serve as a successful classification method for in-stent restenosis, and is especially important where a stent is broken, or where the GW passes through the struts with multiple stents. In this case, if the stent or its struts are identified, the catheter can be redirected in order to complete the procedure successfully. Also, additional uses may be cardiac lead extraction, for which the safety aspect is much larger as it is in central circulation, and online classification of the fibrotic vs venous wall is of great importance. Yet, additional set of other laser indications not related to vasculature, e.g. prostate, liver and pancreas could be greatly benefitted from such technology described herein.

Figure 12:
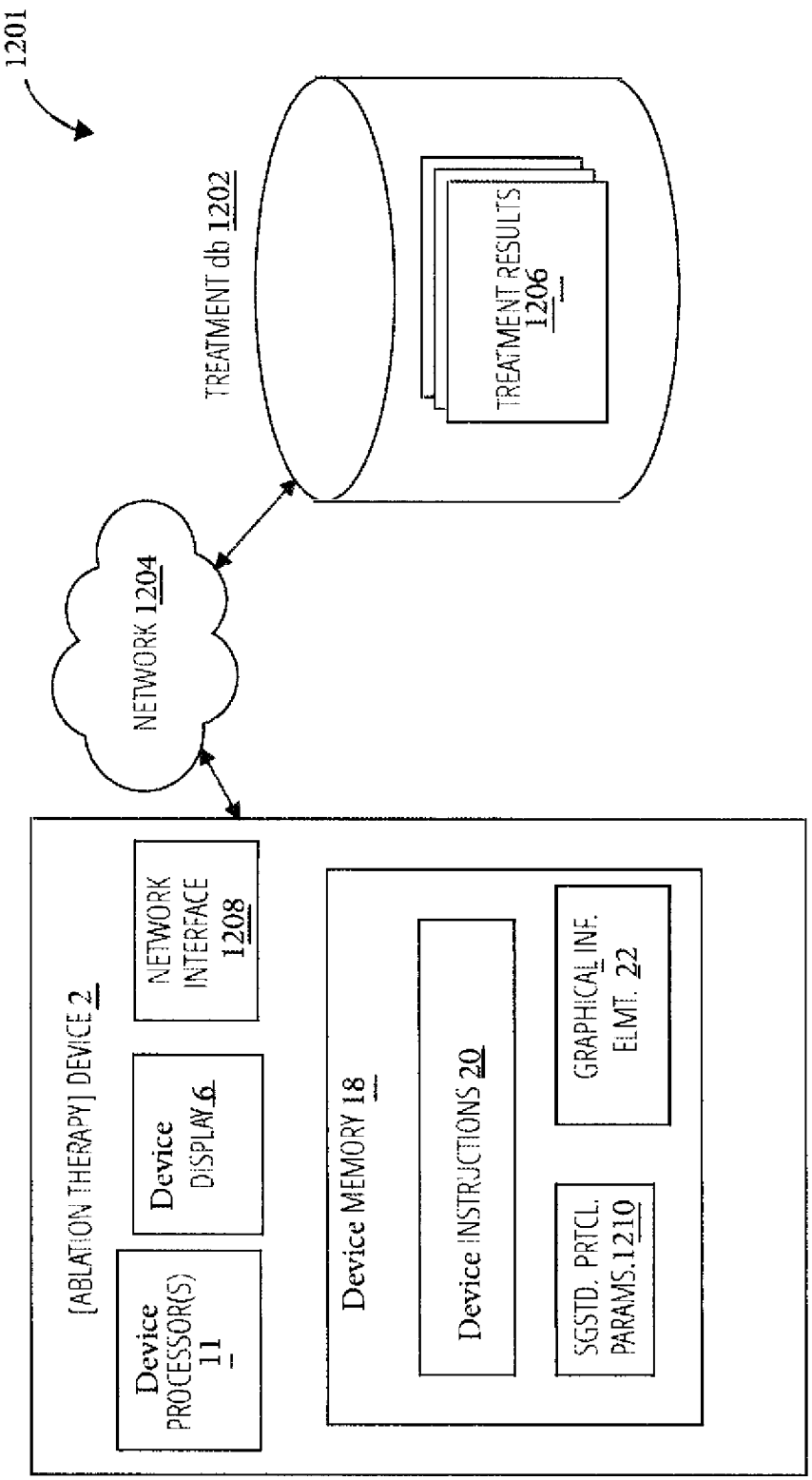
FIG. 12 illustrates an ablation system in accordance with examples of this disclosure.

Referring now to FIG. 12 illustrates system 1201. In some examples, system 1201 can be implemented to include the laser ablation and tissue classification system 1 of FIG. 1. Although system 1201 is described with respect to the laser ablation and tissue classification device 2, other embodiments of laser ablation devices could be implemented in system 1201.

System 1201 includes laser ablation and tissue classification device 2 communicatively coupled to database 1202 via network 1204. In some examples, network 1204 can include the Internet, a local area network, or a wide area network. In some examples, network 1204 can be a private network, such as, for example accessible via virtual private networking (VPN) and/or otherwise credentialed access to protect information exchanged via network 1204. In some examples, network 1204 can be provided by a clinic, a hospital, a research facility, a university, or the like. Access to the network 1204 can be facilitated by a number of computing communication technologies and can include wired (e.g., Ethernet, or the like) or wireless (e.g., WiFi, 4G, 5G, or the like) communication protocols.

Treatment database 1202 can be any of a variety of database structures. In some examples, treatment database 1202 can be provided by a cloud computing environment, such as, a cloud data storage provided. With other examples, treatment database 1202 can be provided by a server, a workstation, a cloud computing service, a virtually hosted computing device, a container computing device, or the like. Treatment database 1202 can store indications of laser ablation treatment results 1206, as described above. In particular, database 1202 can store indications of acoustic signals received for prior therapy treatments, acoustic feedback analysis for prior treatments, including, but not limited to, results of acoustic signal processing analysis for noise filtration, results for tissue classification for specific acoustic signals or "acoustic fingerprints" for different tissue types, results of treatment efficiency analysis; user inputs for prior laser treatments; post-treatment user classifications (as described above); and/or warnings or other signals identified to user by the system during previous treatments.

During operation, laser ablation and tissue classification device 2 can operate to access database 1202 to receive treatment results 1206 or to add to treatment results 1206. This is described in greater detail below. However, it is noted that the present disclosure provides reasons for such a database. More specifically, as noted conventionally, data related to one therapy treatment cannot easily be compared to data from another therapy treatment. Said differently, current measured during one therapy treatment cannot easily be compared to current measured during another therapy treatment. However, the present disclosure provides to classify tissue as a result of audio signals received during a treatment such that audio signals from one therapy treatment can more easily be compared to audio signals from another therapy treatment. Thus, clinics and clinicians can contribute to treatment database 1202 to build a bank of treatments with which audio signals and the results of analyzing and/or processing such signals together with other treatment parameters or treatment results for future treatments may be based.

In addition to the components detailed elsewhere herein, laser ablation and tissue classification device 2 can include a network interface 1208. Laser ablation and tissue classification device 2 can send and receive data (e.g., information elements, data structures, or the like) to/from treatment database 1202 via network 1204 with network interface 1208. For example, network interface 1208 can format data for transmission over network 1204 via a communication protocol or can decode data transmitted over network 1204 via the communication protocol.

Further, laser ablation and tissue classification device 2 can determine suggested protocol parameters 1210 and generate graphical information element 22 based on treatment results 1206. This and other examples of the disclosure are described in greater detail below.

Figure 13:
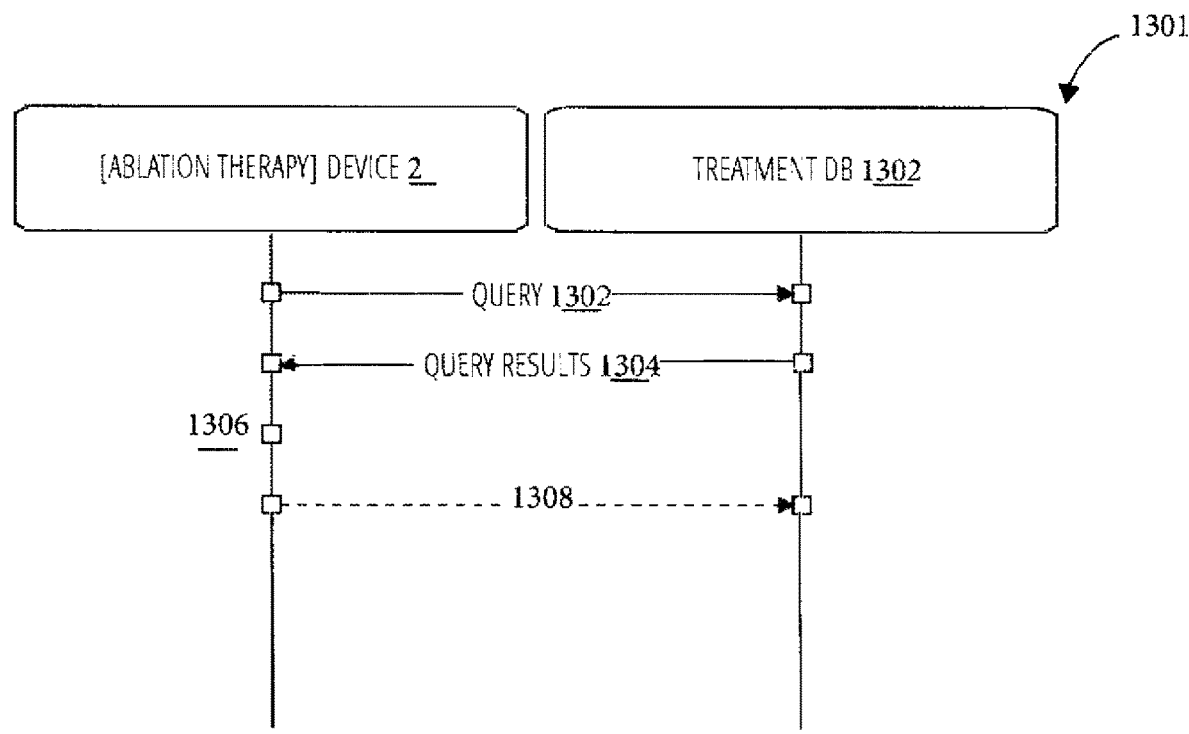
FIG. 13 illustrates a technique in accordance with one examples of this disclosure.

FIG. 13 illustrates technique 1301 detailing operations for laser ablation and tissue classification device 2 and/or treatment database 1202 according to examples of the present disclosure. In technique 1301, at operation 1302, laser ablation and tissue classification device can send a query to treatment database 1202. Likewise, at operation 1302 treatment database 1202 can receive a query from laser ablation and tissue classification device 2. For example, processor(s) 11 in executing instructions 20 can generate a query for treatment database 1202 and can send the query to treatment database 1202 via network interface 1208 and network 1204. As a specific example, the query can include a request to provide tissue types/classifications 1206 for a particular audio signal received. With some examples, laser ablation and tissue classification device 2 can generate query based on input received from a clinician. For example, processor(s) 11 in executing instructions 20 can receive input from a clinician indicating a type of audio signals. At operation 1306, treatment database 1202 can send query results to laser ablation and tissue classification device 2. Likewise, at operation 1306, laser ablation and tissue classification device 2 can receive query results from treatment database 1202. For example, processor(s) 11 in executing instructions 20 can receive results to a query (e.g., query send at operation 1302, or the like) from treatment database 1202.

At operation 1306, laser ablation and tissue classification device 2 can generate graphical information element 22 including indications of treatment results 1206 and/or suggested protocol parameters 1210. Examples of this are explained in greater detail below. However, in general, processor(s) 11 in executing instructions 20 can generate a graphical display (e.g., a plot, multiple plots, or the like) including indications of treatment results 1206. As another example, processor(s) 11 in executing instructions 20 can generate suggested protocol parameters 1210 and a graphical display including indications of suggested protocol parameters 1210. With some examples, suggested protocol parameters 1210 can be generated based on treatment results 1206.

At operation 1306, laser ablation and tissue classification device 2 can send data including indications of a therapy to treatment database 1202. Likewise, at operation 1308 treatment database 1202 can receive a data from laser ablation and tissue classification device 2 including indication of a therapy treatment. Furthermore, treatment database 1202 can add the received therapy to treatment results 1206. With some examples, information communicated to 1202 at operation 1306 can include analyze the acoustic signals received, determine tissue type, determine tissue classification, determine position or location of catheter in the vessel, provide user with warnings or other signals, provide information on ablation efficiency.

Figure 14:
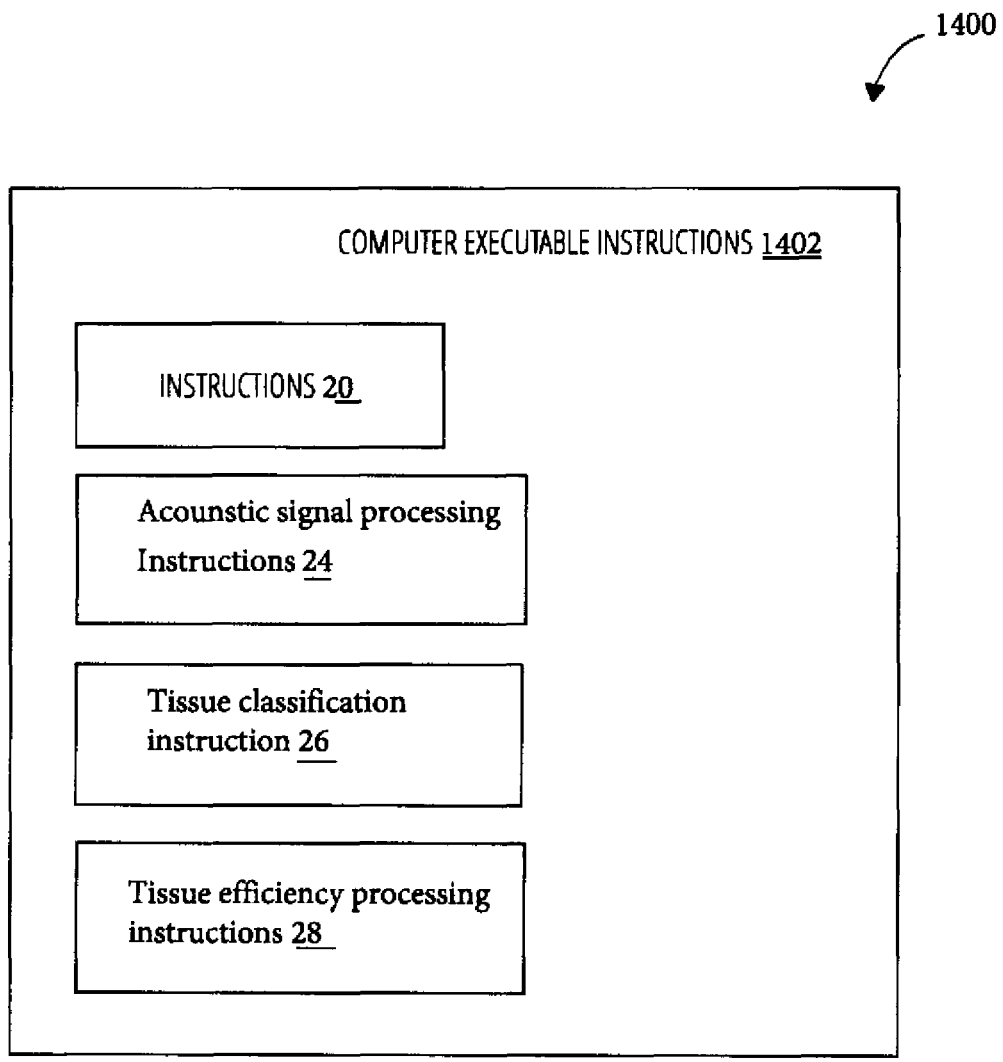
FIG. 14 illustrates a computer-readable storage medium in accordance with one embodiment.

FIG. 14 illustrates computer-readable storage medium 1402. Computer-readable storage medium 1402 may comprise any non-transitory computer-readable storage medium or machine-readable storage medium, such as an optical, magnetic or semiconductor storage medium. In various embodiments, computer-readable storage medium 1402 may comprise an article of manufacture. In some embodiments, 1402 may store computer executable instructions with which circuitry (e.g., processor(s), or the like) can execute. For example, computer executable instructions can include instructions to implement operations described with respect to instructions 20, acoustic signal processing instructions 24, tissue classification instructions 24, tissue efficiency processing instructions 28. Examples of computer-readable storage medium 1402 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 15:
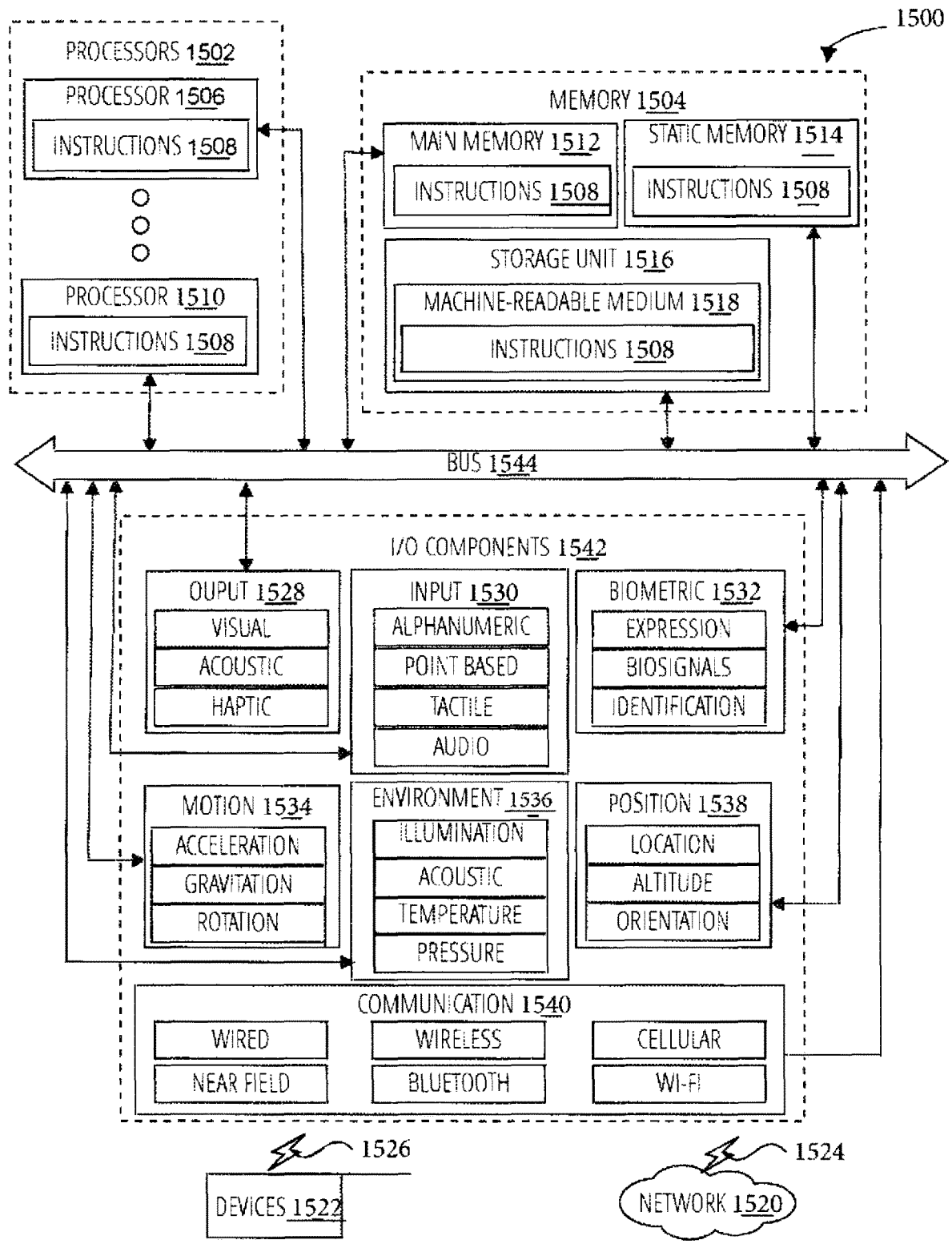
FIG. 15 illustrates a diagrammatic representation of a machine in the form of a computer system within which a set of instructions may be executed for causing the machine to perform any one or more of the methodologies discussed herein, according to an example embodiment.

FIG. 15 illustrates a diagrammatic representation of a machine 1501 in the form of a computer system within which a set of instructions may be executed for causing the machine to perform any one or more of the methodologies discussed herein. More specifically, FIG. 15 shows a diagrammatic representation of the machine 1501 in the example form of a computer system, within which instructions 1508 (e.g., software, a program, an application, an applet, an app, or other executable code) for causing the machine 1501 to perform any one or more of the methodologies discussed herein may be executed. For example, the instructions 1508 may cause the machine 1501 to execute instructions. More generally, the instructions 1508 may cause the machine 1501 to analyze the acoustic signals received, determine tissue type, tissue classification, determine position or location of catheter in the vessel, provide user with warnings or other signals.

The instructions 1508 transform the general, non-programmed machine 1501 into a particular machine programmed to carry out the described and illustrated functions in a specific manner. In alternative embodiments, the machine 1501 operates as a standalone device or may be coupled (e.g., networked) to other machines. In a networked deployment, the machine 1501 may operate in the capacity of a server machine or a client machine in a server-client network environment, or as a peer machine in a peer-to-peer (or distributed) network environment. The machine 1501 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1508, sequentially or otherwise, that specify actions to be taken by the machine 1501. Further, while only a single machine 1501 is illustrated, the term "machine" shall also be taken to include a collection of machines that individually or jointly execute the instructions 1508 to perform any one or more of the methodologies discussed herein.

The machine 1501 may include processors 1502, memory 1504, and I/O components 1542, which may be configured to communicate with each other such as via a bus 1544. In an example embodiment, the processors 1502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1506 and a processor 1510 that may execute the instructions 1508. The term "processor" is intended to include multi-core processors that may comprise two or more independent processors (sometimes referred to as "cores") that may execute instructions contemporaneously. Although FIG. 15 shows multiple processors 1502, the machine 1501 may include a single processor with a single core, a single processor with multiple cores (e.g., a multi-core processor), multiple processors with a single core, multiple processors with multiples cores, or any combination thereof.

The memory 1504 may include a main memory 1512, a static memory 1514, and a storage unit 1516, both accessible to the processors 1502 such as via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors 1502 (e.g., within the processor's cache memory), or any suitable combination thereof, during execution thereof by the machine 1501.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones will likely include a touch input device or other such input mechanisms, while a headless server machine will likely not include such a touch input device. It will be appreciated that the I/O components 1542 may include many other components that are not shown in FIG. 15. The I/O components 1542 are grouped according to functionality merely for simplifying the following discussion and the grouping is in no way limiting. In various example embodiments, the I/O components 1542 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1542 may include biometric components 1532, motion components 1534, environmental components 1536, or position components 1538, among a wide array of other components. For example, the biometric components 1532 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 may include acceleration sensor components (e.g., accelerometer), gravitation sensor components, rotation sensor components (e.g., gyroscope), and so forth. The environmental components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1542 may include communication components 1540 operable to couple the machine 1501 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

The various memories (i.e., memory 1504, main memory 1512, static memory 1514, and/or memory of the processors 1502) and/or storage unit 1516 may store one or more sets of instructions and data structures (e.g., software) embodying or utilized by any one or more of the methodologies or functions described herein. These instructions (e.g., the instructions 1508), when executed by processors 1502, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1520 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1520 or a portion of the network 1520 may include a wireless or cellular network, and the coupling 1524 may be a Code Division Multiple Access (CDMA) connection, a Global System for Mobile communications (GSM) connection, or another type of cellular or wireless coupling. In this example, the coupling 1524 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1508 may be transmitted or received over the network 1520 using a transmission medium via a network interface device (e.g., a network interface component included in the communication components 1540) and utilizing any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1508 for execution by the machine 1500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Terms used herein should be accorded their ordinary meaning in the relevant arts, or the meaning indicated by their use in context, but if an express definition is provided, that meaning controls.

Herein, references to "one embodiment," "an embodiment," "one example," "an example, or "embodiments" and "examples" in the plural do not necessarily refer to the same embodiment or require plural embodiments, although it may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Unless specifically stated otherwise, as apparent from the following discussions, it is appreciated that throughout the specification discussions utilizing terms such as "processing", "computing", "calculating", "determining", "estimating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAI\tis), electrically programmable read-only memones (EPROMs), electrically erasable and programmable read only memories (EE-PROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The invention may be described in the general context of computer-executable instructions, such as program instructions, being executed by a computer. Generally, program instructions include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program instructions may be located in both local and remote computer storage media including memory storage devices.

While a number of exemplary aspects and embodiments have been discussed above, those of skill in the art will recognize certain modifications, additions and sub-combinations thereof. It is therefore intended that the following appended claims and claims hereafter introduced be interpreted to include all such modifications, additions and sub-combinations as are within their true spirit and scope.

What is claimed:

1. A method of laser ablating a target tissue, the method comprising:
   placing a catheter in a patient's vessel, the catheter comprising a plurality of optical fibers to transmit laser radiation from a catheter distal end onto a region of a target tissue;
   coupling the catheter to a laser device comprising a processor coupled to a memory, the laser device being configured to generate laser radiation with a power density, wavelength and pulse width selected to directly ablate the target tissue and to generate an acoustic feedback signal within the vessel due to contact of the laser radiation with the region of the target tissue;
   activating the laser device to transmit the laser radiation from the catheter distal end;
   initiating laser ablation of the target tissue using the laser radiation from the catheter distal end such that the laser radiation directly contacts the target tissue;
   generating, during the laser ablation, the acoustic feedback signal within the vessel due to the laser radiation from the catheter distal end contacting the target tissue;
   detecting the acoustic feedback signal using an acoustic device in communication with the laser device;

applying, by the processor, a tissue classification algorithm to the detected acoustic feedback signal thereby classifying the target tissue into a specific tissue type; and identifying, by the processor, based on the detected acoustic feedback signal and applied tissue classification algorithm, whether the region of the target tissue includes the wall of the vessel terminating or temporarily pausing laser radiation delivery when the region of the target tissue is identified, by the processor, as including the wall of the vessel based on the detected acoustic feedback signal and applied tissue classification algorithm.

2. The method of claim 1, further comprising:
stopping transmission of the laser radiation when the region of the target tissue is identified as including the wall of the vessel.

3. The method of claim 1, wherein applying of the tissue classification algorithm to the detected acoustic feedback signal by the processor includes determining an efficiency of the ablation of the region of the target tissue.

4. The method of claim 3, wherein classifying the target tissue by the processor comprises:
applying a machine learning algorithm on extracted features to compare the detected acoustic feedback signal with a database of stored acoustic signals.

5. The method of claim 1, further comprising:
placing the acoustic device at a sensing location, wherein the sensing location is on the patient's skin.

6. A method of laser ablating a target tissue, the method comprising:
placing a catheter in a patient's vessel, the catheter comprising a plurality of optical fibers configured to transmit laser ablation radiation from a catheter distal end onto a region of a target tissue;
coupling the catheter to a laser device, the laser device comprising:
a processor,
a memory coupled to the processor,
an acoustic signal interface, and
wherein the laser device is configured to generate the laser ablation radiation with a power density, wavelength and pulse width selected to directly ablate the target tissue and to generate an acoustic feedback signal within the vessel due to contact with the region of the target tissue;
coupling an acoustic device to the acoustic signal interface of the laser device, the acoustic device configured to detect acoustic feedback signals generated by the region of the target tissue from the impingement of the laser ablation radiation onto the target tissue;
initiating laser ablation of the target tissue using the laser ablation radiation from the catheter distal end such that the laser ablation radiation directly contacts the target tissue;
generating, during the laser ablation, an acoustic feedback signal within the vessel due to the laser ablation radiation from the catheter distal end contacting the region of the target tissue, wherein the acoustic feedback signal is at least partially generated by: cavitation bubbles, jet formation and/or shock waves that are created by the initiating of the laser ablation using the laser ablation radiation with the power density, wavelength and pulse width selected to ablate the target tissue and to generate the acoustic feedback signal within the vessel due to contact of the laser ablation radiation with the target tissue;

applying, by the processor, a tissue classification algorithm to the detected acoustic feedback signal thereby classifying the target tissue into a specific tissue type, wherein the application of the tissue classification algorithm includes:
determining an efficiency of the ablation of the region of the target tissue; and
applying a machine learning algorithm to compare the detected acoustic feedback signal with a database of stored acoustic signals;
determining, by the processor, whether the region of target tissue includes the wall of the vessel, based on the received acoustic feedback signal obtained from the acoustic device and the applied tissue classification algorithm; and
temporarily pausing transmission of the laser ablation radiation and, during the pause, adjusting a position of the catheter distal end away from the wall of the vessel based on the region of the target tissue being determined, by the processor, from the detected acoustic feedback signal and applied tissue classification algorithm, to include the wall of the vessel,
wherein the database of stored acoustic signals comprises received acoustic feedback signals for prior therapy treatments, acoustic feedback analysis for prior treatments, results of acoustic feedback signal processing analysis for noise filtration, results for tissue classification for specific acoustic feedback signals or acoustic fingerprints for different tissue types, results of treatment efficiency analysis; user inputs for prior laser treatments; post-treatment user classifications; and/or warnings or other signals identified to user by the system during previous treatments.

7. The method of claim 6, wherein the temporarily pausing of the transmission of the laser ablation radiation includes automatically pausing the transmission of the laser ablation radiation.

8. The method of claim 7, further comprising:
reactivating transmission of the laser ablation radiation after the adjusting of the position of the catheter distal end away from the wall of the vessel.

9. The method of claim 6, wherein determining whether the region of target tissue includes the wall of the vessel comprises:
determining a plurality of features of the received acoustic feedback signal; and
comparing the determined plurality of features of the received acoustic feedback signal to the database of stored acoustic signals, wherein the database of stored acoustic signals correspond to a plurality of tissue types.

10. The method of claim 6, further comprising:
where the region of the target tissue is determined to include the wall of the vessel, adjusting a treatment parameter associated with the laser radiation.

11. The method of claim 6, further comprising:
issuing a notification to a user that the region of the target tissue includes the wall of the vessel when the region of the target tissue is determined to include the wall of the vessel.

12. A method of operating a laser ablation system comprising a catheter, a laser device, a processor, and an acoustic device, the method comprising:
delivering, by the laser device via the catheter placed in a vessel of a patient, laser energy to a target tissue of the patient, the laser energy having a power density of approximately 50 or 60 mJ/mm2, a wavelength of approximately 355 nm and a pulse width less than approximately 25 ns selected to facilitate direct laser ablating of the target tissue and concurrent with the direct laser ablating, to generate an acoustic feedback signal, the acoustic feedback signal being generated within the vessel by direct impingement of the laser energy onto the target tissue;

receiving, by the acoustic device, the acoustic feedback signal generated by impingement of the laser energy onto the target tissue during the laser ablating of the target tissue;

determining, based on the received acoustic feedback signal and a tissue classification algorithm performed by the processor on the received acoustic signal, whether the target tissue includes 1) a wall of the vessel or a stent or 2) blood without any lesion present; and in response to the target tissue being determined, by the processor, to include the wall of the vessel or the stent based on the detected acoustic feedback signal and applied tissue classification algorithm:

temporarily pausing laser energy delivery and adjusting a position of a distal end of the catheter away from the wall of the vessel or the stent.

13. The method of claim 12, wherein the acoustic device is placed on skin of the patient.

14. The method of claim 12, wherein determining whether the target tissue includes the wall of the vessel or a stent comprises:

determining a plurality of features of the received acoustic feedback signal; and comparing the determined plurality of features of the received acoustic feedback signals to stored acoustic signals, wherein the stored acoustic signals correspond to a plurality of tissue types.

15. The method of claim 6, further comprising:
identifying whether the region of target tissue includes blood without any lesion present.

16. The method of claim 15, further comprising:
stopping transmission of the laser radiation when the region of the target tissue includes blood without any lesion present or reducing a power level of the laser radiation when the region of the target tissue includes blood without any lesion present.

17. The method of claim 4, wherein the database of stored acoustic signals includes: acoustic feedback signals received for prior therapy treatments, acoustic feedback analysis for prior treatments, results of acoustic feedback signal processing analysis for noise filtration, results for tissue classification for specific acoustic signals or acoustic fingerprints for different tissue types, results of treatment efficiency analysis; user inputs for prior laser treatments; post-treatment user classifications; and/or warnings or other signals identified to user by the system during previous treatments.

18. The method of claim 12, further comprising:
providing, providing, based on application of the tissue classification algorithm, a notification to a user whether treatment parameters need to be adjusted, wherein the treatment parameters to be adjusted include at least one of:
(i) repositioning the catheter;
(ii) adjusting laser energy levels;
(iii) adjusting laser energy parameters; and
(iv) terminating the laser procedure.

19. The method of claim 1, wherein the acoustic feedback signal is at least partially generated by: cavitation bubbles, jet formation and/or shock waves that are created by the initiating of the laser ablation using the laser radiation with the power density, wavelength and pulse width selected to ablate the target tissue and to generate the acoustic signal within the vessel due to contact with the region of the target tissue.

* * * * *